(12) United States Patent
Zhang et al.

(10) Patent No.: US 12,513,688 B2
(45) Date of Patent: Dec. 30, 2025

(54) RESOURCE CONFLICT INDICATION TRANSMISSION METHOD, APPARATUS, AND SYSTEM

(71) Applicant: Huawei Technologies Co., Ltd., Shenzhen (CN)

(72) Inventors: Tianhong Zhang, Beijing (CN); Chao Li, Beijing (CN); Haining Huang, Beijing (CN); Fan Yang, Beijing (CN); Xiang Mi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 18/352,604

(22) Filed: Jul. 14, 2023

(65) Prior Publication Data

US 2023/0362917 A1    Nov. 9, 2023

Related U.S. Application Data

(63) Continuation of application No. PCT/CN2021/122471, filed on Sep. 30, 2021.

(30) Foreign Application Priority Data

Jan. 15, 2021    (WO) ................ PCT/CN2021/072325

(51) Int. Cl.
*H04W 72/25*    (2023.01)
*H04W 72/1263*    (2023.01)
*H04W 72/563*    (2023.01)

(52) U.S. Cl.
CPC ....... *H04W 72/1263* (2013.01); *H04W 72/25* (2023.01); *H04W 72/563* (2023.01)

(58) Field of Classification Search
CPC ............. H04W 72/1263; H04W 72/25; H04W 72/563; H04W 72/02; H04W 72/0446;
(Continued)

(56) References Cited

U.S. PATENT DOCUMENTS

2020/0178290 A1    6/2020   Lee et al.
2020/0374978 A1    11/2020  Panteleev et al.
(Continued)

FOREIGN PATENT DOCUMENTS

CN    106937380 A    7/2017
CN    110266449 A    9/2019
(Continued)

OTHER PUBLICATIONS

Qualcomm Incorporated:"Reliability and Latency Enhancements for Mode 2".3GPP TSG RAN WG1 Meeting #103-e, Oct. 26-Nov. 13, 2020, R1-2009273, total 19 pages.
Huawei, HiSilicon:"Remaining details of sidelink resource allocation mode 2".3GPP TSG RAN WG1 Meeting #102-e, E-meeting, Aug. 17-28, 2020, R1-2005798, total 18 pages.
ITRI:"Discussion on enhancement for NR V2X Mode 2".3GPPTSG RAN WG1 #103-e, e-Meeting, Oct. 26-Nov. 13, 2020, R1-2007878, total 5 pages.
(Continued)

*Primary Examiner* — Thai Nguyen
(74) *Attorney, Agent, or Firm* — Slater Matsil, LLP

(57) ABSTRACT

This application has disclosed a method for sending and transmission of a resource conflict indication and a communication apparatus. When determining that a reserved resource indicated by first SCI conflicts with a reserved resource indicated by second SCI, a first terminal device sends an RCI to a second terminal device at a determined time domain and/or frequency domain position before a conflict position; or when determining that a resource corresponding to first SCI conflicts with a resource corresponding to second SCI, a first terminal device sends an RCI to a second terminal device at a determined time domain and/or frequency domain position after a conflict position. The RCI is sent at the determined time domain and/or frequency domain position.

24 Claims, 16 Drawing Sheets

(58) Field of Classification Search
CPC ........... H04W 72/0453; H04W 72/569; H04L 5/0094; H04L 5/0037; H04L 5/0007; H04L 1/1861; H04L 1/1887
See application file for complete search history.

(56) References Cited

U.S. PATENT DOCUMENTS

| | | | |
|---|---|---|---|
| 2022/0256579 A1* | 8/2022 | Ji | ............................ H04L 1/08 |
| 2023/0362739 A1* | 11/2023 | Zhao | .................... H04W 72/25 |

FOREIGN PATENT DOCUMENTS

| | | |
|---|---|---|
| CN | 111194057 A | 5/2020 |
| CN | 111432376 A | 7/2020 |
| CN | 111934835 A | 11/2020 |
| CN | 113170473 A | 7/2021 |
| WO | 2020061879 A1 | 4/2020 |
| WO | 2020173536 A1 | 9/2020 |
| WO | WO-2022118301 A1 * | 6/2022 ............ H04W 72/20 |

OTHER PUBLICATIONS

"3rd Generation Partnership Project; Technical Specification Group Radio Access Network; NR; Physical layer procedures for control (Release 15)", 3GPP TS 38.213 V1.0.0, Technical Specification, (Sep. 2017), 16 Pages.

"3rd Generation Partnership Project; Technical Specification Group Radio Access Network; NR; Physical layer procedures for data (Release 15)" 3GPP TS 38.214 V1.0.0, Technical Specification, (Sep. 2017), 32 Pages.

"3rd Generation Partnership Project; Technical Specification Group Radio Access Network; NR; Physical channels and modulation (Release 15)", 3GPP TS 38.211 V1.0.0, Technical Specification, (Sep. 2017), 37 Pages.

Intel Corporation, "Feature Lead Summary for NR-V2X AI—7.2.4.1.4 Resource Allocation Mechanism", 3GPP (Sep. 2017), WG1 Meeting #96, R1-1903397, Feb. 25-Mar. 1, 2019, 17 Pages, Athens, Greece.

* cited by examiner

RESOURCE CONFLICT INDICATION TRANSMISSION METHOD, APPARATUS, AND SYSTEM

CROSS-REFERENCE TO RELATED APPLICATIONS

This application is a continuation of International Application No. PCT/CN2021/122471, filed on Sep. 30, 2021, which claims priority to International Patent Application No. PCT/CN2021/072325, filed on Jan. 15, 2021. The disclosures of the aforementioned applications are hereby incorporated by reference in their entireties.

TECHNICAL FIELD

This application relates to the field of communication technologies, and in particular, to a resource conflict indication (RCI) transmission method, an apparatus, and a system.

BACKGROUND

In mode 2 of sidelink (SL) communication, a base station configures a resource pool, and a terminal device independently performs resource sensing and resource selection. In addition, terminal devices performing sidelink communication may cooperate with each other. A specific cooperation process is as follows: An auxiliary terminal first determines one group of resource sets, and the auxiliary terminal includes the resource sets in assistance information and sends the assistance information to a transmit terminal. The transmit terminal considers the resource sets when selecting a transmission resource, and the transmit terminal may perform sidelink communication with a receive terminal on the resource sets. The auxiliary terminal may be the receive terminal, or may not be the receive terminal. In the cooperation process, the auxiliary terminal needs to carry a part of a function of performing resource sensing for the transmit terminal.

Currently, there is no solution about reliable transmission of the assistance information.

SUMMARY

This application provides a resource conflict indication transmission method, an apparatus, and a system, to improve reliability of transmission of assistance information in sidelink communication.

According to a first aspect, a resource conflict indication transmission method is provided. The method includes: determining a second time domain position based on a time domain position of first sidelink control information or a first time domain position, and/or determining a third frequency domain position based on a frequency domain position of the first sidelink control information, a first frequency domain position, or a second frequency domain position, where the first time domain position and the first frequency domain position are a position of a first reserved resource indicated by the first sidelink control information, and the first time domain position and the second frequency domain position are a position of a second reserved resource indicated by second sidelink control information; and the first reserved resource conflicts with the second reserved resource, where the conflict includes a time domain conflict or a time-frequency conflict; and sending a resource conflict indication to a second terminal device at the second time domain position and/or the third frequency domain position, where the resource conflict indication indicates that the first reserved resource conflicts with the second reserved resource, or indicates to change the first reserved resource, and the first sidelink control information or the second sidelink control information is from the second terminal device.

In this aspect, when determining that the reserved resource indicated by the first SCI conflicts with the reserved resource indicated by the second SCI, a first terminal device sends the RCI to the second terminal device or a third terminal device at the determined time domain and/or frequency domain position before a conflict position. The RCI is sent at the determined time domain position and/or frequency domain position, so that reliability of RCI transmission is improved.

In this aspect, a method for changing the first reserved resource may be triggering resource reselection.

In this aspect, the first sidelink control information is from the second terminal device. The second sidelink control information is from the third terminal device. Alternatively, the second sidelink control information is not actually sent, and the first terminal device determines to transmit the second sidelink control information at a position of the second reserved resource.

That the resource conflict indication indicates that the first reserved resource conflicts with the second reserved resource includes: The resource conflict indication indicates that the first reserved resource conflicts, and/or the resource conflict indication indicates that the second reserved resource conflicts.

In a possible implementation, that the first terminal device determines the second sidelink control information includes: The second sidelink control information is not actually sent, and the first terminal device determines to transmit the second reserved resource at the position of the second reserved resource.

In another possible implementation, the determining a second time domain position based on a first time domain position includes: determining the second time domain position based on the first time domain position and a first time interval.

In still another possible implementation, the second time domain position belongs to a conflict indication time domain position set, and time domain positions in the conflict indication time domain position set are discretely distributed; and the second time domain position is a latest time domain position that is the first time interval before the first time domain position.

In still another possible implementation, the first time interval includes at least one of the following time lengths: a length of time required by the second terminal device to decode the resource conflict indication; a length of time required by the second terminal device to cancel transmission of data and/or control information at the first time domain position; a length of time required by the second terminal device to reselect the first reserved resource; and a length of time caused by discrete distribution of the time domain positions.

In still another possible implementation, the first time interval is a time interval between a first time point and a second time point, the first time point is any one of a start position of a slot in which the second time domain position is located, an end position of the slot in which the second time domain position is located, a start position of a symbol in which the second time domain position is located, or an end position of the symbol in which the second time domain position is located, and the second time point is any one of a start position of a slot in which the first time domain position is located or an end position of the slot in which the first time domain position is located.

In still another possible implementation, an interval between the time domain position of the first sidelink control information and the second time domain position is greater than or equal to a second time interval; and the second time interval includes at least one of the following time lengths: a length of time required to determine that the first reserved resource conflicts with the second reserved resource; a length of time required to generate the resource conflict indication; and the length of time caused by discrete distribution of the time domain positions.

In still another possible implementation, the second time interval is a time interval between a third time point and a fourth time point, the third time point is any one of a start position of a slot in which the first sidelink control information is located or an end position of the slot in which the first sidelink control information is located, and the fourth time point is any one of the start position of the slot in which the second time domain position is located, the end position of the slot in which the second time domain position is located, the start position of the symbol in which the second time domain position is located, or the end position of the symbol in which the second time domain position is located.

In still another possible implementation, the determining a second time domain position based on a time domain position of first sidelink control information includes: determining the second time domain position based on a third time interval and the time domain position of the first sidelink control information.

In still another possible implementation, the second time domain position belongs to the conflict indication time domain position set, and the time domain positions in the conflict indication time domain position set are discretely distributed; and the second time domain position is the $1^{st}$ time domain position that is the third time interval after the time domain position of the first sidelink control information.

In still another possible implementation, the third time interval is a time interval between a fifth time point and a sixth time point, the fifth time point is any one of the start position of the slot in which the first sidelink control information is located or the end position of the slot in which the first sidelink control information is located, and the sixth time point is any one of the start position of the slot in which the second time domain position is located, the end position of the slot in which the second time domain position is located, the start position of the symbol in which the second time domain position is located, or the end position of the symbol in which the second time domain position is located.

In still another possible implementation, the third time interval includes at least one of the following time lengths: the length of time required to determine that the first reserved resource conflicts with the second reserved resource; the length of time required to generate the resource conflict indication; and the length of time caused by discrete distribution of the time domain positions.

In still another possible implementation, an interval between the first time domain position and the second time domain position is greater than or equal to a fourth time interval; and the fourth time interval includes at least one of the following time lengths: the length of time required by the second terminal device to decode the resource conflict indication; the length of time required by the second terminal device to cancel transmission of data and/or control information at the first time domain position; the length of time required by the second terminal device to reselect the first reserved resource; and the length of time caused by discrete distribution of the time domain positions.

In still another possible implementation, the fourth time interval is a time interval between a seventh time point and an eighth time point, the seventh time point is any one of the start position of the slot in which the second time domain position is located, the end position of the slot in which the second time domain position is located, the start position of the symbol in which the second time domain position is located, or the end position of the symbol in which the second time domain position is located, and the eighth time point is any one of the start position of the slot in which the first time domain position is located or the end position of the slot in which the first time domain position is located.

In still another possible implementation, the first sidelink control information is from the second terminal device; and the time domain position of the first sidelink control information is after a time domain position of the second sidelink control information; a service priority of data scheduled by using the first sidelink control information is lower than a preset first priority threshold; a service priority of data scheduled by using the first sidelink control information is lower than a service priority of data scheduled by using the second sidelink control information; or a service priority of data scheduled by using the first sidelink control information is lower than a second priority threshold, where the second priority threshold is associated with signal quality and a service priority of data scheduled by using the second sidelink control information.

In this implementation, a specific terminal device changing the reserved resource is determined based on a resource occupation principle of "first come, first occupy" or a principle in which data that is scheduled by using sidelink control information and that has a higher service priority occupies a resource. The first terminal device indicates a terminal device whose sidelink control information is later in time domain to change the reserved resource. Alternatively, the first terminal device indicates a terminal device with a lower priority level to change the reserved resource, where the priority is a priority indicated by the sidelink control information. The lower priority level includes: The service priority of the data scheduled by using the first sidelink control information is lower than the preset first priority threshold; the service priority of the data scheduled by using the first sidelink control information is lower than the service priority of the data scheduled by using the second sidelink control information; or the service priority of the data scheduled by using the first sidelink control information is lower than the second priority threshold. The second priority threshold is associated with the signal quality and the service priority of the data scheduled by using the second sidelink control information.

In still another possible implementation, a frequency domain resource at the third frequency domain position is located on a feedback channel, and the frequency domain resource at the third frequency domain position is orthogonal to a resource set that is used to feed back the indication and that is on the feedback channel.

In still another possible implementation, the determining a third frequency domain position based on a frequency domain position of the first sidelink control information includes: determining a second resource block set based on the frequency domain position of the first sidelink control information, and determining the third frequency domain position in the second resource block set, where the first sidelink control information and the data scheduled by using the first sidelink control information occupy one or more sub-channels; and the second resource block set is associated with a start sub-channel in the one or more sub-channels; or the second resource block set is associated with the one or more sub-channels.

In still another possible implementation, the start sub-channel includes a sub-channel with a smallest sub-channel index value.

In still another possible implementation, the determining a third frequency domain position based on a first frequency domain position includes: determining a second resource block set based on the first frequency domain position, and determining the third frequency domain position in the second resource block set, where the first frequency domain position is one or more sub-channels occupied by the first reserved resource; and the second resource block set is associated with a start sub-channel in the one or more sub-channels; or the second resource block set is associated with the one or more sub-channels.

In still another possible implementation, the determining a third frequency domain position based on a second frequency domain position includes: determining a second resource block set based on the second frequency domain position, and determining the third frequency domain position in the second resource block set, where the second frequency domain position is one or more sub-channels occupied by the second reserved resource; and the second resource block set is associated with a start sub-channel in the one or more sub-channels; or the second resource block set is associated with the one or more sub-channels.

In still another possible implementation, a first resource block set includes $M_{PRB,set}^{RCI}$ PRBs, where $M_{PRB,set}^{RCI}$ indicates a quantity of PRBs used for transmission of the RCI in a resource pool.

In still another possible implementation, the second resource block set includes $R_{PRB}^{RCI}=M_{subch,slot}^{RCI} \cdot N_{type}^{RCI}$ or $R_{PRB}^{RCI}=M_{subch,slot}^{RCI}$ PRBs.

In still another possible implementation, the method further includes: determining, based on the second resource block set and a physical resource block PRB index, to use at least one PRB to transmit the resource conflict indication.

In still another possible implementation, a quantity of PRBs used for one resource conflict indication is $R_{PRB}^{RCI}=N_{type}^{RCI} \cdot M_{subch,slot}^{RCI}$.

In still another possible implementation, in combination with code domain information, a quantity of PRBs used for one resource conflict indication is $R_{PRB,CS}^{RCI}=N_{type}^{RCI} \cdot M_{subch,slot}^{RCI} \cdot N_{CS}^{RCI}$.

According to a second aspect, a resource conflict indication transmission method is provided. The method includes: receiving a resource conflict indication at a second time domain position and/or a third frequency domain position, where the resource conflict indication indicates that a first reserved resource indicated by first sidelink control information conflicts with a second reserved resource indicated by second sidelink control information, and indicates to change the first reserved resource, where the conflict includes a time domain conflict or a time-frequency conflict, and the second time domain position is determined based on a time domain position of the first sidelink control information or a first time domain position; and/or the third frequency domain position is determined based on a frequency domain position of the first sidelink control information, a first frequency domain position, or a second frequency domain position, the first time domain position and the first frequency domain position are a position of the first reserved resource indicated by the first sidelink control information, and the first time domain position and the second frequency domain position are a position of the second reserved resource indicated by the second sidelink control information; and canceling transmission of data and/or control information on the first reserved resource based on the resource conflict indication, and reselecting the first reserved resource.

In a possible implementation, the method includes: receiving a resource conflict indication at a second time domain position and/or a third frequency domain position, where the resource conflict indication indicates that a first reserved resource indicated by first sidelink control information conflicts, and indicates to change the first reserved resource, where the conflict includes a time domain conflict or a time-frequency conflict, and the second time domain position is determined based on a time domain position of the first sidelink control information or a first time domain position; and/or the third frequency domain position is determined based on a frequency domain position of the first sidelink control information, a first frequency domain position, or a second frequency domain position, the first time domain position and the first frequency domain position are a position of the first reserved resource indicated by the first sidelink control information, and the first time domain position and the second frequency domain position are a position of the second reserved resource indicated by the second sidelink control information; and canceling transmission of data and/or control information on the first reserved resource based on the resource conflict indication, and/or reselecting the first reserved resource.

In a possible implementation, the canceling transmission of data and/or control information on the first reserved resource based on the resource conflict indication, and reselecting the first reserved resource includes at least one of the following: determining a fourth frequency domain position based on a second resource block set and a source identifier of the first sidelink control information, and if the fourth frequency domain position is consistent with the third frequency domain position, canceling transmission of the data and/or the control information on the first reserved resource based on the resource conflict indication, and reselecting the first reserved resource; determining a first service priority corresponding to the third frequency domain position, and if a second service priority of data scheduled by using the first sidelink control information is higher than or equal to the first service priority, canceling transmission of the data and/or the control information on the first reserved resource based on the resource conflict indication, and reselecting the first reserved resource; determining a fifth frequency domain position based on to a slot index of the first sidelink control information and a sub-channel index of the first sidelink control information, and if the fifth frequency domain position is consistent with the third frequency domain position, canceling transmission of the data and/or the control information on the first reserved resource based on the resource conflict indication, and reselecting the first reserved resource; and determining a sixth frequency domain position based on the first time domain position or the first frequency domain position, and if the sixth frequency domain position is consistent with the third frequency domain position, canceling transmission of the data and/or the control information on the first reserved resource based on the resource conflict indication, and reselecting the first reserved resource.

In a possible implementation, the canceling transmission of data and/or control information on the first reserved resource based on the resource conflict indication, and reselecting the first reserved resource includes at least one of the following: determining a fourth frequency domain position based on a second resource block set and a source identifier of the first sidelink control information, and if the fourth frequency domain position is consistent with the third frequency domain position, canceling transmission of the data and/or the control information on the first reserved resource based on the resource conflict indication, and/or reselecting the first reserved resource; determining a first service priority corresponding to the third frequency domain position, and if a second service priority of data scheduled by using the first sidelink control information is higher than or equal to the first service priority, canceling transmission of the data and/or the control information on the first reserved resource based on the resource conflict indication, and/or reselecting the first reserved resource; determining a fifth frequency domain position based on to a slot index of the first sidelink control information and a sub-channel index of the first sidelink control information, and if the fifth frequency domain position is consistent with the third frequency domain position, canceling transmission of the data and/or the control information on the first reserved resource based on the resource conflict indication, and/or reselecting the first reserved resource; and determining a sixth frequency domain position based on the first time domain position or the first frequency domain position, and if the sixth frequency domain position is consistent with the third frequency domain position, canceling transmission of the data and/or the control information on the first reserved resource based on the resource conflict indication, and/or reselecting the first reserved resource.

In a possible implementation, that a second service priority of data scheduled by using the first sidelink control information is higher than or equal to the first service priority includes: A value of the second service priority is higher than or equal to a value of the first service priority, or a level of the second service priority is lower than or equal to a level of the first service priority.

In a possible implementation, the source identifier of the first sidelink control information is any one of or a sum of any two or more of: the source identifier of the first sidelink control information, a source identifier of the second sidelink control information, a destination identifier of the first sidelink control information, a destination in the second sidelink control information identifier, a member identifier of the first sidelink control information, a member identifier of the second sidelink control information, a service priority of data scheduled by using the first sidelink control information, a service priority of the data scheduled by using the second sidelink control information, a slot index of the first sidelink control information, a sub-channel index of the first sidelink control information, the first time domain position or the first frequency domain position, a CRC used to generate the first sidelink control information, or a CRC used to generate the second sidelink control information.

In a possible implementation, the source identifier, destination identifier, or member identifier of the first sidelink control information includes a source identifier, destination identifier, or member identifier indicated by the first sidelink control information.

In a possible implementation, the source identifier, destination identifier, or member identifier of the second sidelink control information includes a source identifier, destination identifier, or member identifier indicated by the second sidelink control information.

The service priority of the data scheduled by using the first sidelink control information includes a priority indicated by the first sidelink control information.

The service priority of the data scheduled by using the second sidelink control information includes a priority indicated by the second sidelink control information.

In still another possible implementation, a first resource block set includes $M_{PRB,set}^{RCI}$ PRBs, where $M_{PRB,set}^{RCI}$ indicates a quantity of PRBs used for transmission of the RCI in a resource pool.

In still another possible implementation, the second resource block set includes $R_{PRB}^{RCI}=M_{subch,slot}^{RCI} \cdot N_{type}^{RCI}$ or $R_{PRB}^{RCI}=M_{subch,slot}^{RCI}$ PRBs.

In still another possible implementation, the method further includes: determining, based on the second resource block set and a physical resource block PRB index, to use at least one PRB to transmit the resource conflict indication.

In still another possible implementation, a quantity of PRBs used for one resource conflict indication is $R_{PRB}^{RCI}=N_{type}^{RCI} \cdot M_{subch,slot}^{RCI}$.

In still another possible implementation, in combination with code domain information, a quantity of PRBs used for one resource conflict indication is $R_{PRB,CS}^{RCI}=N_{type}^{RCI} \cdot M_{subch,slot}^{RCI} \cdot N_{CS}^{RCI}$.

It should be noted that for content that is in the second aspect and that is the same as that in the first aspect, refer to the specific descriptions of the first aspect. Details are not described herein again.

According to a third aspect, a resource conflict indication transmission method is provided. The method includes: receiving a resource conflict indication at a second time domain position and/or a third frequency domain position, where the resource conflict indication indicates that a first reserved resource indicated by first sidelink control information conflicts with a second reserved resource indicated by second sidelink control information, and indicates to send control information and/or data on the second reserved resource, where the conflict includes a time domain conflict or a time-frequency conflict, and the second time domain position is determined based on a time domain position of the first sidelink control information or a first time domain position; and/or the third frequency domain position is determined based on a frequency domain position of the first sidelink control information, a first frequency domain position, or a second frequency domain position, the first time domain position and the first frequency domain position are a position of the first reserved resource indicated by the first sidelink control information, and the first time domain position and the second frequency domain position are a position of the second reserved resource indicated by the second sidelink control information; and sending the control information and/or the data on the second reserved resource based on the resource conflict indication.

In a possible implementation, the method includes: receiving a resource conflict indication at a second time domain position and/or a third frequency domain position, where the resource conflict indication indicates that a second reserved resource indicated by second sidelink control information conflicts, and indicates to send control information and/or data on the second reserved resource, where the conflict includes a time domain conflict or a time-frequency conflict, and the second time domain position is determined based on a time domain position of the first sidelink control information or a first time domain position; and/or the third frequency domain position is determined based on a frequency domain position of the first sidelink control information, a first frequency domain position, or a second frequency domain position, the first time domain position and the first frequency domain position are a position of a first reserved resource indicated by the first sidelink control information, and the first time domain position and the second frequency domain position are a position of the second reserved resource indicated by the second sidelink control information; and sending the control information and/or the data on the second reserved resource based on the resource conflict indication.

In a possible implementation, the sending the control information and/or the data on the second reserved resource based on the resource conflict indication includes at least one of the following: determining a fourth frequency domain position based on a second resource block set and a source identifier of the second sidelink control information, and if the fourth frequency domain position is consistent with the third frequency domain position, sending the control information and/or the data on the second reserved resource based on the resource conflict indication; determining a first service priority corresponding to the third frequency domain position, and if a second service priority of data scheduled by using the second sidelink control information is lower than or equal to the first service priority, sending the control information and/or the data on the second reserved resource based on the resource conflict indication; and determining a fifth frequency domain position based on the first time domain position or the first frequency domain position, and if the fifth frequency domain position is consistent with the third frequency domain position, sending the control information and/or the data on the second reserved resource based on the resource conflict indication.

In a possible implementation, that a second service priority of data scheduled by using the second sidelink control information is lower than or equal to the first service priority includes: A value of the second service priority is lower than or equal to a value of the first service priority, or a level of the second service priority is higher than or equal to a level of the first service priority.

In a possible implementation, a source identifier of the first sidelink control information is any one of or a sum of any two or more of: the source identifier of the first sidelink control information, the source identifier of the second sidelink control information, a destination identifier of the first sidelink control information, a destination in the second sidelink control information identifier, a member identifier of the first sidelink control information, a member identifier of the second sidelink control information, a service priority of data scheduled by using the first sidelink control information, a service priority of the data scheduled by using the second sidelink control information, a slot index of the first sidelink control information, a sub-channel index of the first sidelink control information, the first time domain position or the first frequency domain position, a CRC used to generate the first sidelink control information, or a CRC used to generate the second sidelink control information.

In still another possible implementation, a first resource block set includes $M_{PRB,set}^{RCI}$ PRBs, where $M_{PRB,set}^{RCI}$ indicates a quantity of PRBs used for transmission of the RCI in a resource pool.

In still another possible implementation, the second resource block set includes $R_{PRB}^{RCI} = M_{subch,slot}^{RCI} \cdot N_{type}^{RCI}$ or $R_{PRB}^{RCI} = M_{subch,slot}^{RCI}$ PRBs.

In still another possible implementation, the method further includes: determining, based on the second resource block set and a physical resource block PRB index, to use at least one PRB to transmit the resource conflict indication.

In still another possible implementation, a quantity of PRBs used for one resource conflict indication is $R_{PRB}^{RCI} = N_{type}^{RCI} \cdot M_{subch,slot}^{RCI}$.

In still another possible implementation, in combination with code domain information, a quantity of PRBs used for one resource conflict indication is $R_{PRB,CS}^{RCI} = N_{type}^{RCI} \cdot M_{subch,slot}^{RCI} \cdot N_{CS}^{RCI}$.

It should be noted that for content that is in the third aspect and that is the same as that in the first aspect, refer to the specific descriptions of the first aspect. Details are not described herein again.

According to a fourth aspect, a resource conflict indication transmission method is provided. The method includes: determining a second time domain position based on a first time domain position of first sidelink control information or a time domain position of a reserved resource indicated by the first sidelink control information; and/or determining a third frequency domain position based on a first frequency domain position of the first sidelink control information, a second frequency domain position of second sidelink control information, or a frequency domain position of the reserved resource indicated by the first sidelink control information, where a resource corresponding to the first sidelink control information conflicts with a resource corresponding to the second sidelink control information, and the conflict includes a time domain conflict or a time-frequency conflict; and sending a resource conflict indication to a second terminal device at the second time domain position and/or the third frequency domain position, where the resource conflict indication indicates that the resource corresponding to the first sidelink control information conflicts with the resource corresponding to the second sidelink control information, or indicates to change the reserved resource or retransmit control information and/or data on the reserved resource, and the first sidelink control information or the second sidelink control information is from the second terminal device.

In this aspect, a method for changing the first reserved resource may be triggering resource reselection.

In this aspect, when determining that the resource corresponding to the first SCI conflicts with the resource corresponding to the second SCI, a first terminal device sends the RCI to the second terminal device or a third terminal device at a determined time domain and/or frequency domain position after a conflict position. The RCI is sent at the determined time domain position and/or frequency domain position, so that reliability of RCI transmission is improved.

In a possible implementation, the determining a second time domain position based on a first time domain position of first sidelink control information includes: determining the second time domain position based on the first time domain position and a first time interval.

In another possible implementation, the second time domain position belongs to a conflict indication time domain position set, and time domain positions in the conflict indication time domain position set are discretely distributed; and the second time domain position is the $1^{st}$ time domain position that is the first time interval after the first time domain position.

In still another possible implementation, the first time interval includes at least one of the following time lengths: a length of time required to determine that the resource corresponding to the first sidelink control information conflicts with the resource corresponding to the second sidelink control information; a length of time required to generate the resource conflict indication; and a length of time caused by discrete distribution of the time domain positions.

In still another possible implementation, an interval between the time domain position of the reserved resource indicated by the first sidelink control information and the second time domain position is greater than or equal to a second time interval; and the second time interval includes at least one of the following time lengths: a length of time required by the second terminal device to decode the resource conflict indication; a length of time required by the second terminal device to cancel transmission of the data and/or the control information on the reserved resource indicated by the first sidelink control information; a length of time required by the second terminal device to reselect the reserved resource; and a length of time required by the second terminal device to retransmit the control information and/or the data on the reserved resource.

In still another possible implementation, the determining a second time domain position based on a time domain position of a reserved resource indicated by the first sidelink control information includes: determining the second time domain position based on a third time interval and the time domain position of the reserved resource indicated by the first sidelink control information.

In still another possible implementation, the second time domain position belongs to a conflict indication time domain position set, and time domain positions in the conflict indication time domain position set are discretely distributed; and the second time domain position is a latest time domain position that is the third time interval before the time domain position of the reserved resource indicated by the first sidelink control information.

In still another possible implementation, the third time interval includes at least one of the following time lengths: the length of time required by the second terminal device to decode the resource conflict indication; the length of time required by the second terminal device to cancel transmission of the data and/or the control information on the reserved resource indicated by the first sidelink control information; the length of time required by the second terminal device to reselect the reserved resource; the length of time required by the second terminal device to retransmit the control information and/or the data on the reserved resource; and a length of time caused by discrete distribution of the time domain positions.

In still another possible implementation, an interval between the first time domain position and the second time domain position is greater than or equal to a fourth time interval; and the fourth time interval includes at least one of the following time lengths: the length of time required to determine that the resource corresponding to the first sidelink control information conflicts with the resource corresponding to the second sidelink control information; the length of time required to generate the resource conflict indication; and the length of time caused by discrete distribution of the time domain positions.

In still another possible implementation, the first sidelink control information is from the second terminal device; and a service priority of data scheduled by using the first sidelink control information is lower than a preset first priority threshold; a service priority of data scheduled by using the first sidelink control information is lower than a service priority of data scheduled by using the second sidelink control information; or a service priority of data scheduled by using the first sidelink control information is lower than a second priority threshold, where the second priority threshold is associated with signal quality and a service priority of data scheduled by using the second sidelink control information In still another possible implementation, a frequency domain resource at the third frequency domain position is located on a feedback channel, and the frequency domain resource at the third frequency domain position is orthogonal to a resource set that is used to feed back the indication and that is on the feedback channel.

In still another possible implementation, the determining a third frequency domain position based on a first frequency domain position of the first sidelink control information includes: determining a second resource block set based on the first frequency domain position of the first sidelink control information, and determining the third frequency domain position in the second resource block set, where the first sidelink control information and the data scheduled by using the first sidelink control information occupy one or more sub-channels; and the second resource block set is associated with a start sub-channel in the one or more sub-channels; or the second resource block set is associated with the one or more sub-channels.

In still another possible implementation, the determining a third frequency domain position based on a second frequency domain position of second sidelink control information includes: determining a second resource block set based on the second frequency domain position, and determining the third frequency domain position in the second resource block set, where the second sidelink control information and the data scheduled by using the second sidelink control information occupy one or more sub-channels; and the second resource block set is associated with a start sub-channel in the one or more sub-channels; or the second resource block set is associated with the one or more sub-channels.

In still another possible implementation, the determining a third frequency domain position based on a frequency domain position of the reserved resource indicated by the first sidelink control information includes: determining a second resource block set based on the frequency domain position of the reserved resource indicated by the first sidelink control information, and determining the third frequency domain position in the second resource block set, where the second frequency domain position is one or more sub-channels occupied by the reserved resource indicated by the first sidelink control information; and the second resource block set is associated with a start sub-channel in the one or more sub-channels; or the second resource block set is associated with the one or more sub-channels.

In still another possible implementation, a first resource block set includes $M_{PRB,set}^{RCI}$ PRBs, where $M_{PRB,set}^{RCI}$ indicates a quantity of PRBs used for RCI transmission in a resource pool.

In still another possible implementation, the second resource block set includes $R_{PRB}^{RCI}=M_{subch,slot}^{RCI} \cdot N_{type}^{RCI}$ or $R_{PRB}^{RCI}=M_{subch,slot}^{RCI}$ PRBs.

In still another possible implementation, the method further includes: determining, based on the second resource block set and a physical resource block PRB index, to use at least one PRB to transmit the resource conflict indication.

In still another possible implementation, a quantity of PRBs used for one resource conflict indication is $R_{PRB}^{RCI}=N_{type}^{RCI} \cdot M_{subch,slot}^{RCI}$.

In still another possible implementation, in combination with code domain information, a quantity of PRBs used for one resource conflict indication is $R_{PRB,CS}^{RCI}=N_{type}^{RCI} \cdot M_{subch,slot}^{RCI} \cdot N_{CS}^{RCI}$.

It should be noted that for content that is in the fourth aspect and that is the same as that in the first aspect, refer to the specific descriptions of the first aspect. Details are not described herein again.

According to a fifth aspect, a resource conflict indication transmission method is provided. The method includes: receiving a resource conflict indication at a second time domain position and/or a third frequency domain position, where the resource conflict indication indicates that a resource corresponding to first sidelink control information conflicts with a resource corresponding to second sidelink control information, and indicates to change a reserved resource indicated by the first sidelink control information, where the conflict includes a time domain conflict or a time-frequency conflict, the second time domain position is determined based on a first time domain position of the first sidelink control information or a time domain position of the reserved resource indicated by the first sidelink control information, and/or the third frequency domain position is determined based on a first frequency domain position of the first sidelink control information, a second frequency domain position of the second sidelink control information, or a frequency domain position of the reserved resource indicated by the first sidelink control information; and canceling, based on the resource conflict indication, transmission of data and/or control information on a resource on which the first sidelink control information is located, or reselecting the reserved resource.

In a possible implementation, the canceling, based on the resource conflict indication, transmission of data and/or control information on a resource on which the first sidelink control information is located, or reselecting a reserved resource includes at least one of the following: determining a fourth frequency domain position based on a second resource block set and a source identifier of the first sidelink control information, and if the fourth frequency domain position is consistent with the third frequency domain position, canceling, based on the resource conflict indication, transmission of the data and/or the control information on the resource on which the first sidelink control information is located, and reselecting the reserved resource; determining a first service priority corresponding to the third frequency domain position, and if a second service priority of data scheduled by using the first sidelink control information is higher than or equal to the first service priority, canceling, based on the resource conflict indication, transmission of the data and/or the control information on the resource on which the first sidelink control information is located, and reselecting the reserved resource; and determining a fifth frequency domain position based on the first time domain position or the first frequency domain position, and if the fifth frequency domain position is consistent with the third frequency domain position, canceling, based on the resource conflict indication, transmission of the data and/or the control information on the resource on which the first sidelink control information is located, and reselecting the reserved resource.

According to a sixth aspect, a resource conflict indication transmission method is provided. The method includes: receiving a resource conflict indication at a second time domain position and/or a third frequency domain position, where the resource conflict indication indicates that a resource corresponding to first sidelink control information conflicts with a resource corresponding to second sidelink control information, and indicates to send control information and/or data on a reserved resource, where the conflict includes a time domain conflict or a time-frequency conflict, the second time domain position is determined based on a first time domain position of the first sidelink control information or a time domain position of the reserved resource indicated by the first sidelink control information, and/or the third frequency domain position is determined based on a first frequency domain position of the first sidelink control information, a second frequency domain position of the second sidelink control information, or a frequency domain position of the reserved resource indicated by the first sidelink control information; and sending the control information and/or the data on the reserved resource based on the resource conflict indication.

In a possible implementation, the sending the control information and/or the data on the reserved resource based on the resource conflict indication includes at least one of the following: determining a fourth frequency domain position based on a second resource block set and a source identifier of service data scheduled by using the second sidelink control information, and if the fourth frequency domain position is consistent with the third frequency domain position, sending the control information and/or the data on the reserved resource based on the resource conflict indication; determining a first service priority corresponding to the third frequency domain position, and if a second service priority of data scheduled by using the second sidelink control information is higher than or equal to the first service priority, sending the control information and/or the data on the reserved resource based on the resource conflict indication; determining a fifth frequency domain position based on a slot index of the second sidelink control information or a sub-channel index of the second sidelink control information, and if the fifth frequency domain position is consistent with the third frequency domain position, sending the control information and/or the data on the reserved resource based on the resource conflict indication; and determining a sixth frequency domain position based on the first time domain position or the first frequency domain position, and if the sixth frequency domain position is consistent with the third frequency domain position, sending the control information and/or the data on the reserved resource based on the resource conflict indication.

In another possible implementation, the method further includes: obtaining a cast type field in the second sidelink control information; and the sending the control information and/or the data on the reserved resource based on the resource conflict indication includes: resending the control information and/or the data on the reserved resource based on the resource conflict indication if the cast type field indicates that a transmission type is broadcast or multicast.

With reference to any one of the first aspect to the sixth aspect or the possible implementations thereof, in still another possible implementation, the method further includes: receiving candidate resource type information, where the candidate resource type information indicates that the second resource block set is associated with the start sub-channel in the one or more sub-channels; or the candidate resource type information indicates that the second resource block set is associated with the one or more sub-channels.

With reference to any one of the first aspect to the sixth aspect or the possible implementations thereof, in still another possible implementation, the method further includes: further determining the second resource block set based on at least one of the following information: a first resource block set, resource period information of the resource conflict indication, or code domain information of the resource conflict indication, where the second resource block set belongs to the first resource block set.

With reference to any one of the first aspect to the sixth aspect or the possible implementations thereof, in still another possible implementation, the method further includes: receiving indication information, where the indication information indicates the first resource block set, and the first resource block set is orthogonal to the resource set used to feed back the indication.

With reference to any one of the first aspect to the sixth aspect or the possible implementations thereof, in still another possible implementation, the method further includes: determining the third frequency domain position in the second resource block set based on at least one of the following: the source identifier of the first sidelink control information, the source identifier of the second sidelink control information, the destination identifier of the first sidelink control information, the destination identifier of the second sidelink control information, the member identifier of the first sidelink control information, the member identifier of the second sidelink control information, the service priority of the data scheduled by using the first sidelink control information, the service priority of the data scheduled by using the second sidelink control information, the slot index of the first sidelink control information, the sub-channel index of the first sidelink control information, the first time domain position, or the first frequency domain position.

With reference to any one of the first aspect to the sixth aspect or the possible implementations thereof, in still another possible implementation, the method further includes: determining the third frequency domain position and/or a cyclic shift value associated with the resource conflict indication in the second resource block set based on at least one of the following: the source identifier of the first sidelink control information, the source identifier of the second sidelink control information, the destination identifier of the first sidelink control information, the destination identifier of the second sidelink control information, the member identifier of the first sidelink control information, the member identifier of the second sidelink control information, the service priority of the data scheduled by using the first sidelink control information, the service priority of the data scheduled by using the second sidelink control information, the slot index of the first sidelink control information, the sub-channel index of the first sidelink control information, the first time domain position or the first frequency domain position, a cyclic redundancy check (CRC) used to generate the first sidelink control information, and a CRC used to generate the second sidelink control information.

In the solutions of this application, the first terminal device may indicate a specific second terminal device with a resource conflict. For example, a resource conflict of a second terminal device sending the first sidelink control information is indicated based on the source identifier of the first sidelink control information, or a resource conflict of a third terminal device sending the second sidelink control information is indicated based on the source identifier of the first sidelink control information. The second terminal device may independently determine whether a resource conflict of the second terminal device is indicated. The second terminal device may further reselect the indicated resource based on the resource conflict indication.

With reference to any one of the first aspect to the sixth aspect or the possible implementations thereof, in still another possible implementation, the determining the third frequency domain position and/or a cyclic shift value associated with the resource conflict indication includes: determining the third frequency domain position and/or the cyclic shift value associated with the resource conflict indication by performing a modulo operation on any one of or a sum of any two or more of the source identifier of the first sidelink control information, the source identifier of the second sidelink control information, the destination identifier of the first sidelink control information, the destination identifier of the second sidelink control information, the member identifier of the first sidelink control information, the member identifier of the second sidelink control information, the service priority of the data scheduled by using the first sidelink control information, the service priority of the data scheduled by using the second sidelink control information, the slot index of the first sidelink control information, the sub-channel index of the first sidelink control information, the first time domain position or the first frequency domain position, the CRC used to generate the first sidelink control information, and the CRC used to generate the second sidelink control information; or determining, based on a frequency-domain code-domain resource index, the third frequency domain position and/or the cyclic shift value associated with the resource conflict indication and/or joint indication information of the third frequency domain position and the cyclic shift.

With reference to any one of the first aspect to the sixth aspect or the possible implementations thereof, in still another possible implementation, the determining the third frequency domain position and/or a cyclic shift value associated with the resource conflict indication includes: determining the third frequency domain position and/or the cyclic shift value associated with the resource conflict indication by performing a modulo operation on binary values/decimal values of all or some bits of any one of or a sum of any two or more of the source identifier of the first sidelink control information, the source identifier of the second sidelink control information, the destination identifier of the first sidelink control information, the destination identifier of the second sidelink control information, the member identifier of the first sidelink control information, the member identifier of the second sidelink control information, the service priority of the data scheduled by using the first sidelink control information, the service priority of the data scheduled by using the second sidelink control information, the slot index of the first sidelink control information, the sub-channel index of the first sidelink control information, the first time domain position or the first frequency domain position, the CRC used to generate the first sidelink control information, and the CRC used to generate the second sidelink control information; or determining, based on a frequency-domain code-domain resource index, the third frequency domain position and/or the cyclic shift value associated with the resource conflict indication.

With reference to any one of the first aspect to the sixth aspect or the possible implementations thereof, in still another possible implementation, the determining the third frequency domain position and/or a cyclic shift value associated with the resource conflict indication includes: determining the third frequency domain position and/or the cyclic shift value associated with the resource conflict indication by performing a modulo operation by using R (($\bullet$) mod R) on binary values/decimal values of all or some bits of any one of or a sum of any two or more of the source identifier of the first sidelink control information, the source identifier of the second sidelink control information, the destination identifier of the first sidelink control information, the destination identifier of the second sidelink control information, the member identifier of the first sidelink control information, the member identifier of the second sidelink control information, the service priority of the data scheduled by using the first sidelink control information, the service priority of the data scheduled by using the second sidelink control information, the slot index of the first sidelink control information, the sub-channel index of the first sidelink control information, the first time domain position or the first frequency domain position, the CRC used to generate the first sidelink control information, and the CRC used to generate the second sidelink control information, where R is a quantity of PRBs of the first resource block set, a quantity of PRBs of the second resource block set, or a quantity of frequency-domain code-domain resources; or determining, based on a frequency-domain code-domain resource index, the third frequency domain position and/or the cyclic shift value associated with the resource conflict indication.

With reference to any one of the first aspect to the sixth aspect or the possible implementations thereof, in still another possible implementation, the third frequency domain position is at least any one of the following: a frequency domain position of the first resource block set, and/or a frequency domain position of the second resource block set, and/or a frequency domain position of a PRB index.

In this embodiment of this application, the third frequency domain position may be a combination of two or three of the frequency domain position of the first resource block set, the frequency domain position of the second resource block set, and the frequency domain position of the PRB index.

With reference to any one of the first aspect to the sixth aspect or the possible implementations thereof, in still another possible implementation, the PRB index is an index value of the third frequency domain position in the first resource block set or second resource block set.

With reference to any one of the first aspect to the sixth aspect or the possible implementations thereof, in still another possible implementation, the cyclic shift value associated with the resource conflict indication is at least one of the following: a cyclic shift index and a cyclic shift value determined based on the cyclic shift index.

With reference to any one of the first aspect to the sixth aspect or the possible implementations thereof, in still another possible implementation, the cyclic shift index is at least any one of the following: an index of the cyclic shift value, an index of a cyclic shift pair, an index of a cyclic shift set, and a value of the cyclic shift value.

With reference to any one of the first aspect to the sixth aspect or the possible implementations thereof, in still another possible implementation, the cyclic shift value associated with the resource conflict indication is determined based on the cyclic shift index.

With reference to any one of the first aspect to the sixth aspect or the possible implementations thereof, in still another possible implementation, a value of the PRB index is an integer in $\{0, 1, 2, \ldots, R_{PRB}^{RCI}-1\}$, where $R_{PRB}^{RCI}$ is a quantity of PRBs included in the second resource block set.

With reference to any one of the first aspect to the sixth aspect or the possible implementations thereof, in still another possible implementation, a network configures or preconfigures a total quantity of cyclic shifts used for conflict indication. In still another possible implementation, the network configures the total quantity of cyclic shifts used for conflict indication by configuring or preconfiguring a quantity $N_{CS}^{RCI}$ of cyclic shifts, a quantity $N_{CSP}^{RCI}$ of cyclic shift pairs, or a quantity $N_{CSS}^{RCI}$ of cyclic shift sets.

With reference to any one of the first aspect to the sixth aspect or the possible implementations thereof, in still another possible implementation, a value of the cyclic shift index is an integer in $\{0, 1, 2, \ldots, N_{CS}^{RCI}-1\}$, $\{0, 1, 2, \ldots, N_{CSP}^{RCI}-1\}$, or $\{0, 1, 2, \ldots, N_{CS}^{RCI}-1\}$.

With reference to any one of the first aspect to the sixth aspect or the possible implementations thereof, in still another possible implementation, a value of the frequency-domain code-domain resource index is an integer in $\{0, 1, 2, \ldots, R_{PRB}^{RCI} \cdot N_{CS}^{RCI}-1\}$, $\{0, 1, 2, \ldots, R_{PRB}^{RCI} \cdot N_{CSP}^{RCI}-1\}$, $\{0, 1, 2, \ldots R_{PRB}^{RCI} \cdot N_{CSS}^{RCI}-1\}$, or $\{0, 1, \ldots, N_{PRB,CS}^{RCI}-1\}$.

With reference to any one of the first aspect to the sixth aspect or the possible implementations thereof, in still another possible implementation, the method further includes: obtaining a cast type field in the first sidelink control information and/or the second sidelink control information; and the sending a resource conflict indication to a second terminal device includes: sending the resource conflict indication to the second terminal device if the cast type field indicates that a transmission type is broadcast or multicast.

With reference to any one of the first aspect to the sixth aspect or the possible implementations thereof, in still another possible implementation, the method further includes: measuring a channel congestion degree of a resource pool; and the sending a resource conflict indication to a second terminal device includes: sending the resource conflict indication to the second terminal device if the channel congestion degree is less than or equal to a first threshold or the channel congestion degree is within a first preset range.

With reference to any one of the first aspect to the sixth aspect or the possible implementations thereof, in still another possible implementation, the sending a resource conflict indication to a second terminal device at the second time domain position and/or the third frequency domain position includes: sending, by a first terminal device, the resource conflict indication to the second terminal device at the second time domain position and/or the third frequency domain position, where the resource conflict indication further indicates preemption denial information, and the preemption denial information indicates, to the second terminal device, that the first terminal device indicates not to change the first reserved resource.

According to a seventh aspect, a resource conflict indication method is provided. The method includes: sending indication information, where the indication information indicates a first resource block set, and a frequency domain resource at a second frequency domain position corresponding to a resource conflict indication belongs to the first resource block set, where the first resource block set is orthogonal to a resource set used to feed back the indication.

In a possible implementation, the sending indication information includes: A network device sends the indication information, or preconfigures the indication information.

According to an eighth aspect, a resource conflict indication transmission method is provided. The method includes: receiving indication information, where the indication information indicates that sending of a first resource conflict indication is allowed and/or sending of a second resource conflict indication is allowed, the first resource conflict indication is sent before a resource conflict position, and the second resource conflict indication is sent after the resource conflict position; and sending the first resource conflict indication and/or the second resource conflict indication based on the indication information.

In a possible implementation, the first resource conflict indication is corresponding to a first sequence, and the second resource conflict indication is corresponding to a second sequence, where the first sequence and the second sequence are different cyclic shifts, the first sequence and the second sequence are different root sequences, or the first sequence and the second sequence are different orthogonal cover codes.

In another possible implementation, the first resource conflict indication is corresponding to first frequency domain information, the second resource conflict indication is corresponding to second frequency domain information, and the frequency domain information includes at least one of the following information: resource block set information and frequency domain index information.

In still another possible implementation, the first resource conflict indication is corresponding to a first resource block set, the second resource conflict indication is corresponding to a second resource block set, a first physical resource block set is located on a feedback channel, and/or a second physical resource block set is located on the feedback channel, where at least two of the first physical resource block set, the second physical resource block set, and a resource set that is used to feed back the indication and that is on the feedback channel are orthogonal.

In still another possible implementation, the first resource conflict indication and the second resource conflict indication include a first field, and the first field has different values in the first resource conflict indication and the second resource conflict indication.

In still another possible implementation, the first field includes a cyclic shift value or a cyclic shift index.

A ninth aspect provides a communication apparatus, configured to perform the method according to any one of the first aspect to the sixth aspect and the eighth aspect or the possible implementations of the first aspect to the sixth aspect and the eighth aspect. The communication apparatus may be a communication apparatus in any one of the first aspect to the sixth aspect and the eighth aspect or the possible implementations of the first aspect to the sixth aspect and the eighth aspect, or a module used in the communication apparatus, for example, a chip or a chip system. The communication apparatus includes a corresponding module, unit, or means for performing the method. The module, unit, or means may be implemented by using hardware or software, or may be implemented by using hardware executing corresponding software. The hardware or the software includes one or more modules or units corresponding to the foregoing functions.

For example, the communication apparatus further includes a memory. The memory is coupled to at least one processor. The at least one processor is configured to run program instructions stored in a memory, to enable the communication apparatus to perform the method according to any one of the first aspect to the sixth aspect and the eighth aspect or the possible implementations of the first aspect to the sixth aspect and the eighth aspect.

In a possible implementation, the memory is configured to store program instructions and data. The memory is coupled to the at least one processor. The at least one processor may invoke and execute the program instructions stored in the memory, to enable the communication apparatus to perform the method according to any one of the first aspect to the sixth aspect and the eighth aspect or the possible implementations of the first aspect to the sixth aspect and the eighth aspect.

For example, the communication apparatus further includes a communication interface. The communication interface is used by the communication apparatus to communicate with another device. When the communication apparatus is a terminal, the communication interface is a transceiver, an input/output interface, a circuit, or the like.

In a possible design, the communication apparatus includes at least one processor and a communication interface, configured to perform the method according to any one of the first aspect or the possible implementations of the first aspect. Specifically, the at least one processor communicates with outside through the communication interface. The at least one processor is configured to run a computer program, to enable the communication apparatus to perform the method according to any one of the first aspect to the sixth aspect and the eighth aspect or the possible implementations of the first aspect to the sixth aspect and the eighth aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any one of the first aspect to the sixth aspect and the eighth aspect or the possible implementations of the first aspect to the sixth aspect and the eighth aspect, refer to technical effects brought by any one of the first aspect to the sixth aspect and the eighth aspect or the possible implementations of the first aspect to the sixth aspect and the eighth aspect. Details are not described herein again.

A tenth aspect provides a communication apparatus, configured to perform the method according to any one of the seventh aspect or the possible implementations of the seventh aspect. The communication apparatus may be a communication apparatus in any one of the seventh aspect or the possible implementations of the seventh aspect, or a module used in the communication apparatus, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes one or more modules or units corresponding to the foregoing functions.

For example, the communication apparatus further includes a memory. The memory is coupled to at least one processor. The at least one processor is configured to run program instructions stored in the memory, to enable the communication apparatus to perform the method according to any one of the seventh aspect or the possible implementations of the seventh aspect.

In a possible implementation, the memory is configured to store program instructions and data. The memory is coupled to the at least one processor. The at least one processor may invoke and execute the program instructions stored in the memory, to enable the communication apparatus to perform the method according to any one of the seventh aspect or the possible implementations of the seventh aspect.

For example, the communication apparatus further includes a communication interface. The communication interface is used by the communication apparatus to communicate with another device. When the communication apparatus is the communication apparatus, the communication interface is a transceiver, an input/output interface, a circuit, or the like.

In a possible implementation, the communication apparatus includes at least one processor and a communication interface, configured to perform the method according to any one of the seventh aspect or the possible implementations of the seventh aspect. Specifically, the at least one processor is configured to communicate with outside through the communication interface. The at least one processor is configured to run a computer program, to enable the communication apparatus to perform the method according to any one of the seventh aspect or the possible implementations of the seventh aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design manner in the tenth aspect, refer to technical effects brought by different design manners in the seventh aspect. Details are not described herein again.

An eleventh aspect provides a sidelink communication system, including the communication apparatus according to any one of the ninth aspect or the implementations of the ninth aspect and the communication apparatus according to any one of the tenth aspect or the implementations of the tenth aspect.

According to a twelfth aspect, a computer-readable storage medium is provided. The computer-readable storage medium stores a computer program. When the computer program is run on a computer, the method according to any one of the foregoing aspects or the implementations of the foregoing aspects is performed.

According to a thirteenth aspect, a computer program product is provided. When the computer program product runs on a computer, the method according to any one of the foregoing aspects or the implementations of the foregoing aspects is performed.

According to a fourteenth aspect, a computer program product is provided. When the computer program product runs on a computer, the method according to any one of the foregoing aspects or the implementations of the foregoing aspects is performed.

DETAILED DESCRIPTION OF ILLUSTRATIVE EMBODIMENTS

Technical solutions in embodiments of this application may be applied to sidelink communication in various communication systems, for example, a long term evolution (LTE) system, an LTE frequency division duplex (FDD) system, an LTE time division duplex (TDD) system, an enhanced LTE (eLTE) system, a fifth generation (5G) communication system, or NR. A 5G mobile communication system in this application includes a non-standalone (NSA) 5G mobile communication system or a standalone (SA) 5G mobile communication system. The technical solutions provided in this application may be further applied to a future communication system, for example, a sixth generation mobile communication system. The communication system may alternatively be a public land mobile network (PLMN), a device-to-device (D2D) communication system, a machine-to-machine (M2M) communication system, an internet of things (IoT), a vehicle-to-everything communication system, or another communication system.

Terminal devices performing sidelink communication may cooperate with each other. A specific cooperation process is as follows: An auxiliary terminal first determines one group of resource sets, and the auxiliary terminal includes the resource sets in assistance information and sends the assistance information to a transmit terminal. When selecting a transmission resource, the transmit terminal considers the resource sets, and the transmit terminal may perform sidelink communication with a receive terminal on the resource sets. The auxiliary terminal may be the receive terminal, or may not be the receive terminal. In the cooperation process, the auxiliary terminal needs to carry a part of a function of performing resource sensing for the transmit terminal. Further, if the auxiliary terminal senses a resource conflict between at least two transmit terminals, the auxiliary terminal may indicate that a resource conflict occurs in the at least two transmit terminals or one of the at least two transmit terminals.

Figure 1A:
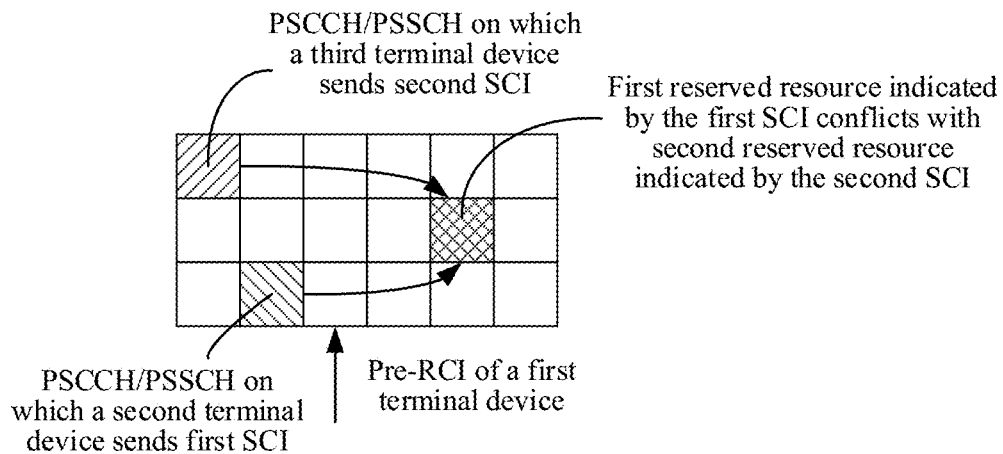
FIG. 1a is a schematic diagram of a pre-RCI and FIG. 1b is a schematic diagram of a post-RCI, according to an embodiment of this application.
Figure 1B:
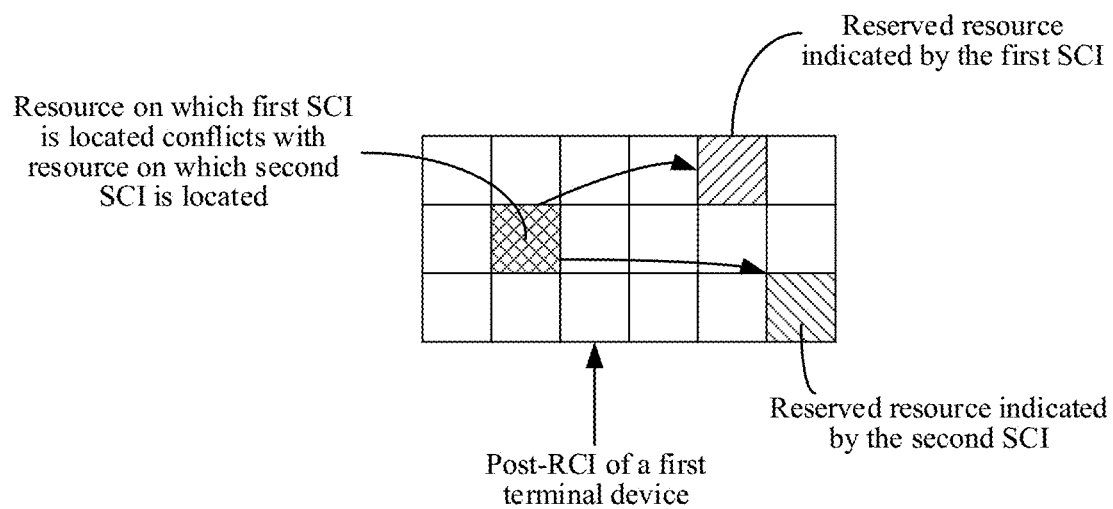

A resource conflict indication may be classified into two types: a pre-RCI and a post-RCI. FIG. 1a is a schematic diagram of the pre-RCI. A first terminal device detects that a first reserved resource indicated by first sidelink control information (SCI) may conflict with a reserved resource indicated by second SCI, and therefore indicates the conflict before a conflict position. FIG. 1b is a schematic diagram of the post-RCI. The first terminal device sends a conflict indication after a detected position at which a resource conflict (where a resource on which the first SCI is located conflicts with a resource on which the second SCI is located) has occurred. That is, the pre-RCI may indicate a future resource conflict that has not occurred yet, and the post-RCI may indicate a past resource conflict that has occurred.

Figure 2:
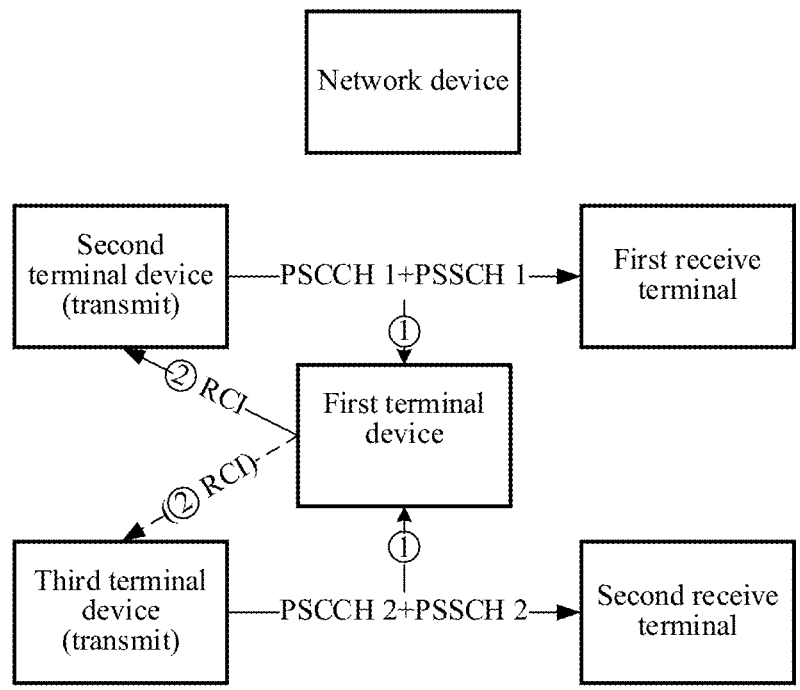
FIG. 2 is a schematic diagram of a sidelink communication system that is optionally applicable to an embodiment of this application.

FIG. 2 is a schematic diagram of a sidelink communication system that is optionally applicable to an embodiment of this application. In the communication system, it is assumed that sidelink communication is performed in mode 2, and a network device configures some pieces of information by using signaling, but does not perform scheduling.

A first terminal device is an auxiliary terminal device, monitors a physical sidelink control channel (PSCCH) 1 and a physical sidelink shared channel (PSSCH) 1 of a second terminal device, and monitors a PSCCH 2 and a PSSCH 2 of a third terminal device. The PSCCH 1 carries first SCI, and the PSCCH 2 carries second SCI. The SCI indicates one or more reserved resources. The first terminal device may be a third-party terminal device, or may be one terminal device (for example, the second terminal device or the third terminal device) in transmit terminal devices, or may be one terminal device (for example, a first receive terminal or a second receive terminal) in receive terminal devices. The first receive terminal is a receive terminal of the second terminal device. The second receive terminal is a receive terminal of the third terminal device. The first terminal device receives and decodes SCI sent by at least two transmit terminals. If reserved resources conflict (where all or some of the resources conflict), the first terminal device sends an RCI to notify one transmit terminal or the at least two transmit terminals. Specifically, there are the following two cases: When determining that a reserved resource indicated by the first SCI conflicts with a reserved resource indicated by the second SCI, the first terminal device sends the RCI to the second terminal device and/or the third terminal device at a determined time domain and/or frequency domain position before a conflict position. When determining that a resource on which the first SCI is located conflicts with a resource on which the second SCI is located, the first terminal device sends the RCI to the second terminal device and/or the third terminal device at a determined time domain and/or frequency domain position after the conflict position.

The conflict may be overlapping, a collision, or a conflict. This is not limited in this application.

The resource conflict indication (RCI) may also be referred to as a resource collision indication, a resource overlapping indication, or the like. This is not limited in this application. The resource conflict indication may be sent after a resource that has collided. For ease of description, the resource conflict indication is denoted as a post-RCI in this application, and may also be referred to as a post-collision indication, a post-conflict, or a post-overlapping indication. This is not limited in this application. The resource conflict indication may alternatively be sent before a resource may conflict. For ease of description, the resource conflict indication is denoted as a pre-RCI in this application, and may also be referred to as a pre-collision indication, a pre-conflict indication, or a pre-overlapping indication. This is not limited in this application.

The SCI may indicate the reserved resource by using three fields: a frequency resource assignment, a time resource assignment, and a resource reservation period. The reserved resource is used for retransmission and/or periodic transmission. The frequency resource assignment includes time domain information of the configured reserved resource, and the time resource assignment includes frequency domain information and sub-channel information of the configured reserved resource. The frequency resource assignment and the time resource assignment include a parameter sl-MaxNumPerReserve, indicating a maximum quantity of reserved resources. One or more reserved resources are resources used for retransmission. The $1^{st}$ reserved resource is a resource on which the SCI is currently sent, and remaining sl-MaxNumPerReserve-1 reserved resources are resources reserved for retransmission. The resources may alternatively be reserved in a chain manner by using the SCI. To be specific, one SCI indicates sl-MaxNumPerReserve resource, the $1^{st}$ resource is a resource on which the SCI is currently sent, and remaining sl-MaxNumPerReserve-1 reserved resources are resources reserved for retransmission. Alternatively, the terminal device may periodically reserve sl-MaxNumPerReserve resources based on the resource reservation period field.

The second terminal device/the third terminal device is a transmit terminal, and monitors the RCI of the first terminal device. A scenario is not limited to only two transmit terminals. Actually, a plurality of transmit terminals may be reserved on a same resource, or resources on which a plurality of transmit terminals sending the RCI are located may conflict. In addition, if the auxiliary terminal device is the second terminal device, the auxiliary terminal device may send the RCI to indicate the third terminal device to change a transmission resource, or indicate the auxiliary terminal device to change a transmission resource.

In the receive terminals, the first receive terminal receives the PSCCH 1 and the PSSCH 1 from the second terminal device, and the second receive terminal receives the PSCCH 2 and the PSSCH 2 from the third terminal device. A scenario in this application is not limited to unicast. To be specific, a link between the transmit terminal and the receive terminal may be unicast, multicast, or broadcast. If the auxiliary terminal is the first receive terminal, the auxiliary terminal may indicate a transmit terminal of the auxiliary terminal to change a transmission resource, or may indicate a transmit terminal that interferes with sending by the auxiliary terminal to change a transmission resource. If the auxiliary terminal is the first receive terminal, the auxiliary terminal may indicate the transmit terminal (for example, the second terminal device) of the auxiliary terminal to change the transmission resource, or may indicate the transmit terminal (for example, the third terminal device) that interferes with sending by the auxiliary terminal to change the transmission resource.

A sequence (for example, a cyclic shift associated with the resource conflict indication in embodiments of this application) is generated by performing cyclic shift on a base sequence. Different cyclic shifts may be performed on a base sequence to generate different sequences. A root sequence number is used to generate a base sequence. The root sequence number may also be referred to as a root sequence index, and the base sequence may also be referred to as a root sequence. A low peak to average power ratio (low-PAPR) sequence $r_u^\alpha(n)$ is used as an example below for description.

The sequence $r_u^\alpha(n)$ may be defined by using a cyclic shift $\alpha$ of a base sequence $\bar{r}_u(n)$ according to the following formula (I):

$$r_u^\alpha(n) = e^{j\alpha n} \bar{r}_u(n), 0 \leq n \leq M_{ZC} \qquad (I).$$

In the formula (I), $\bar{r}_u(n)$ represents the base sequence, $M_{ZC}$ represents a length of the base sequence, and the cyclic shift $\alpha$ in the formula (I) may be described by using formula (II):

$$\alpha = \frac{2\pi}{N_{CS}}(m_{CS} \bmod N_{cs}). \qquad (II)$$

In the formula (II), $m_{CS}$ is a cyclic shift value in a length $N_{CS}$. Optionally, $m_{CS}$ may also be referred to as a cyclic shift value of the sequence.

The base sequence $\bar{r}_u(n)$ may be a ZC sequence. Assuming that the length $M_{ZC}$ of the ZC sequence is equal to $\bar{r}_u(n)$ may be represented by using formula (III):

$$\bar{r}_u(n) = e^{j\phi(n)\pi/4}, 0 \leq n \leq M_{ZC} - 1 \qquad (III).$$

The following Table 1 shows values of u and φ(n) in formula (III) when $M_{ZC}$ is equal to 12. u may be referred to as a root sequence number of the base sequence $\bar{r}_u(n)$.

TABLE 1

| u | φ(0), ..., and φ(11) | | | | | | | | | | | |
|---|---|---|---|---|---|---|---|---|---|---|---|---|
| 0 | −3 | 1 | −3 | −3 | −3 | 3 | −3 | −1 | 1 | 1 | 1 | −3 |
| 1 | −3 | 3 | 1 | −3 | 1 | 3 | −1 | −1 | 1 | 3 | 3 | 3 |
| 2 | −3 | 3 | 3 | 1 | −3 | 3 | −1 | 1 | 3 | −3 | 3 | −3 |
| 3 | −3 | −3 | −1 | 3 | 3 | 3 | −3 | 3 | −3 | 1 | −1 | −3 |
| 4 | −3 | −1 | −1 | 1 | 3 | 1 | 1 | −1 | 1 | −1 | −3 | 1 |
| 5 | −3 | −3 | 3 | 1 | −3 | −3 | −3 | −1 | 3 | −1 | 1 | 3 |
| 6 | 1 | −1 | 3 | −1 | −1 | −1 | −3 | −1 | 1 | 1 | 1 | −3 |
| 7 | −1 | −3 | 3 | −1 | −3 | −3 | −3 | −1 | 1 | −1 | 1 | −3 |
| 8 | −3 | −1 | 3 | 1 | −3 | −1 | −3 | 3 | 1 | 3 | 3 | 1 |
| 9 | −3 | −1 | −1 | −3 | −3 | −1 | −3 | 3 | 1 | 3 | −1 | −3 |
| 10 | −3 | 3 | −3 | 3 | 3 | −3 | −1 | −3 | 3 | 3 | 1 | −3 |
| 11 | −3 | −1 | −3 | −1 | −1 | −3 | 3 | 3 | −1 | −1 | 1 | −3 |
| 12 | −3 | −1 | 3 | −3 | −3 | −1 | −3 | 1 | −1 | −3 | 3 | 3 |
| 13 | −3 | 1 | −1 | −1 | 3 | 3 | −3 | −1 | −1 | −3 | −1 | −3 |
| 14 | 1 | 3 | −3 | 1 | 3 | 3 | 3 | 1 | −1 | 1 | −1 | 3 |
| 15 | −3 | 1 | 3 | −1 | −1 | −3 | −3 | −1 | −1 | 3 | 1 | −3 |
| 16 | −1 | −1 | −1 | −1 | 1 | −3 | −1 | 3 | 3 | −1 | −3 | 1 |
| 17 | −1 | 1 | 1 | −1 | 1 | 3 | 3 | −1 | −1 | −3 | 1 | −3 |
| 18 | −3 | 1 | 3 | 3 | −1 | −1 | −3 | 3 | 3 | −3 | 3 | −3 |
| 19 | −3 | −3 | 3 | −3 | −1 | 3 | 3 | 3 | −1 | −3 | 1 | −3 |
| 20 | 3 | 1 | 3 | 1 | 3 | −3 | −1 | 1 | 3 | 1 | −1 | −3 |
| 21 | −3 | 3 | 1 | 3 | −3 | 1 | 1 | 1 | 1 | 3 | −3 | 3 |
| 22 | −3 | 3 | 3 | 3 | −1 | −3 | −3 | −1 | −3 | 1 | 3 | −3 |
| 23 | 3 | −1 | −3 | 3 | −3 | −1 | 3 | 3 | 3 | −3 | −1 | 3 |
| 24 | −3 | −1 | 1 | −3 | 1 | 3 | 3 | 3 | −1 | −3 | 3 | 3 |
| 25 | −3 | 3 | 1 | −1 | 3 | 3 | −3 | 1 | −1 | 1 | −1 | 1 |
| 26 | −1 | 1 | 3 | −3 | 1 | −1 | 1 | −1 | −1 | −3 | 1 | −1 |
| 27 | −3 | −3 | 3 | 3 | 3 | −3 | −1 | 1 | −3 | 3 | 1 | −3 |
| 28 | 1 | −1 | 3 | 1 | 1 | −1 | −1 | −1 | 1 | 3 | −3 | 1 |
| 29 | −3 | 3 | −3 | 3 | −3 | −3 | 3 | −1 | −1 | 1 | 3 | −3 |

$$m_0 = a^*(N_{SC}^{RB} \cdot (2x_c/N_{CS}^{PSFCH})) \qquad (0\text{-}1),$$

$$m_0 = a^* \text{floor}(N_{SC}^{RB} \cdot (2x_r/N_{CS}^{PSFCH})) \qquad (0\text{-}2), \text{ and}$$

$$x_n = (K + Mi) \bmod R_{RB,CS}^{PSFCH}) \bmod N_{CS}^{PSFCH} \qquad (0\text{-}3).$$

In the foregoing formulas, a is an integer, for example, 0, 1, or 2; floor( ) represents rounding down of an input variable; $x_n$ is an intermediate variable; $N_{SC}^{RB}$ is a predefined or configured value, for example, 12; $R_{RB,CS}^{PSFCH}$ is a total quantity of all frequency domain RBs and/or a total quantity of frequency domain RBs and sequence cyclic shifts in one feedback resource set; and $R_{RB}^{PSFCH}$ is a quantity of cyclic shift pairs configured on a sidelink feedback channel PSFCH, for example, 1, 2, 3, 4, or 6.

Optionally, Mi is an identifier of a receive data channel, and the identifier may be indicated in an upper-layer protocol (is the identity of the UE receiving the PSSCH as indicated by higher layers).

In addition, $m_0$ in the foregoing formulas is a first cyclic shift value, and $m_{cs}$ is a second cyclic shift value. A value $\alpha_i$ of the cyclic shift may be determined by using $m_0$ and $m_{cs}$. For example, $\alpha_i$ is equal to $(m_0 + m_{cs})$. For another example, $\alpha_i$ is determined according to the following formula (0-4):

$$\alpha_l = \frac{2\pi}{N_{SC}^{RB}}\left((m_0 + m_{cs} + n_{cs}(n_{sf'}^\mu l + l')) \bmod N_{SC}^{RB}\right). \qquad (0\text{-}4)$$

Any one of a cyclic shift, a cyclic shift value, a cyclic shift index, a cyclic shift pair index, or a cyclic shift set index associated with the resource conflict indication determined in embodiments of this application may be the first cyclic shift value $m_0$, the second cyclic shift value $m_{cs}$, or the cyclic shift $\alpha$ in the foregoing formulas.

Optionally, the terminal device in embodiments of this application may be an access terminal, a subscriber unit, a subscriber station, a mobile station, a mobile console, a relay station, a remote station, a remote terminal, a mobile device, a user terminal, a terminal device, a terminal, a wireless communication device, a user agent, a user apparatus, a cellular phone, a cordless phone, a session initiation protocol (SIP) phone, a wireless local loop (WLL) station, a personal digital assistant (PDA), a handheld device or computing device that has a wireless communication function, another processing device connected to a wireless modem, a vehicle-mounted device, a wearable device, a terminal in a future 5G network, a terminal device in a future evolved PLMN, or a terminal device in a future internet of vehicles. This is not limited in embodiments of this application.

By way of example rather than limitation, in embodiments of this application, the terminal device may be a mobile phone, a tablet computer, a computer having a wireless transceiver function, a virtual reality terminal, an augmented reality terminal, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like.

By way of example, and not limitation, in embodiments of this application, the wearable device may alternatively be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus only on one type of application function and may work with other devices such as smartphones, for example, various smart bands or smart jewelry for monitoring physical signs.

In addition, in embodiments of this application, the terminal device may alternatively be a terminal in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow band (NB) technology.

In addition, in embodiments of this application, the terminal device may further include a sensor, for example, an intelligent printer, a train detector, or a gas station. Main functions of the terminal device include collection of data (by some terminals), reception of control information and downlink data from a network device, sending of an electromagnetic wave, and transmission of uplink data to the network device.

Optionally, the network device in embodiments of this application may be any communication device that has a wireless transceiver function and that is configured to communicate with the terminal device. The network device includes but is not limited to: an evolved NodeB (eNB), a baseband unit (BBU), an access point (AP) in a wireless fidelity (Wi-Fi) system, a wireless relay node, a wireless backhaul node, a transmission point (TP), a transmission reception point (TRP), and the like. Alternatively, the network device may be a gNB, a TRP, or a TP in a 5G system, or one antenna panel or a group of antenna panels (including a plurality of antenna panels) of a base station in the 5G system. In addition, the network device may alternatively be a network node included in a gNB or a TP, for example, a BBU or a distributed unit (DU).

In some deployments, the gNB may include a central unit (CU) and a DU. In addition, the gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical layer (PHY). The AAU implements some physical layer processing functions, radio frequency processing, and a function related to an active antenna. Information at the RRC layer eventually becomes information at the PHY layer, or is converted from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node.

Optionally, the network device and the terminal device in embodiments of this application may communicate with each other by using a licensed spectrum, may communicate with each other by using an unlicensed spectrum, or may communicate with each other by using both the licensed spectrum and the unlicensed spectrum. The network device and the terminal device may communicate with each other by using a spectrum below 6 gigahertz (GHz), may communicate with each other by using a spectrum above 6 GHz, or may communicate with each other by using both the spectrum below 6 GHz and the spectrum above 6 GHz. A spectrum resource used between the network device and the terminal device is not limited in embodiments of this application.

Optionally, the terminal device or the network device in embodiments of this application may be deployed on land, and include an indoor, outdoor, handheld, or vehicle-mounted device; may be deployed on water; or may be deployed on an airplane, a balloon and a satellite in the air. Application scenarios of the terminal device or the network device are not limited in embodiments of this application.

Optionally, in embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program in the terminal device or the network device.

In other words, in embodiments of this application, related functions of the terminal device or the network device may be implemented by one device, may be jointly implemented by a plurality of devices, or may be implemented by one or more functional modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 3:
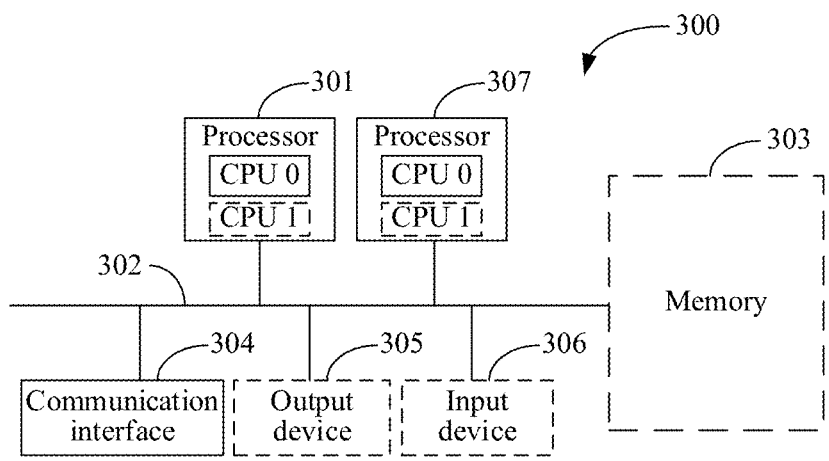
FIG. 3 is a schematic diagram of a structure of a communication apparatus according to an embodiment of this application.

For example, the related functions of the terminal device or the network device in embodiments of this application may be implemented by a communication apparatus 300 in FIG. 3. FIG. 3 is a schematic diagram of a structure of a communication apparatus 300 according to an embodiment of this application. The communication apparatus 300 includes one or more processors 301 and 307, a communication line 302, and at least one communication interface (where FIG. 3 is described merely by using an example in which the communication apparatus includes a communication interface 304). Optionally, the communication apparatus 300 may further include a memory 303.

The processor 301 may be a CPU, a microprocessor, an application-specific integrated circuit (ASIC), or one or more integrated circuits for controlling program execution of the solutions of this application.

The communication line 302 may include a path used to connect different components.

The communication interface 304 may be a transceiver module, configured to communicate with another device or a communication network, for example, an Ethernet, a radio access network (RAN), or a wireless local area network (WLAN). For example, the transceiver module may be an apparatus such as a transceiver or a transceiver machine. Optionally, the communication interface 304 may alternatively be a transceiver circuit located inside the processor 301, and is configured to implement signal input and signal output of the processor.

The memory 303 may be an apparatus having a storage function. For example, the memory 303 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile optical disc, a Blue-ray optical disc, or the like), a magnetic disk storage medium or another magnetic storage device, or any other medium capable of carrying or storing expected program code in a form of instructions or a data structure and capable of being accessed by a computer, but is not limited thereto. The memory may exist independently, and is connected to the processor through the communication line 302. The memory may alternatively be integrated with the processor.

The memory 303 is configured to store computer-executable instructions for performing the solutions in this application, and the processors 301 and 307 control execution. The processors 301 and 307 are configured to execute the computer-executable instructions stored in the memory 303, to implement a resource conflict indication method provided in embodiments of this application.

Alternatively, in embodiments of this application, the processors 301 and 307 may implement a processing-related function in the resource conflict indication method provided in the following embodiments of this application, and the communication interface 304 may be responsible for communicating with the another device or the communication network. This is not specifically limited in embodiments of this application.

The computer-executable instructions in embodiments of this application may alternatively be referred to as application code. This is not specifically limited in embodiments of this application.

During specific implementation, in an embodiment, the processors 301 and 307 each may include one or more CPUs. For example, in FIG. 3, the processor 301 includes a CPU 0 and a CPU 1, and the processor 307 includes a CPU 0 and a CPU 1.

During specific implementation, in an embodiment, the communication apparatus 300 may include a plurality of processors, for example, the processors 301 and 307 in FIG. 3. Each of the processors may be a single-core (single-CPU) processor, or a multi-core (multi-CPU) processor. The processor herein may be one or more devices, circuits, and/or processing cores configured to process data (for example, computer program instructions).

During specific implementation, in an embodiment, the communication apparatus 300 may further include an output device 305 and an input device 306. The output device 305 communicates with the processor 301, and may display information in a plurality of manners.

The communication apparatus 300 may be a general-purpose apparatus or a dedicated apparatus. For example, the communication apparatus 300 may be a desktop computer, a portable computer, a network server, a palmtop computer (personal digital assistant, PDA), a mobile phone, a tablet computer, a wireless terminal, an embedded device, or a device having a structure similar to that in FIG. 3. A type of the communication apparatus 300 is not limited in embodiments of this application.

Figure 4:
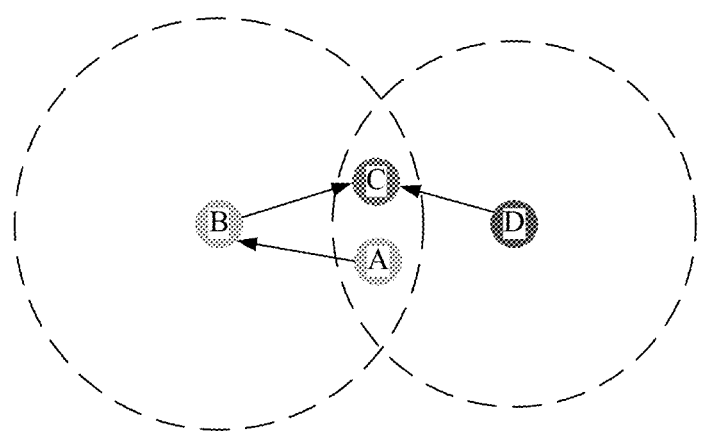
FIG. 4 is a schematic diagram of a sidelink communication scenario according to an embodiment of this application.

In a specific scenario, for example, FIG. 4 is a schematic diagram of a scenario of sidelink communication. A dotted coil corresponding to a terminal device is a receiving range of the terminal device at a center position of the circle. To be specific, the terminal device can sense resource usage within the range, and select a resource based on the resource usage. A terminal device B (a transmit terminal) sends sidelink data to a terminal device C (a receive terminal) by using a resource 1. At the same time, a terminal device D that is outside the sensing range of the terminal device B also sends sidelink information to the terminal device C by using the resource 1. Because both the terminal device B and the terminal device D are beyond the sensing range of each other, the terminal device B and the terminal device D do not know that both the terminal device B and the terminal device D send the sidelink data to the terminal device C by using the resource 1. This results in a resource conflict. To be specific, terminal device C cannot successfully decode data from the terminal device B and the terminal device D. The terminal device D is referred to as a hidden node. More specifically, the terminal device D is referred to as the hidden node of a link on which the terminal device B communicates with the terminal device C.

In this case, the terminal device B and the terminal device D may reserve a same resource for SL transmission. To avoid a conflict, a first terminal device may indicate one of the terminal devices to change a transmission resource. It should be noted that the first terminal device may be the terminal device C, or may not be the terminal device C. Alternatively, the first terminal device may be one of the terminal device B or the terminal device D. To be specific, the first terminal device may be a third-party terminal device, another transmit terminal device, or a receive terminal device.

In addition, in a half-duplex SL scenario, sending and receiving by the terminal device may be determined based on occupation of different time periods or occupation of different frequencies. For example, different time periods are occupied in half-duplex. The terminal device performs receiving within a period of time, and performs sending within another period of time. This causes a problem: The terminal device cannot perform receiving when sending data, and therefore cannot sense a channel status. Consequently, the terminal device cannot perform resource exclusion based on a sensed status. A current solution is as follows: If the terminal device cannot perform receiving in a slot n, the terminal device periodically excludes resources in all slots within a resource selection window based on all periods configured in a resource pool.

Currently, an RCI may be provided before or after a conflict, but there is no clear solution for sending and receiving the RCI.

This application provides a resource conflict indication solution. When determining that a reserved resource indicated by first SCI conflicts with a reserved resource indicated by second SCI, a first terminal device sends an RCI to a second terminal device at a determined time domain and/or frequency domain position before a conflict position; or when determining that a resource corresponding to first SCI conflicts with a resource corresponding to second SCI, a first terminal device sends an RCI to a second terminal device at a determined time domain and/or frequency domain position after a conflict position. The RCI is sent at the determined time domain and/or frequency domain position, so that reliability of RCI transmission is improved.

It may be noted that names of messages between network elements, names of parameters in the messages, or the like in following embodiments of this application are merely examples, and there may alternatively be other names in a specific implementation. This is not specifically limited in embodiments of this application.

The following describes in detail the resource conflict indication method provided in embodiments of this application with reference to the accompanying drawings.

There are three resource conflict cases.

In a first case, time domain resources conflict (or some time domain resources conflict) and frequency domain resources do not conflict, or frequency domain resources on a same time domain resource do not overlap. This case mainly occurs in a half-duplex scenario. Due to a limitation that for an antenna, receiving cannot be performed in a sending slot and sending cannot be performed in a receiving slot, the terminal device cannot monitor each slot within a resource sensing window. For example, both the second terminal device and the third terminal device send data 1 and data 2 in a slot 1. As a result, the third terminal device cannot receive the data 1 sent by the second terminal device. Alternatively, both the second terminal device and the first terminal device send the data 1 and the data 2 in the slot 1. As a result, the first terminal device cannot receive the data 1 sent by the second terminal device.

In a second case, all time-frequency resources conflict (or some time-frequency resources conflict), or frequency domain resources on a same time domain resource completely overlap or partially overlap. This case is a traditional resource conflict. The second terminal device reserves a resource 1. If the third terminal device also uses a part or all of the resource 1 to send data, a receive terminal device cannot correctly demodulate data on the resource.

In a third case, frequency domain resources conflict (or some frequency domain resources conflict) and time domain resources do not conflict, or time domain resources on a same frequency domain resource do not overlap. During sending and receiving in an FDD scenario, a problem similar to that in the first case is caused. Due to a limitation that for the antenna cannot, receiving cannot be performed in a transmit frequency band and sending cannot be performed in a receive frequency band, the terminal device cannot monitor each frequency band within the resource sensing window. For example, both the second terminal device and the third terminal device send the data 1 and data 2 in a frequency band 1. As a result, the third terminal device cannot receive the data 1 sent by the second terminal device.

Optionally, the resource conflict may further include a sending conflict and/or a sending and receiving conflict.

Optionally, the sending conflict includes that transmissions by two different devices overlap on a time domain resource and/or a frequency domain resource.

Optionally, the first terminal device performs sending on a first time domain resource, and the second terminal device performs receiving on the first time domain resource. Optionally, this conflict is commonly referred to as a half-duplex problem or a half-duplex conflict.

Figure 5A:
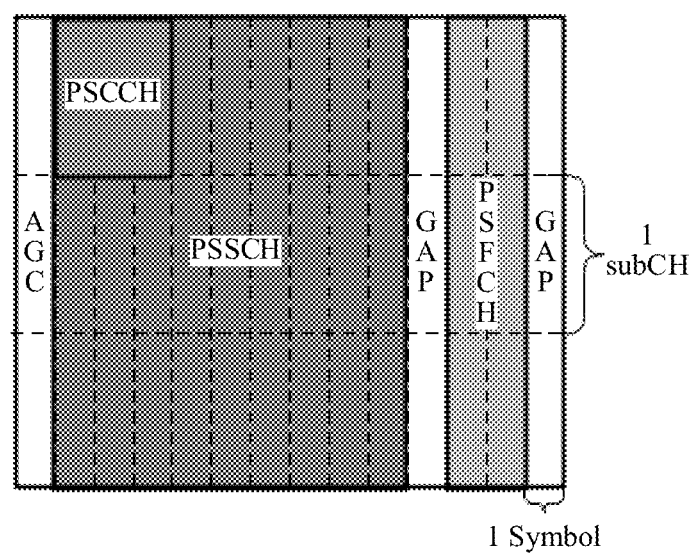
FIG. 5a is a schematic diagram of a relationship between time-frequency resources occupied by a PSCCH, a PSSCH, and/or a PSFCH when there is a feedback channel.
Figure 5B:
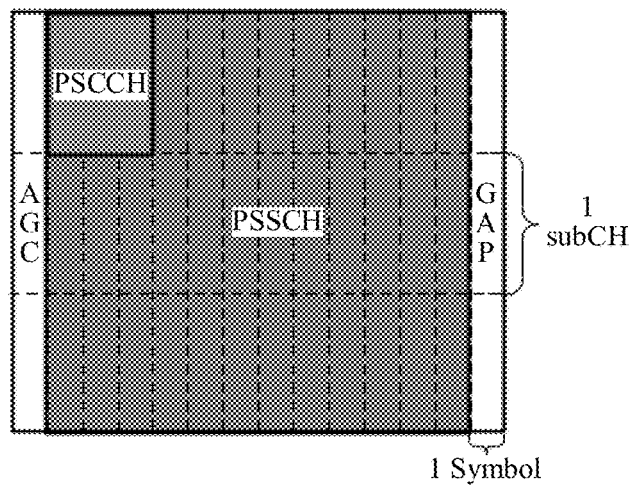
FIG. 5b is a schematic diagram of a relationship between time-frequency resources occupied by a PSCCH, a PSSCH, and/or a PSFCH when there is no feedback channel, according to an embodiment of this application.

In this application, "resource" in the resource conflict indicates resources occupied by a PSCCH and a PSSCH. FIG. 5a is a schematic diagram of a relationship between time-frequency resources occupied by a PSCCH, a PSSCH, and/or a PSFCH when there is a feedback channel, and FIG. 5b is a schematic diagram of a relationship between time-frequency resources occupied by a PSCCH, a PSSCH, and/or a PSFCH when there is no feedback channel. The PSCCH and the PSSCH are on one time-frequency resource. The PSCCH carries first-order SCI, and the PSSCH carries second-order SCI, a media access control control element (MAC CE), and data. As shown in FIG. 5a, in a slot with the PSFCH, the PSFCH is located on the $11^{th}$, $12^{th}$, and $13^{th}$ symbols. A start position of the PSCCH in frequency domain is a start PRB of the PSSCH, and occupies a maximum of one sub-channel in frequency domain. The PSSCH may occupy one or more sub-channels. Optionally, the start PRB includes a PRB with a smallest PRB index.

A time domain resource includes a symbol, a slot, a mini-slot, a subframe, a radio frame, and the like. A frequency domain resource includes a resource element (RE), a resource block (RB), a sub-channel, a resource pool, a bandwidth part (BWP), a carrier, and the like.

Figure 6A:
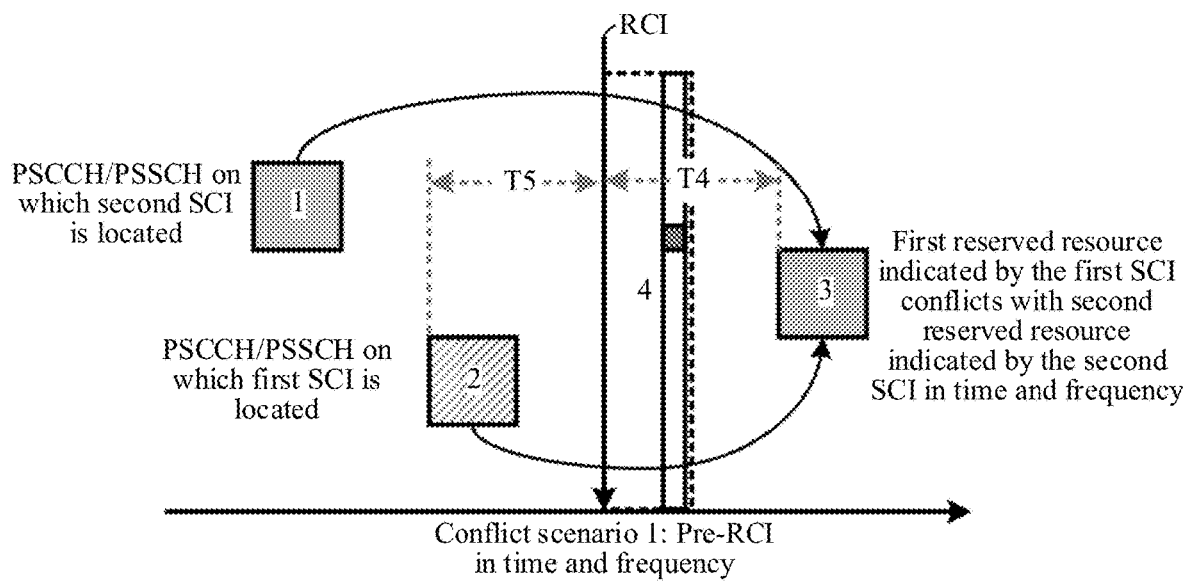
FIG. 6a to FIG. 6c each are a schematic diagram of a scenario in which a pre-RCI is performed during a time domain conflict or a time-frequency conflict according to an example of an embodiment of this application.
Figure 6B:
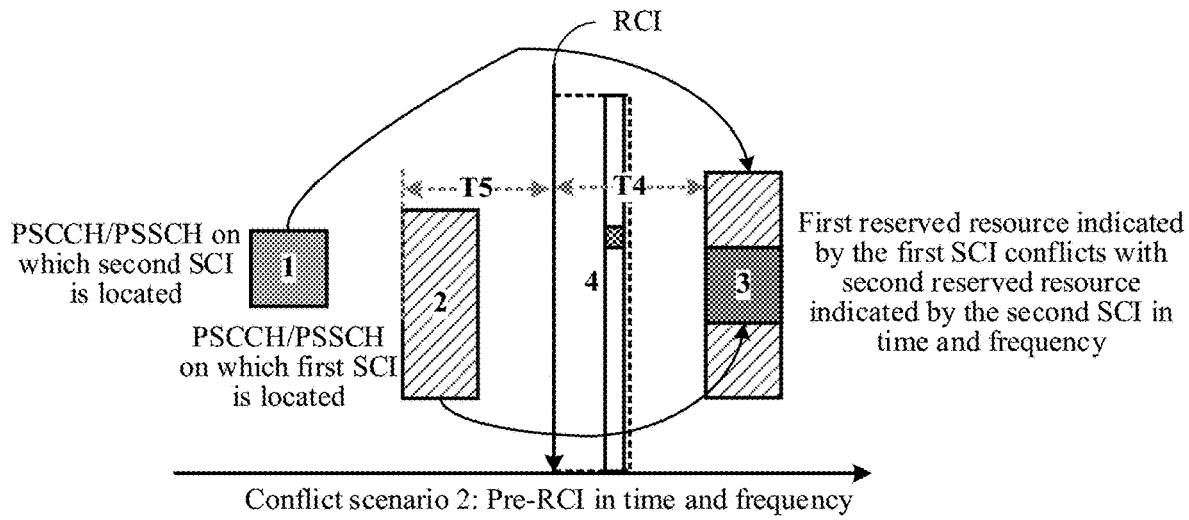
Figure 6C:
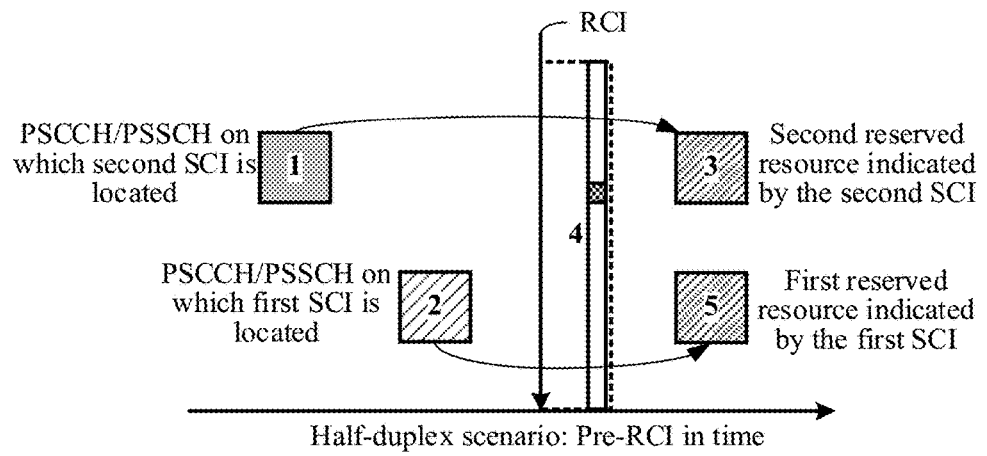

FIG. 6a to FIG. 6c are schematic diagrams of possible pre-RCI scenarios with different resource conflict cases. A horizontal axis is a time domain, and a unit in the figure is a slot. A vertical axis is a frequency domain, and a unit in the figure is a sub-channel.

FIG. 6a shows a conflict scenario 1. A block 2 (referred to as "R2") shows first SCI sent by the second terminal device, the first SCI indicates a first reserved resource (a block (referred to as "R3")), and the first terminal device receives the first SCI. A block 1 (referred to as "R1") shows second SCI sent by the third terminal device, the second SCI indicates a second reserved resource (as shown in the block 3), and the first terminal device receives the second SCI. A time-frequency conflict occurs between the first reserved resource and the second reserved resource. To be specific, the first reserved resource and the second reserved resource have a same time domain position (corresponding to a first time domain position), and a first frequency domain position of the first reserved resource completely overlaps with a second frequency domain position of the second reserved resource. The first terminal device sends an RCI to the second terminal device or the third terminal device before a conflict position (that is, before R3). Specifically, a resource of the RCI is located in a slot in which a block 4 (referred to as "R4") is located, and a frequency domain position is determined based on a frequency domain position of the first SCI, the first frequency domain position, or the second frequency domain position. Optionally, the resource indicated by the first SCI and the resource indicated by the second SCI may occupy different quantities of sub-channels.

FIG. 6b shows a conflict scenario 2. The second terminal device sends first SCI on R2, the first SCI indicates a first reserved resource (shown by a slash part on R3), and the first terminal device receives the first SCI. The third terminal device sends second SCI on R1, the second SCI indicates a second reserved resource (shown by a gray part on R3), and the first terminal device receives the second SCI. The first reserved resource and the second reserved resource conflict in time domain, and partially conflict in frequency domain. The first reserved resource and the second reserved resource have a same time domain position (corresponding to a first time domain position), the first reserved resource is corresponding to a first frequency domain position, and the second reserved resource is corresponding to a second frequency domain position. The first terminal device sends an RCI to the second terminal device or the third terminal device before a conflict position (that is, before R3). Specifically, a resource of the RCI is located in a slot in which a block 4 (referred to as "R4") is located, and a frequency domain position is determined based on a frequency domain position of the first SCI, the first frequency domain position, or the second frequency domain position.

FIG. 6c shows a conflict scenario 3: a half-duplex scenario. The second terminal device sends first SCI on R2, the first SCI indicates a first reserved resource (shown by R5), and the first terminal device receives the first SCI. The third terminal device sends second SCI on R1, the second SCI indicates a second reserved resource (shown by R3), and the first terminal device receives the second SCI. The first reserved resource and the second reserved resource have a same time domain position (corresponding to a first time domain position). The second terminal device sends data 1 on the first reserved resource, and the third terminal device sends data 2 on the second reserved resource. As a result, the third terminal device cannot receive the data 1 sent by the second terminal device. The second terminal device cannot sense a channel status, and therefore cannot perform resource exclusion based on a sensed status. Therefore, it may be considered that the first reserved resource and the second reserved resource conflict in time domain. The first terminal device sends an RCI to the second terminal device or the third terminal device before a conflict position (that is, before R3 and R5). Specifically, a resource of the RCI is located in a slot in which R4 is located, and a frequency domain position is determined based on a frequency domain position of the first SCI, the first frequency domain position, or the second frequency domain position. Optionally, the resource indicated by the first SCI and the resource indicated by the second SCI may occupy different quantities of sub-channels.

In a pre-RCI scenario, the RCI may be sent to an indicated terminal device, or may be sent to a protected terminal device. In this application, the indicated terminal device or the protected terminal device is the second terminal device. Alternatively, the indicated terminal device is the second terminal device, or the protected terminal device is the third terminal device. The indicated terminal device is a terminal device that is indicated to change the first reserved resource, and the protected terminal device is a terminal device that does not need to change the second reserved resource and may continue transmission of control information and/or data on the second reserved resource. Detailed descriptions are provided below by using the embodiments shown in FIG. 7 and FIG. 11.

Figure 7:
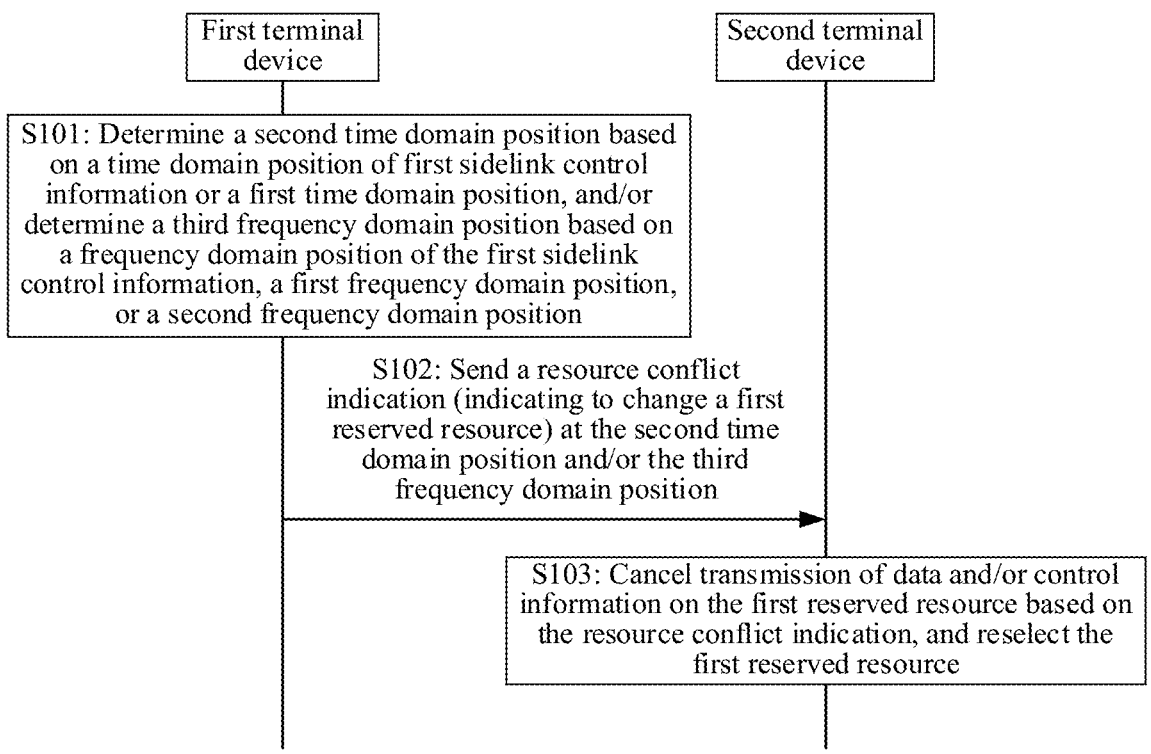
FIG. 7 is a schematic flowchart of a pre-RCI transmission method according to an embodiment of this application.

FIG. 7 is a schematic flowchart of a resource conflict indication transmission method according to an embodiment of this application. This embodiment is a pre-RCI scenario, and the RCI is sent to an indicated terminal device. For example, the method includes the following steps.

S101: A first terminal device determines a second time domain position based on a time domain position of first sidelink control information or a first time domain position, and/or determines a third frequency domain position based on a frequency domain position of the first sidelink control information, a first frequency domain position, or a second frequency domain position.

Before step S101, the first terminal device receives the first SCI from a second terminal device and receives second SCI from a third terminal device. As described above, the first terminal device may alternatively be the second terminal device. In this case, the first terminal device locally obtains the first SCI, or the first SCI is SCI sent by the first terminal device. The first SCI indicates a first reserved resource, and a position of the first reserved resource includes the first time domain position and the first frequency domain position. The second SCI indicates a second reserved resource, and a position of the second reserved resource includes the first time domain position and the second frequency domain position.

Alternatively, before step S101, the first terminal device receives the first SCI from a second terminal device and receives second SCI from a third terminal device. As described above, the first terminal device may alternatively be the third terminal device. In this case, the first terminal device locally obtains the second SCI, or the second SCI is SCI sent by the first terminal device. The first SCI indicates a first reserved resource, and a position of the first reserved resource includes the first time domain position and the first frequency domain position. The second SCI indicates a second reserved resource, and a position of the second reserved resource includes the first time domain position and the second frequency domain position.

After receiving the first SCI and the second SCI, the first terminal device decodes the first reserved resource indicated by the first SCI and the second reserved resource indicated by the second SCI, and detects that the first reserved resource conflicts with the second reserved resource. The conflict may be a time domain conflict or a time-frequency conflict. The scenario shown in FIG. 6a is a time-frequency conflict scenario, the position of the first reserved resource includes the first time domain position and the first frequency domain position, and the position of the second reserved resource includes the first time domain position and the second frequency domain position. The first frequency domain position completely overlaps with the second frequency domain position. The scenario shown in FIG. 6b is a time-frequency conflict scenario, the position of the first reserved resource includes the first time domain position and the first frequency domain position, and the position of the second reserved resource includes the first time domain position and the second frequency domain position. The first frequency domain position partially overlaps with the second frequency domain position. The scenario shown in FIG. 6c is a time domain conflict scenario. The first reserved resource and the second reserved resource have a same time domain position, and the first frequency domain position of the first reserved resource does not overlap with the second frequency domain position of the second reserved resource.

The reserved resource may be a reserved retransmission resource indicated in the SCI, may be a periodically reserved resource indicated by a period field in the SCI, or may be a periodically reserved retransmission resource indicated by the period field.

After determining that the first reserved resource conflicts with the second reserved resource, the first terminal device needs to send the RCI to the second terminal device before the conflict occurs. The RCI is referred to as a pre-RCI.

The time domain position of the first SCI is later than a time domain position of the second SCI.

Alternatively, a service priority of service data sent by the second terminal device is lower than a service priority of service data sent by the third terminal device. There are a plurality of manners of measuring the service priority. The manner may be at least one of the following four cases (a) to (d).

Case (a): A service priority of data scheduled by using the first SCI is lower than a preset first priority threshold. Specifically, a network side sets a threshold $Th_p$, and the service priority $P_{B1}$ of the service data sent by the second terminal device is lower than the threshold $Th_p$.

Optionally, the service priority of the data scheduled by using the first SCI is lower than the preset first priority threshold: A level of the service priority of the data scheduled by using the first SCI is lower than a level of the preset first priority threshold, or a value of the service priority of the data scheduled by using the first SCI is greater than the preset first priority threshold.

Case (b): A service priority of data scheduled by using the first SCI is lower than a service priority of data scheduled by using the second SCI. Specifically, the service priority $P_{B1}$ of the service data sent by the second terminal device is lower than the service priority $P_{B2}$ of the service data sent by the third terminal device.

Optionally, that a service priority of data scheduled by using the first SCI is lower than a service priority of data scheduled by using the second SCI includes: A level of the service priority of the data scheduled by using the first SCI is lower than a level of the service priority of the data scheduled by using the second SCI, or a value of the service priority of the data scheduled by using the first SCI is greater than a value of the service priority of the data scheduled by using the second SCI.

Optionally, in an embodiment, a manner of measuring the service priority may be a combination of case (a) and case (b).

Case (c): A service priority of data scheduled by using the first SCI is lower than a second priority threshold. The second priority threshold is associated with signal quality and a service priority of data scheduled by using the second SCI. Specifically, the service priority $P_{B1}$ of the service data sent by the second terminal device is lower than $Th^{-1}_P(RSRP, P_{B2})$.

Optionally, that a service priority of data scheduled by using the first SCI is lower than a second priority threshold includes: A level of the service priority of the data scheduled by using the first SCI is lower than a level of the second priority threshold, or a value of the service priority of the data scheduled by using the first SCI is greater than the second priority threshold.

In priority comparisons in the cases (a), (b), and (c), "higher than", "lower than", and "equal to" are comparisons of priority levels, and if comparisons of priority values are performed, "less than", "greater than", and "equal to" are respectively corresponding to the comparisons.

When a physical layer is triggered to select a resource, a higher layer delivers several parameters. sl-ThresPSSCH-RSRP-List is a reference signal received power (RSRP) threshold table $TH(p_i, p_j)$ used for resource selection, as shown in Table 2.

TABLE 2

| $Th(p_i, p_j)$ | | $p_i$ | | | | | | |
|---|---|---|---|---|---|---|---|---|
| | | 1 | 2 | 3 | 4 | 5 | 6 | 7 | 8 |
| $p_j$ | 1 | $Th_{11}$ | $Th_{12}$ | $Th_{13}$ | $Th_{14}$ | $Th_{15}$ | $Th_{16}$ | $Th_{17}$ | $Th_{18}$ |
| | 2 | $Th_{21}$ | $Th_{22}$ | $Th_{23}$ | $Th_{24}$ | $Th_{25}$ | $Th_{26}$ | $Th_{27}$ | $Th_{28}$ |
| | 3 | $Th_{31}$ | $Th_{32}$ | $Th_{33}$ | $Th_{34}$ | $Th_{35}$ | $Th_{36}$ | $Th_{37}$ | $Th_{38}$ |
| | 4 | $Th_{41}$ | $Th_{42}$ | $Th_{43}$ | $Th_{44}$ | $Th_{45}$ | $Th_{46}$ | $Th_{47}$ | $Th_{48}$ |
| | 5 | $Th_{51}$ | $Th_{52}$ | $Th_{53}$ | $Th_{54}$ | $Th_{55}$ | $Th_{56}$ | $Th_{57}$ | $Th_{58}$ |
| | 6 | $Th_{61}$ | $Th_{62}$ | $Th_{63}$ | $Th_{64}$ | $Th_{65}$ | $Th_{66}$ | $Th_{67}$ | $Th_{68}$ |
| | 7 | $Th_{71}$ | $Th_{72}$ | $Th_{73}$ | $Th_{74}$ | $Th_{75}$ | $Th_{76}$ | $Th_{77}$ | $Th_{78}$ |
| | 8 | $Th_{81}$ | $Th_{82}$ | $Th_{83}$ | $Th_{84}$ | $Th_{85}$ | $Th_{86}$ | $Th_{87}$ | $Th_{88}$ |

$p_i$ is a value of a priority field in a received SCI format 1-A, $p_j$ is a priority of a transmission of the terminal device selecting a resource, that is, $p_j=\text{prio}_{Tx}$. Optionally, $p_i$ is the service priority of the data scheduled by using the second SCI, and $p_j$ is the service priority of the data scheduled by using the first SCI; or $p_i$ is the service priority of the data scheduled by using the first SCI, and $p_j$ is the service priority of the data scheduled by using the second SCI. A unit of $TH(p_i, p_j)$ is dBm. SL-ThresPSSCH-RSRP is configured by a network device. A value 0 of SL-ThresPSSCH-RSRP indicates that the threshold is negative infinity, A value 1 indicates −128 dBm, a value 2 indicates −126 dBm, a value n indicates (−128+(n−1)*2) dBm, and a value 66 indicates a positive infinite dBm.

$Th^{-1}_P(\bullet)$ in case (c) is explained as follows: $Th^{-1}_P(\bullet)$ is the second priority threshold. $Th_{RSRP}(\bullet)$ is an RSRP threshold table associated with transmit and receive priorities of the terminal device in mode 2 resource selection. This table is configured by an upper layer. For example, the second terminal device changes a transmission position. $Th^{-1}_P(\bullet)$ is equivalent to a reversal of the table. RSRP that is measured by the first terminal device and that is of a PSCCH/PSSCH sent by the third terminal device is used as an RSRP threshold, and a priority of the third terminal device is used to determine a priority threshold. If a priority of the second terminal device is lower than the threshold, the transmission position is changed. The RSRP measurement may be PSSCH-RSRP measurement or PSCCH-RSRP measurement.

Optionally, the RSRP in $Th^{-1}_P(RSRP, P_{B2})$ may be RSRP that is measured by the first terminal device and that is of a PSCCH/PSSCH sent by the second terminal device, the RSRP that is measured by the first terminal device and that is of the PSCCH/PSSCH sent by the third terminal device, or a sum of the RSRP that is measured by the first terminal device and that is of the PSCCH/PSSCH sent by the second terminal device and the RSRP that is measured by the first terminal device and that is of the PSCCH/PSSCH sent by the third terminal device.

Optionally, $Th^{-1}_P(RSRP, P_{B2})$ may also be written as $Th^{-1}_P(RSSI, P_{B2})$. The RSSI in $Th^{-1}_P(RSSI, P_{B2})$ may be an RSSI that is measured by the first terminal device and that is of the PSCCH/PSSCH sent by the second terminal device, an RSSI that is measured by the first terminal device and that is of the PSCCH/PSSCH sent by the third terminal device, an RSSI that is measured by the first terminal device and that is of a resource conflict position of the second terminal device and the third terminal device, or a sum of the RSSI that is measured by the first terminal device and that is of the PSCCH/PSSCH sent by the second terminal device and the RSSI that is measured by the first terminal device and that is of the PSCCH/PSSCH sent by the third terminal device.

Case (d): The following conditions are met:

(d1) The service priority $P_{B1}$ of the service data sent by the second terminal device is higher than $Th_p$, and the service priority $P_{B2}$ of the service data sent by the third terminal device is higher than $Th_p$;

(d2) The service priority $P_{B1}$ of the service data sent by the second terminal device is equal to the service priority $P_{B2}$ of the service data sent by the third terminal device; or (d3) The service priority $P_{B1}$ of the service data sent by the second terminal device is equal to $Th^{-1}_P(RSRP, P_{B2})$.

In this case, a terminal device that has more reserved resources in the first SCI and the second SCI is enabled to change a transmission position (that is, cannot perform transmission on a reserved resource at a resource conflict position);

a terminal device corresponding to a frequency domain position including more sub-channels in the first SCI and the second SCI is enabled to change a transmission position;

a terminal device corresponding to a larger resource reservation period indicated in the first SCI and the second SCI is enabled to change a transmission position;

a terminal device having enough processing time is enabled to change a transmission position; or a terminal device closer to a conflicted resource is enabled to change a transmission position.

Optionally, indicating the terminal device to change the transmission position includes: indicating to the terminal device that the first reserved resource and/or the second reserved resource conflict.

The service priority is specifically a transmission priority of the second terminal device or the third terminal device. Because a transmit terminal device may send a plurality of services at the same time, priorities of the plurality of services may be different.

The service priority may also be referred to as an L1 priority, a physical layer priority, a priority carried in the SCI, a priority corresponding to a PSSCH associated with the SCI, a transmission priority, a priority of sending the PSSCH, a priority of a logical channel, or a priority of a highest level of the logical channel.

There is a correspondence between a priority level and a priority value. For example, a higher priority level is corresponding to a lower priority value (or a lower priority level is corresponding to a lower priority value). For example, the higher priority level is corresponding to the lower priority value. A value range of the priority value may be an integer ranging from 1 to 8 or an integer ranging from 0 to 7. If the priority value ranges from 1 to 8, a priority value 1 indicates a highest priority.

In this implementation, a specific terminal device changing the reserved resource is determined based on a resource occupation principle of "first come, first occupy" or a principle in which data that is scheduled by using sidelink control information and that has a higher service priority occupies a resource. The first terminal device indicates a terminal device whose sidelink control information is later in time domain to change the reserved resource. Alternatively, the first terminal device indicates a terminal device with a low priority level to change the reserved resource, where the priority is a priority indicated by the sidelink control information. The low priority level includes: The service priority of the data scheduled by using the first sidelink control information is lower than the preset first priority threshold; the service priority of the data scheduled by using the first sidelink control information is lower than the service priority of the data scheduled by using the second sidelink control information; or the service priority of the data scheduled by using the first sidelink control information is lower than the second priority threshold. The second priority threshold is associated with the signal quality and the service priority of the data scheduled by using the second sidelink control information.

Before the pre-RCI is sent, the second time domain position and/or the third frequency domain position for sending the pre-RCI may be determined.

For the pre-RCI, when determining that the first reserved resource indicated by the first SCI conflicts with the second reserved resource indicated by the second SCI, the first terminal device sends the RCI to the second terminal device or the third terminal device before the conflict occurs.

Optionally, when M reserved resources in the reserved resource indicated by the first SCI and the reserved resource indicated by the second SCI conflict, the first terminal device sends the RCI to the second terminal device or the third terminal device before the $1^{st}$ reserved resource conflicts. The RCI indicates a conflict status of the M reserved resources. M is a positive integer.

Optionally, when the M reserved resources in the reserved resource indicated by the first SCI and the reserved resource indicated by the second SCI conflict, the first terminal device sends M RCIs to the second terminal device or the third terminal device before the M reserved resources conflict. The RCI indicates a conflict status of each of the M reserved resources.

Specifically, step S101 includes the following several implementation solutions, which are separately described below.

How to determine the second time domain position is described by using an implementation solution A and an implementation solution B, and how to determine the third frequency domain position is described by using an implementation solution C to an implementation solution E.

Implementation solution A: The first terminal device determines the second time domain position based on the first time domain position.

To be specific, the first terminal device may determine, based on a first position of the first reserved resource and second reserved resource, the second time domain position for sending the RCI. As shown in FIG. 6a and FIG. 6b, the second time domain position for sending the RCI is determined based on R3. As shown in FIG. 6c, the second time domain position for sending the RCI is determined based on R3 or R5.

Specifically, the second time domain position may be determined based on the first time domain position and a first time interval. The first time interval may be configured or preconfigured by a network side. The second time domain position belongs to a conflict indication time domain position set, and time domain positions in the conflict indication time domain position set are discretely distributed (for example, periodically distributed). The second time domain position is a latest time domain position that is the first time interval before the first time domain position. FIG. 6a is used as an example. The second time domain position for sending RCI is a latest time domain position that is the first time interval before R3. In FIG. 6a and FIG. 6b, T4 represents a time interval from a start position of a slot in which the resource conflict indication is located to a start position of a slot in which the first time domain position is located. Alternatively, T4 in the figure represents a time interval from a start position of a slot in which the second time domain position is located to a start position of a slot in which the first time domain position is located. A meaning of T4 in another embodiment is the same as that herein.

Figure 8:
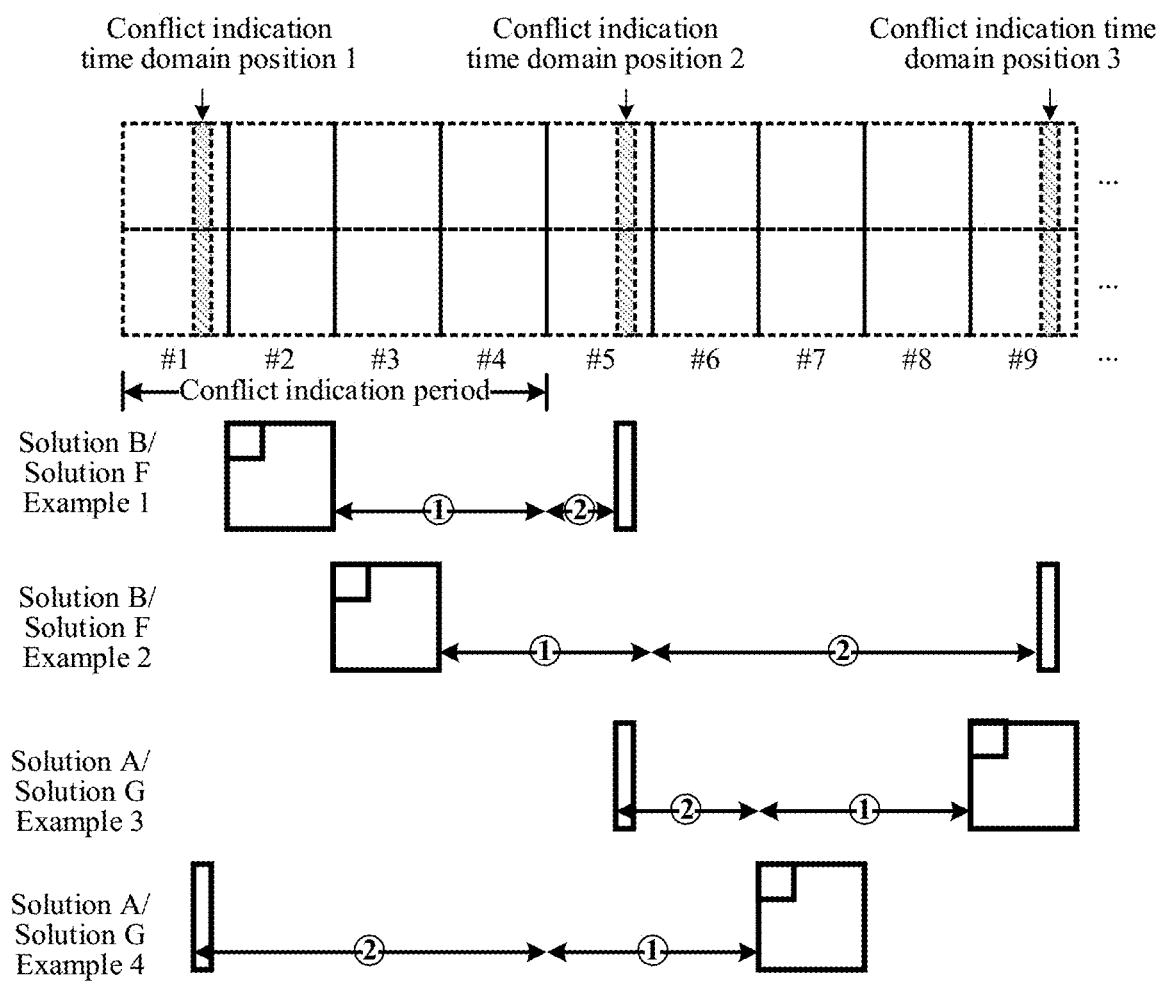
FIG. 8 is a schematic diagram of determining a second time domain position according to an embodiment of this application.

FIG. 8 is a schematic diagram of determining the second time domain position. A horizontal axis represents a time domain, and a unit thereof is a slot. A vertical axis represents a frequency domain, and a unit thereof is a sub-channel. The time domain positions in the resource conflict indication time domain position set are discretely distributed. In the figure, a resource conflict indication time domain position 1 in a slot #1, a resource conflict indication time domain position 2 in a slot #5, and a resource conflict indication time domain position 3 in a slot #9 are marked. The time domain positions in the resource conflict indication time domain position set in the figure are periodically distributed, and a period is divided into four slots.

The second time domain position for sending the RCI is a latest time domain position that is the first time interval before the first time domain position. ① indicates the first time interval, and ② indicates a length of time caused by discrete distribution of the time domain positions in the resource conflict indication time domain position set.

In an example 3, the first time domain position is the slot #9, the first time interval is two slots, and the length of time caused by discrete distribution of the time domain positions in the resource conflict indication time domain position set is one slot plus four symbols. The resource conflict indication is at the resource conflict indication time domain position 2 in the slot #5. Therefore, the second time domain position is the resource conflict indication time domain position 2.

The first time interval includes at least one of the following time lengths:
 a length of time required by the second terminal device to decode the resource conflict indication;
 a length of time required by the second terminal device to cancel transmission of data and/or control information at the first time domain position;
 a length of time required by the second terminal device to reselect the first reserved resource.

In addition, if RCI resources are discretely distributed, T4 may further consider the length of time caused by discrete distribution of the time domain positions in the conflict indication time domain position set. To be specific, after the first terminal device determines the first time interval based on at least one of a length of time required to determine that the first reserved resource conflicts with the second reserved resource at the first position and a length of time required to generate the resource conflict indication, the position that is the first time interval from the time domain position of the first SCI may not be a position of a time domain resource of the conflict indication time domain position set. In this case, the second time domain position needs to be a position of the $1^{st}$ time domain resource of a conflict indication time domain position set before the position. Still refer to FIG. 8. In an example 4, the first time domain position is a slot #7, the first time interval is two slots, and the length of time caused by discrete distribution of the time domain positions in the resource conflict indication time domain position set is three slots plus four symbols. The resource conflict indication is at the resource conflict indication time domain position 1 in the slot #1. Therefore, the second time domain position is the resource conflict indication time domain position 1.

In addition, the second time domain position may further meet that an interval between the time domain position of the first SCI and the second time domain position is greater than or equal to a second time interval.

The second time interval includes at least one of the following time lengths:
 the length of time required by the first terminal device to determine that the first reserved resource conflict with the second reserved resource at the first position; and
 the length of time required by the first terminal device to generate the resource conflict indication; and
 the length of time caused by discrete distribution of the time domain positions in the conflict indication time domain position set.

In FIG. 6a and FIG. 6b, T5 represents a time interval from the start position of the slot in which the resource conflict indication is located to a start position of a slot in which the time domain position of the first SCI is located. Alternatively, T5 in the figure represents a time interval from the start position of the slot in which the second time domain position is located to the start position of the slot in which the time domain position of the first SCI is located. A meaning of T5 in another embodiment of this application is the same as that herein.

Implementation solution B: The first terminal device determines the second time domain position based on the time domain position of the first SCI.

Specifically, the first terminal device determines the second time domain position based on the time domain position of the first SCI and a third time interval. The second time domain position belongs to a conflict indication time domain position set, and time domain positions in the conflict indication time domain position set are discretely distributed.

The second time domain position is the $1^{st}$ time domain position in a conflict indication time domain position set that is the third time interval after the time domain position of the first SCI. FIG. 6a is used as an example. T5 is a sum of the third time interval and a length of time caused by discrete distribution of the time domain positions of the conflict indication time domain position set. There are a plurality of time domain positions discretely distributed in a conflict indication time domain position set that is the third time interval after the time domain position of the first SCI. The second time domain position for sending the RCI is the $1^{st}$ time domain position in the conflict indication time domain position set that is the third time interval after the time domain position of the first SCI. Still refer to FIG. 8. The second time domain position for sending the RCI is the $1^{st}$ time domain position in the resource conflict indication time domain position set that is the third time interval after the time domain position of the first SCI. ① indicates the third time interval, and ② indicates the length of time caused by discrete distribution of the time domain positions in the resource conflict indication time domain position set. In an example 1, the time domain position of the first SCI is the slot #2, the third time interval is two slots, and the length of time caused by discrete distribution of the time domain positions in the resource conflict indication time domain position set is 10 symbols. The resource conflict indication is at the resource conflict indication time domain position 2 in the slot #5. Therefore, the second time domain position is the resource conflict indication time domain position 2.

The third time interval includes at least one of the following time lengths:

the length of time required by the first terminal device to determine that the first reserved resource conflict with the second reserved resource at the first position; and
the length of time required by the first terminal device to generate the resource conflict indication.

The third time interval may be configured by the network side.

In addition, if RCI resources are discretely distributed, T5 may further consider the length of time caused by discrete distribution of the time domain positions in the conflict indication time domain position set. To be specific, after the first terminal device determines the third time interval based on at least one of the length of time required to determine that the first reserved resource conflicts with the second reserved resource at the first position and the length of time required to generate the resource conflict indication, the position that is the third time interval from the time domain position of the first SCI may not be a position of discretely distributed time domain resources of the conflict indication time domain position set. In this case, the second time domain position needs to be a position of time domain resources of a next conflict indication time domain position set after the position. Still refer to FIG. 8. Corresponding to an example 2, the time domain position of the first SCI is a slot #3, the third time interval is two slots, and the length of time caused by discrete distribution of the time domain positions in the resource conflict indication time domain position set is three slots plus 10 symbols. The resource conflict indication is at the resource conflict indication time domain position 3 in the slot #9. Therefore, the second time domain position is the resource conflict indication time domain position 3.

The second time domain position meets that an interval between the first time domain position and the second time domain position is greater than or equal to a fourth time interval. The fourth time interval includes at least one of the following time lengths:
  a length of time required by the second terminal device to decode the resource conflict indication;
  a length of time required by the second terminal device to cancel transmission of data and/or control information at the first time domain position;
  a length of time required by the second terminal device to reselect the first reserved resource; and a length of time corresponding to an adjustment slot a.

Time of T4 may further include a=0 or 1 slot. If T4 is from a start position of a slot in which the second time domain position is located to a start position of a slot in which the first time domain position is located, a=0. If T4 is from an end position of the slot in which the second time domain position is located to the start position of the slot in which the first time domain position is located, a=1.

Optionally, the first SCI and data scheduled by using the SCI are in a same slot. Therefore, "based on the time domain position of the first SCI" may also be understood as: based on a time domain position of the data scheduled by using the first SCI, based on a time domain position of a first PSCCH, based on a time domain position of a first PSSCH, and based on a time domain position of the first PSCCH/PSSCH. For an understanding of the slot in which the first SCI is located and the slot of the data scheduled by using the SCI in another embodiment, refer to the descriptions herein.

In the foregoing implementation solutions A and B, the RCI resources are periodically and discretely distributed. In other words, the time domain positions in the conflict indication time domain position set are periodically and discretely distributed. A period of the conflict indication resources is $N_{PSSCH}^{RCI}$, and a value of $N_{PSSCH}^{RCI}$ may be 0, 1, 2, or 4 slots. A number of a slot that can be used for sidelink transmission is denoted as k, where k is an integer. In this case, the conflict indication resources may be distributed in a slot k that meets $(k+\lceil N_{PSSCH}^{RCI}/2 \rceil) \bmod N_{PSSCH}^{RCI}=0$. Alternatively, a slot k has a transmission occasion resource with a conflict indication if $(k+\lceil N_{PSSCH}^{RCI}/2 \rceil) \bmod N_{PSSCH}^{RCI}=0$. Alternatively, the conflict indication resources may be distributed in a slot k that meets $k \bmod N_{PSSCH}^{RCI}=0$. Alternatively, a slot k has a transmission occasion resource with a conflict indication if $k \bmod N_{PSSCH}^{RCI}=0$.

The foregoing implementation solutions A and B describe how to determine the second time domain position for sending the RCI. The following describes, by using the implementation solutions C to E, how to determine the third frequency domain position for sending the RCI. The foregoing implementation solutions A and B and the implementation solutions C to E may be implemented independently, or may be implemented together. In addition, the second time domain position may be determined based on the implementation solution A or B, and the third frequency domain position may be determined in another manner, for example, a frequency domain position specified in a protocol or a pre-negotiated frequency domain position. Alternatively, the third frequency domain position may be determined based on any one of the implementation solutions C to E, and the second time domain position may be determined in another manner, for example, a time domain position that is specified in a protocol or a pre-negotiated time domain position.

Implementation solution C: The first terminal device determines a second resource block set based on the frequency domain position of the first SCI, and determines the third frequency domain position and/or a cyclic shift associated with the resource conflict indication.

A frequency domain resource at the third frequency domain position is located on a feedback channel, for example, a physical sidelink feedback channel (physical sidelink feedback channel, PSFCH), and the frequency domain resource at the third frequency domain position is orthogonal to a resource set that is on the feedback channel and that is used to feed back the indication.

In embodiments of this application, the cyclic shift may be understood as any one of a cyclic shift value, a cyclic shift index, a cyclic shift pair index, a cyclic shift set index, or a cyclic shift associated with the resource conflict indication. These terms may be interchanged with each other.

The network device may send indication information to the first terminal device. The first terminal device receives the indication information from the network device. The indication information indicates a first resource block set. The first resource block set is orthogonal to the resource set that is used to feed back the indication. The second resource block set belongs to the first resource block set.

The indication information may be specifically a bitmap. To be specific, the network device may indicate, in a bitmap form, that the PSFCH channel may carry a resource of a hybrid automatic repeat request-acknowledgement (HARQ-ACK), and indicate that the PSFCH channel may carry a resource of the RCI.

For example, it is assumed that a resource pool includes 10 physical resource blocks (PRBs) in frequency domain. In this case, a bitmap 1 of the resource set used to feed back the indication may be 0101001010, and a bitmap 2 used for indicating the first resource block set may be 0000110100.

Figure 9:
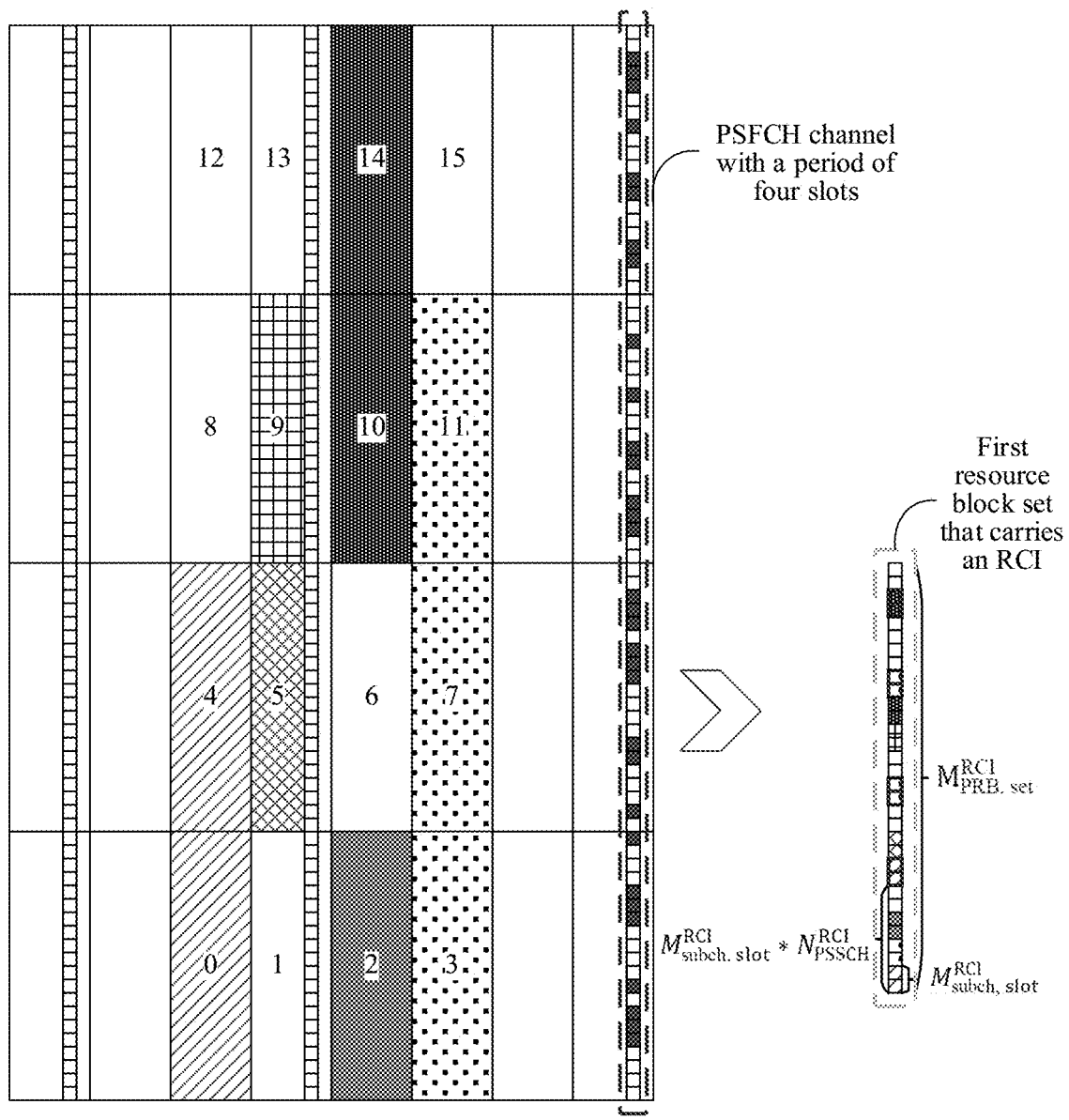
FIG. 9 is a schematic diagram of determining a third frequency domain position according to an embodiment of this application.

The following specifically describes the resource set used to feed back the indication and the first resource block set with reference to FIG. 9. For the resource set used to feed back the indication, an $n^{th}$ value of the bitmap is "1". In this case, the $n^{th}$ resource starting from a lowest PRB position in the resource pool may be used to carry HARQ-ACK information. If a receive terminal device receives a PSSCH in the resource pool, the receive terminal device feeds back the HARQ-ACK information to a transmit terminal device on the PSFCH (specifically on the resource set used to feed back the indication). Specifically, the receive terminal device sends the PSFCH in a latest slot that includes a PSFCH resource and that is after a slot for receiving the PSSCH. As shown in FIG. 9, a unit of a horizontal grid is a slot, and a unit of a vertical grid is a sub-channel. For ease of description, a time-frequency resource is marked at a granularity of one sub-channel and one slot. The network device configures a total quantity $N_{subch}$ of sub-channels in the resource pool to be 4. To be specific, the PSSCH is transmitted on the four sub-channels. Each sub-channel includes 20 PRBs. The network device indicates that a quantity of PRBs used for receiving the HARQ-ACK information is $M_{PRB,set}^{PSFCH}=32$ (where the PRBs are shown by gray grids on the PSFCH). A PSFCH resource position of a set of the $M_{PRB,set}^{PSFCH}$ PRB sets is $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$, used to indicate a frequency domain position of each PRB used to feedback the indication, where i is a PSSCH slot ($0 \leq i < N_{PSSCH}^{PSFCH}$), and j is a sub-channel ($0 \leq j < N_{subch}$), according to an ascending order of i and then an ascending order of j. A period of the PSFCH is $N_{PSSCH}^{PSFCH}=4$ (to be specific, there is one PSFCH resource in every four slots). In this case, a quantity of PRBs occupied by a PSFCH corresponding to a PSSCH on each sub-channel is $M_{subch,slot}^{PSFCH}=M_{PRB,set}^{PSFCH}/(N_{subch} \cdot N_{PSSCH}^{PSFCH})=2$. To be specific, the PSSCH on each sub-channel feeds back the HARQ-ACK information by using two PRBs.

Further, the first SCI and the data scheduled by using the first SCI occupy one or more sub-channels. The second resource block set may be associated with a start sub-channel in one or more sub-channels of the PSSCH. Alternatively, the second resource block set is associated with the one or more sub-channels.

When the receive terminal device determines a feedback resource corresponding to one data packet, where the data packet may include a PSSCH on one or more sub-channels. For example, a PSSCH on sub-channels 0 #and 4 #is corresponding to one data packet, PSSCHs on sub-channels 2 #, 5 #, and 9 #each are corresponding to one data packet, a PSSCH on sub-channels 10 #and 14 #is corresponding to one data packet, and a PSSCH on sub-channels 3 #, 7 #, and 11 #is corresponding to one data packet. A quantity of feedback resources that can be used for one data packet is $R_{PRB,CS}^{PSFCH}=R_{type}^{PSFCH} \cdot M_{subch,slot}^{PSFCH} \cdot R_{CS}^{PSFCH}$, and the resources carry HARQ-ACK information on a PSFCH. $R_{CS}^{PSFCH}$ is a plurality of cyclic shift pairs of the resource pool, and is indicated by a higher layer. $R_{type}^{PSFCH}$ is candidate resource type information that is of the PSFCH and that is configured by the network device for each resource pool. Specifically, the following two candidate resource types are included.

The second resource block set is associated with a start sub-channel in the one or more sub-channels: A candidate resource type that is of the PSFCH and that is configured for each resource pool is $R_{type}^{PSFCH}=1$. In this case, $M_{subch,slot}^{PSFCH}$ PRBs are associated with a start sub-channel of a corresponding PSSCH. For example, a PSSCH on sub-channels 0 #and 4 #is corresponding to one data packet. In this case, a quantity of PRBs occupied by a PSFCH corresponding to the PSSCH on each sub-channel is 2. Therefore, a quantity of PRBs occupied by the PSFCH corresponding to the sub-channels 0 #and 4 #is 4. Herein, the $M_{subch,slot}^{PSFCH}$ PRBs are associated with the start sub-channel of the corresponding PSSCH. In this case, the $M_{subch,slot}^{PSFCH}$ PRBs are associated with the $0^{th}$ sub-channel.

The second resource block set is associated with the one or more sub-channels: A candidate resource type that is of the PSFCH and that is configured for each resource pool is $N_{type}^{PSFCH}=N_{subch}^{PSSCH}$. In this case, $N_{subch}^{PSFCH}$. $M_{subch,slot}^{PSFCH}$ PRBs are associated with the one or more sub-channels. The sub-channels are $M_{subch}^{PSFCH}$ sub-channels of the corresponding PSSCH. The PSSCH on the sub-channels 0 #and 4 #is corresponding to one data packet, and a quantity of PRBs occupied by a PSFCH corresponding to the PSSCH on each sub-channel is 2. Therefore, a quantity of PRBs occupied by the PSFCH corresponding to the sub-channels 0 #and 4 #is 4. Herein, the $M_{subch,slot}^{PSFCH}$ PRBs are associated with the one or more sub-channels of the corresponding PSSCH. In this case, the $M_{subch,slot}^{PSFCH}$ PRBs are associated with the sub-channels 0 #and 4 #, where $M_{subch,slot}^{PSFCH}=4$.

Optionally, for example, the $n^{th}$ PRB resource whose $n^{th}$ value is "1" is used to carry the HARQ-ACK information, and the RCI may occupy the $n^{th}$ PRB resource whose $n^{th}$ value is "0" in the bitmap, or the $n^{th}$ PRB resource whose $n^{th}$ value is not "1".

The PRB resource included in the first resource block set is any one of the following: the $n^{th}$ PRB resource whose $n^{th}$ value is "0" in the bitmap and that may be occupied by the RCI (namely, a PRB shown by a white grid on the PSFCH in the figure), a PRB resource to which a non-start sub-channel of an original PSSCH is mapped when $M_{type}^{PSFCH}=1$ (where for example, the sub-channel 4 #in the sub-channels 0 #and 4 #is a non-start sub-channel of the data packet), and a PRB resource that is not occupied by the HARQ-ACK information and whose $n^{th}$ value is "1" in the bitmap (for example, a PRB that is not occupied by the HARQ-ACK information and that is in the foregoing 32 PRBs).

In an example, the first resource block set includes $M_{PRB,set}^{RCI}$ set PRBs. The second resource block set includes $R_{PRB}^{RCI}=M_{subch,slot}^{RCI} \cdot N_{type}^{RCI}$ or $R_{PRB}^{RCI}=M_{subch,slot}^{RCI}$ PRBs. It is assumed that the $n^{th}$ value in the bitmap is 0. In this case, the $n^{th}$ resource starting from a lowest PRB position in the resource pool may be used to carry the RCI. A first resource block in the first resource block set is orthogonal to a resource used to feed back the indication. As shown in FIG. 9, the resource pool includes $N_{subch}$ sub-channels. That is, the PSSCH is transmitted on the $N_{subch}$ sub-channels. The network device indicates that a quantity of PRBs used for receiving the RCI is $M_{PRB,set}^{RCI}$, a period of conflict indication resources is $N_{PSSCH}^{RCI}$, and each sub-channel scheduled by using the first SCI is corresponding to $M_{subch,slot}^{RCI}=M_{PRB,set}^{RCI}/(N_{subch} \cdot N_{PSSCH}^{RCI})$ PRBs used for one RCI. A resource position of a set of the $M_{PRB,set}^{RCI}$ PRBs is $[(i+j \cdot N_{PSSCH}^{RCI}) \cdot M_{subch,slot}^{RCI}+ M_{PRB,set}^{PSFCH}(i+1+j \cdot N_{PSSCH}^{RCI}) \cdot M_{subch,slot}^{RCI}-1+ R_{PRB,set}^{PSFCH}]$, where i is a PSSCH slot ($0 \leq i < N_{PSSCH}^{RCI}$), j is a sub-channel ($0 \leq j < N_{subch}$), and a sequence is an ascending order of i and then an ascending order of j. Optionally, the sequence may alternatively be an ascending order of j and then an ascending order of i. The PSSCH is a PSSCH scheduled by using the first SCI.

It is assumed that the $n^{th}$ value in the bitmap is 0. In this case, the $n^{th}$ resource starting from the lowest PRB position in the resource pool may be used to carry the RCI. The first resource block in the first resource block set is orthogonal to the resource used to feed back the indication. As shown in FIG. 9, the resource pool includes the $N_{subch}$ sub-channels, where $N_{subch}=4$. That is, the PSSCH is transmitted on four sub-channels. The network device indicates that the quantity of PRBs used for receiving the RCI is $M_{PRB,set}^{RCI}=32$, the period of the conflict indication resources is $N_{PSSCH}^{RCI}=4$, and each sub-channel scheduled by using the first SCI is corresponding to $M_{subch,slot}^{RCI}=M_{PRB,set}^{RCI}/(N_{subch} \cdot N_{PSSCH}^{RCI})=2$ PRBs used for one RCI. The resource position of the set of the $M_{PRB,set}^{RCI}$ PRBs is [(i+ $j \cdot M_{PSSCH}^{RCI}) \cdot M_{subch,slot}^{RCI} + M_{PRB,set}^{PSFCH}$, (i+1+ $j \cdot N_{PSSCH}^{RCI}) \cdot M_{subch,slot}^{RCI} - 1 + M_{PRB,set}^{PSFCH}$], where i is the PSSCH slot ($0 \leq i < N_{PSSCH}^{RCI}$), j is the sub-channel ($0 \leq j < N_{subch}$), and the sequence is an ascending order of i and then an ascending order of j. Optionally, the sequence may alternatively be an ascending order of j and then an ascending order of i. The PSSCH is the PSSCH scheduled by using the first SCI.

After the first resource block set is determined, the second resource block set may be further determined based on at least one of the first resource block set, resource period information of the RCI, and code domain information of the RCI. The second resource block set belongs to the first resource block set. Optionally, the code domain information of the RCI may be a cyclic shift or a total quantity $N_{CS}^{RCI}$ of cyclic shifts.

If the code domain information of the RCI is combined, a quantity of PRBs that may be used for one RCI is determined: $M_{PRB,CS}^{RCI}=M_{type}^{RCI} \cdot M_{subch,slot}^{RCI} \cdot M_{CS}^{RCI}$.

The quantity of PRBs that may be used for one RCI is $R_{PRB}^{RCI}=N_{type}^{RCI} \cdot M_{subch,slot}^{RCI}$. The first terminal device actually uses only several of the PRBs to send the RCI. For example, the first terminal device actually uses one of the PRBs to send the RCI. Optionally, in combination with the code domain information, a quantity of frequency-domain code-domain resources that may be used for one RCI is $N_{PRB,CS}^{RCI}=N_{type}^{RCI} \cdot M_{subch,slot}^{RCI} \cdot N_{CS}^{RCI}$. The first terminal device actually uses only one of the frequency-domain code-domain resources to send the RC. Optionally, the frequency-domain code-domain resource is a PSFCH resource, or a PSFCH resource used for conflict indication.

Optionally, the second resource block set may be understood as a set of frequency-domain code-domain resources or a set of PRB resources.

Optionally, a network configures or preconfigures a total quantity of cyclic shifts used for conflict indication. Optionally, the network configures, by configuring or preconfiguring a quantity $N_{CS}^{RCI}$ of cyclic shifts, a quantity $N_{CSP}^{RCI}$ of cyclic shift pairs, or a quantity $N_{CSS}^{RCI}$ of cyclic shift sets, the total quantity of cyclic shifts used for conflict indication. Optionally, the network configures or preconfigures the quantity $N_{CS}^{RCI}$ of cyclic shifts. In this case, a total quantity of cyclic shifts used for resource conflict indication is $N_{CS}^{RCI}$. Optionally, the network configures or preconfigures the quantity $N_{CSP}^{RCI}$ of cyclic shift pairs. In this case, a quantity of cyclic shifts used for resource conflict indication is $N_{CS}^{RCI}=2 \cdot N_{CSP}^{RCI}$. Optionally, the network configures or preconfigures the quantity $N_{CSS}^{RCI}$ of cyclic shift sets, and each cyclic shift set includes M1 cyclic shifts. In this case, a total quantity of cyclic shifts used for resource conflict indication is $N_{CS}^{RCI}=M1 \cdot N_{CSS}^{RCI}$, where M1 is an integer, for example, M1={1, 2, 3, 4, . . . }.

Further, the first SCI and the data scheduled by using the first SCI occupy one or more sub-channels. The second resource block set may be associated with a start sub-channel in one or more sub-channels of the PSSCH. Alternatively, the second resource block set is associated with the one or more sub-channels.

The network device may indicate, by using the candidate resource type information, the first terminal device that: The second resource block set is associated with the first SCI and the start sub-channel in the one or more sub-channels of PSSCHs scheduled by using the first SCI; or the second resource block set is associated with the first SCI and the one or more sub-channels scheduled by using the first SCI. Specifically, the first terminal device receives the candidate resource type information sent by the network device. The candidate resource type information indicates that the second resource block set is associated with the first SCI and the start sub-channel in the one or more sub-channels of PSSCHs scheduled by using the first SCI, or the second resource block set is associated with the first SCI and the one or more sub-channels of PSSCHs scheduled by using the first SCI.

In this implementation solution, the candidate resource type information indicates that the second resource block set is associated with the first SCI and the start sub-channel of the one or more sub-channels of the data scheduled by using the first SCI. In this case, $N_{type}^{RCI}=1$. In this case, the first terminal device receives the candidate resource type information, and may determine that the second resource block set is associated with the first SCI and the start sub-channel in the one or more sub-channels of the data scheduled by using the first SCI. As shown in FIG. 9, a PSSCH on the sub-channels 0 #and 4 #is corresponding to one data packet, PSSCHs at the sub-channels 2 #, 5 #, and 9 #each are corresponding to one data packet, a PSSCH at the sub-channels 10 #and 14 #is corresponding to one data packet, and a PSSCH at the sub-channels 3 #, 7 #, and 11 #is corresponding to one data packet. The sub-channels 0 #and 4 #are used as an example. A resource carrying an RCI indicating that a reserved resource indicated by the SCI on the sub-channels 0 #and 4 #conflicts with the reserved resource indicated by the second SCI are four PRBs, and the candidate resource type information received by the first terminal device is that the second resource block set is associated with the start sub-channel 0 #in the sub-channels 0 #and 4 #. In this case, the second resource block set is two PRBs. If the candidate resource type information received by the first terminal device is that the second resource block set is associated with the sub-channels 0 #and 4 #, the second resource block set is four PRBs.

The first terminal device may determine the third frequency domain position and/or the cyclic shift associated with the resource conflict indication. Optionally, the first terminal device may determine the second resource block set based on the frequency domain position of the first SCI, and determine, in the second resource block set, the third frequency domain position and/or the cyclic shift associated with the resource conflict indication.

The determining the third frequency domain position and/or the cyclic shift associated with the resource conflict indication includes at least one of the following two cases.

Case 1: The third frequency domain position is determined.

Specifically, the third frequency domain position may be determined: The third frequency domain position may be determined based on any one of or a sum of any two or more of: the first resource block set, the second resource block set, a frequency-domain code-domain index, a PRB index, a cyclic shift index, a source identifier of the first SCI, a source identifier of the second SCI, a destination identifier of the first SCI, a destination identifier of the second SCI, a member identifier of the first SCI, a member identifier of the second SCI, the service priority of the data scheduled by using the first SCI, the service priority of the data scheduled by using the second SCI, a slot index of the first SCI, a sub-channel index of the first SCI, the first time domain position or the first frequency domain position, a CRC used to generate the first SCI, and a CRC used to generate the second SCI.

Further, optionally, the third frequency domain position may be determined based on the first resource block set and/or the second resource block set. In an embodiment, the first resource set may be determined based on the configuration or preconfiguration by the network device. After the first resource block set is determined, the third frequency domain position is determined based on the first resource block set. In another embodiment, the second resource block set may be determined based on the frequency domain position of the first SCI, the first frequency domain position, or the second frequency domain position. After the second resource block set is determined, the third frequency domain position is determined based on the second resource block set. In still another embodiment, the first resource set and the second resource set may be determined based on the configuration or preconfiguration by the network device. After the first resource block set and the second resource block set are determined, the third frequency domain position is determined based on the first resource block set and the second resource block set. For detailed descriptions of determining the first resource set and determining the second resource set, refer to the foregoing descriptions.

It should be noted that the third frequency domain position is at least one of the following: a frequency domain position of the first resource block set, a frequency domain position of the second resource block set, and a frequency domain position of the PRB index. The third frequency domain position may be a combination of the three positions or a combination of any two of the positions. Optionally, the PRB index may be an index value of the third frequency domain position in the first resource block set or the second resource block set. Optionally, the third frequency domain position may be understood as a PRB indexed with the PRB index in the second resource block set in the first resource block set, may be understood as a PRB indexed with the PRB index in the second resource block set, or may be understood as a PRB indexed with the PRB index in the first resource block set. If the PRB index is 2, the third frequency domain position is the $2^{nd}$ PRB in the second resource block set.

The first terminal device may determine, based on the second resource block set and/or the PRB index, to use at least one PRB to transmit the resource conflict indication.

In the embodiment in Case 1, the first terminal device determines the third frequency domain position, and the third frequency domain position may be the PRB index. Further, optionally, a frequency-domain code-domain resource index may be determined first, and the PRB index is determined based on the frequency-domain code-domain resource index. A value of the PRB index is an integer in $\{0, 1, 2, \ldots, R_{PRB}^{RCI}-1\}$, and $R_{PRB}^{RCI}$ represents a quantity of PRBs in the second resource block set or a quantity of PRBs that may be used to carry one RCI. The RCI may be carried by at least one of the $M_{PRB}^{RCI}$ PRBs. Optionally, the frequency-domain code-domain resource index meets an ascending order of the PRB index. Optionally, a relationship between the frequency-domain code-domain resource index and the PRB index meets: frequency-domain code-domain resource index=PRB index. A value of the frequency-domain code-domain resource index is an integer in $\{0, 1, 2, \ldots, R_{PRB}^{RCI}-1\}$.

Specifically, the frequency-domain code-domain resource index may be determined based on any one of or a sum of any two of: the source identifier of the first SCI, the source identifier of the second SCI, the destination identifier of the first SCI, the destination identifier of the second SCI, the member identifier of the first SCI, the member identifier of the second SCI, the service priority of the data scheduled by using the first SCI, the service priority of the data scheduled by using the second SCI, the slot index of the first SCI, the sub-channel index of the first SCI, the first time domain position or the first frequency domain position, the CRC used to generate the first SCI, and the CRC used to generate the second SCI. Alternatively, the frequency-domain code-domain resource index may be determined by performing a modulo operation on any one of: the source identifier of the first SCI, the source identifier of the second SCI, the destination identifier of the first SCI, the destination identifier of the second SCI, the member identifier of the first SCI, the member identifier of the second SCI, the service priority of the data scheduled by using the first SCI, the service priority of the data scheduled by using the second SCI, the slot index of the first SCI, the sub-channel index of the first SCI, the first time domain position or the first frequency domain position, the CRC used to generate the first SCI, and the CRC used to generate the second SCI. Alternatively, the frequency-domain code-domain resource index may be determined by performing a modulo operation by using R on any one of: the source identifier of the first SCI, the source identifier of the second SCI, the destination identifier of the first SCI, the destination identifier of the second SCI, the member identifier of the first SCI, the member identifier of the second SCI, the service priority of the data scheduled by using the first SCI, the service priority of the data scheduled by using the second SCI, the slot index of the first SCI, the sub-channel index of the first SCI, the first time domain position or the first frequency domain position, the CRC used to generate the first SCI, and the CRC used to generate the second SCI. R may be a quantity of PRBs in the first resource block set, a quantity of PRBs in the second resource block set, or a quantity of frequency-domain code-domain resources.

Optionally, any one of or the sum of any two of the foregoing information includes at least one of or a sum of at least two of the binary values/decimal values of the all or some bits.

Case 2: The third frequency domain position and the cyclic shift index are determined.

For a specific step of determining the third frequency domain position, refer to the descriptions in Case 1.

A value of the cyclic shift index may be an integer in $\{0, 1, 2, \ldots, R_{CS}^{RCI}-1\}$, $\{0, 1, 2, \ldots, R_{CSP}^{RCI}-1\}$, or $\{0, 1, 2, \ldots, R_{CSS}^{RCI}-1\}$. For example, the value of the cyclic shift index may be one or more values in 0 to 12. For example, $R_{CS}^{RCI}$ is any one value in 0 to 12, $R_{CSP}^{RCI}$ is any one value in 0 to 6, and $M_{CSS}^{RCI}$ is any one value in 0 to 4. The PRB index and/or a CS index are/is determined based on the frequency-domain code-domain resource index. Optionally, the frequency-domain code-domain resource index first meets an ascending order of the PRB index and then an ascending order of the CS index, or meets an ascending order of the CS index and then an ascending order of the PRB index. Optionally, a relationship between the frequency-domain code-domain resource index and the PRB index and/or the CS index meets: frequency-domain code-domain resource index=PRB index+$R_{PRB}^{RCI}$·CS index, or frequency-domain code-domain resource index=CS index+$R_{CS}^{RCI}$·PRB index. The CS index may alternatively be a CS pair index, or the CS index may be a CS set index. A CS pair includes two CS indexes, and a CS set includes at least two CS indexes. The CS index may be a cyclic shift value.

A value of the cyclic shift index is an integer in $\{0, 1, 2, \ldots, R_{CS}^{RCI}-1\}$, $\{0, 1, 2, \ldots, R_{CSP}^{RCI}-1\}$, or $\{0, 1, 2, \ldots, R_{CSS}^{RCI}-1\}$. $R_{PRB}^{RCI}$ represents a quantity of PRBs in the second resource block set or a quantity of PRBs that may be used to carry one RCI. $R_{PRB,CS}^{RCI}$ represents a total quantity of frequency-domain code-domain resources or a quantity of frequency-domain code-domain resources that may be used to carry one RCI. The RCI may be jointly carried by the CS value and at least one PRB in the frequency-domain code-domain resources.

The first terminal device may determine, based on the second resource block set and/or the PRB index, to use at least one PRB to transmit the resource conflict indication.

In the embodiment in Case 2, the first terminal device determines the third frequency domain position and the cyclic shift index. The third frequency domain position may be the PRB index. Further, optionally, a frequency-domain code-domain resource index may be determined first, and the PRB index and the cyclic shift index may be determined based on the frequency-domain code-domain resource index.

The cyclic shift index may be used to transmit the RCI, or may be used to indicate an RCI message. The cyclic shift index may be at least one of the following: the cyclic shift index, the cyclic shift pair index, the cyclic shift set index, and the cyclic shift value. Optionally, the cyclic shift value may be further determined based on the cyclic shift index, and the cyclic shift value is a cyclic shift value associated with the SCI.

With reference to Case 1 and/or Case 2, there are a plurality of implementations in which the third frequency domain position and/or the cyclic shift associated with the resource conflict indication are/is specifically determined. Further, optionally, the third frequency domain position and/or the cyclic shift associated with the resource conflict indication are/is determined based on the frequency-domain code-domain resource index. There are a plurality of implementations of determining the frequency-domain code-domain resource index. The following describes several implementations of determining the frequency-domain code-domain resource index.

Implementation 1, the frequency-domain code-domain resource index is determined based on at least one of the source identifier (ID) in the first SCI and/or the second SCI, the destination identifier (ID), the member identifier (ID), the service priority of the scheduled data, the slot index, the sub-channel index, the CRC used to generate the first SCI, the CRC used to generate the second SCI, the first time domain position, the first frequency domain position, and the second frequency domain position. The source identifier of the first SCI, the destination identifier of the first SCI, the member identifier of the first SCI, and the CRC used to generate the first SCI are carried in the first SCI. The source identifier of the second SCI, the destination identifier of the second SCI, the member identifier of the second SCI, and the CRC used to generate the second SCI are carried in the second SCI.

A method for determining the frequency-domain code-domain resource index is described below by using an example in which the determining is based on at least one of or a sum of at least two of the source identifier of the first SCI, the destination identifier of the first SCI, the member identifier of the first SCI, the service priority of the data scheduled by using the first SCI, the slot index of the first SCI, the sub-channel index of the first SCI, the first time domain position or the first frequency domain position, and the CRC used to generate the first SCI. It may be understood that, in a method of determining the frequency-domain code-domain resource index based on at least one of or a sum of at least two of the source identifier of the second SCI, the destination identifier of the second SCI, the member identifier of the second SCI, the service priority of the data scheduled by using the second SCI, the slot index of the second SCI, the sub-channel index of the second SCI, the first time domain position or the second frequency domain position, and the CRS used to generate the second SCI, only a parameter indicated by the first SCI is correspondingly changed with a parameter indicated by the second SCI.

Specifically, the frequency-domain code-domain resource index meets any one of the following expressions or is determined based on any one of the following expressions:

$$(P_{ID}) \bmod R_{PRS,CS}^{RCI}; \tag{1}$$

$$(P_{ID}+X) \bmod R_{PRS,CS}^{RCI}; \tag{2}$$

$$(f(P_{ID},X)) \bmod R_{PRS,CS}^{RCI}; \text{ and} \tag{3}$$

$$(a^*+b^*+c) \bmod R. \tag{4}$$

$P_{ID}$ is at least one of or a sum of at least two of the source identifier of the first SCI, the destination identifier of the first SCI, the member identifier of the first SCI, and the CRC used to generate the first SCI. Optionally, the at least one or the sum of at least two of the foregoing information includes at least one of or a sum of at least two of binary values/decimal values of all or some bits. R represents any one of the following: the quantity of PRBs that may be used for one RCI, the quantity of frequency-domain code-domain resources that may be used for one RCI, the quantity of PRBs in the first resource block set, the quantity of PRBs in the second resource block set, or the quantity of frequency-domain code-domain resources. X is at least one of the source identifier of the first SCI, the destination identifier of the first SCI, the member identifier of the first SCI, the CRC used to generate the first SCI, the service priority of the data scheduled by using the first SCI, the slot index of the first SCI, the sub-channel index of the first SCI, the first time domain position, or the first frequency domain position. Optionally, the at least one includes at least one of the binary values/decimal values of all or some bits. mod represents a modulo operation, and (•)mod R represents a modulo operation by using R. $f(P_{ID}, X)$ represents information about the frequency-domain code-domain resource index jointly indicated by $P_{ID}$ and X. a, b, and c are adjustment factors, and values may be any value from 0 to 1.

The modulo (mod) operation in the foregoing relationship may be used to distinguish different $P_{ID}$ or terminal devices associated with $P_{ID}$ by using limited frequency domain and/or code domain resources, so that overheads can be reduced.

As shown in FIG. 9, the first terminal device receives the candidate resource type information: The second resource block set is associated with the start sub-channel 0 #in the sub-channels 0 #and 4 #. After determining that the second resource block set is two PRBs, the frequency-domain code-domain resource index may be further determined according to Implementation 1, and the third frequency domain position is determined based on the frequency-domain code-domain resource index. For example, the third frequency domain position is a PRB whose index is 0 in the two PRBs (indexed with 0 and 1 respectively). Alternatively, the frequency-domain code-domain resource index may be further determined according to Implementation 1, and the third frequency domain position and the cyclic shift associated with the resource conflict indication are determined based on the frequency-domain code-domain resource index. The third frequency domain position may be a PRB whose index is 0 in two PRBs (indexed with 0 and 1 respectively), and the cyclic shift associated with the resource conflict indication may be a cyclic shift whose cyclic shift value is 3.

Implementation 2: The frequency-domain code-domain resource index is determined based on the service priority of the data scheduled by using the first SCI and/or the service priority of the data scheduled by using the second SCI.

Specifically, the frequency-domain code-domain resource index may be determined first, and the third frequency domain position may be determined based on the frequency-domain code-domain resource index.

The frequency-domain code-domain resource index may be determined based on the service priority of the data scheduled by using the first SCI. When the first terminal device determines that the service priority of the data scheduled by using the first SCI is greater than the first priority threshold or the second priority threshold ($Th_{prio}$), the frequency-domain code-domain resource index meets any one of the following expressions or is determined based on any one of the following expressions:

$$(Th_{prio}) \bmod R; \tag{1}$$

$$(Th_{prio}+X) \bmod R; \tag{2}$$

$$(f(Th_{prio},X)) \bmod R; \text{ and} \tag{3}$$

$$(a*+b*+c) \bmod R. \tag{4}$$

Further, the third frequency domain position is determined based on the frequency-domain code-domain resource index. Refer to specific descriptions in Implementation 1. Details are not described herein again. Further, optionally, the CS associated with the SCI may be determined based on to the CS index.

Optionally, the first terminal device determines at least one of the following:
the service priority of the data scheduled by using the first sidelink control information is lower than data preset first priority threshold;
the service priority of the data scheduled by using the first sidelink control information is lower than the service priority of the data scheduled by using the second sidelink control information; or
the service priority of the data scheduled by using the first sidelink control information is lower than the second priority threshold, where the second priority threshold is associated with the signal quality and the service priority of the data scheduled by using the second sidelink control information.

Optionally, Implementation 2 includes at least one of the following two manners:

Manner 2-1: The frequency-domain code-domain resource index is determined based on the service priority of the data scheduled by using the first SCI. The first terminal device indicates the second terminal device whose priority level is higher than or equal to the service priority of the data scheduled by using the first SCI to reselect the first reserved resource.

Manner 2-2: The frequency-domain code-domain resource index is determined based on the service priority of the data scheduled by using the second SCI. The first terminal device indicates the second terminal device whose priority level is lower than or equal to the service priority of the data scheduled by using the second SCI to reselect the first reserved resource.

Optionally, usage of the manner 2-1 or the manner 2-2 is configured or preconfigured by the network device.

Optionally, a method for determining the frequency-domain code-domain resource index based on the service priority of the data scheduled by using the first SCI and/or the service priority of the data scheduled by using the second SCI includes: $Th_{prio}$ is obtained by adding A1 to or subtracting A1 from a value of the service priority of the data scheduled by using the first SCI and/or the service priority of the data scheduled by using the second SCI. A1 is an integer, for example, A1=1. Optionally, a value of A1 is configured or preconfigured by the network device.

Optionally, the frequency-domain code-domain resource index meets any one of the following expressions or is determined based on any one of the following expressions:

$$(Th_{prio}) \bmod R; \tag{1}$$

$$(Th_{prio}+X) \bmod R; \tag{2}$$

$$(f(Th_{prio},X)) \bmod R; \text{ and} \tag{3}$$

$$(a*+b*+c) \bmod R. \tag{4}$$

$Th_{prio}$ is the service priority of the data scheduled by using the first SCI and/or the service priority of the data scheduled by using the second SCI, or $Th_{prio}$ is determined based on the service priority of the data scheduled by using the first SCI and/or the service priority of the data scheduled by using the second SCI. Optionally, with reference to the manner 2-1, $Th_{prio}$ may be the service priority of the data scheduled by using the first SCI. Optionally, with reference to the manner 2-2, $Th_{prio}$ may be the service priority of the data scheduled by using the second SCI.

$f(Th_{prio}, X)$ is determined based on the service priority of the data scheduled by using the first SCI and/or the service priority of the data scheduled by using the second SCI. It may be understood that $Th_{prio}$ is obtained by adding A1 to or subtracting A1 from the value of the service priority of the data scheduled by using the first SCI and/or the service priority of the data scheduled by using the second SCI. A1 is an integer, for example, A1=1. Optionally, the value of A1 is configured or preconfigured by the network device.

As shown in FIG. 9, the first terminal device receives the candidate resource type information: The second resource block set is associated with the start sub-channel 0 #in the sub-channels 0 #and 4 #. After determining that the second resource block set is two PRBs, the frequency-domain code-domain resource index may be further determined according to Implementation 2, and the third frequency domain position is determined based on the frequency-domain code-domain resource index. For example, the third frequency domain position is a PRB whose index is 0 in the two PRBs (indexed with 0 and 1 respectively). Alternatively, the frequency-domain code-domain resource index may be further determined according to Implementation 2, and the third frequency domain position and the cyclic shift associated with the resource conflict indication are determined based on the frequency-domain code-domain resource index. The third frequency domain position may be a PRB whose index is 0 in two PRBs (indexed with 0 and 1 respectively), and the cyclic shift associated with the resource conflict indication may be a cyclic shift whose cyclic shift value is 3.

Implementation 3: The frequency-domain code-domain resource index is determined based on the slot index of the first SCI and/or the sub-channel index of the first SCI.

The frequency-domain code-domain resource index may be determined based on the slot number k and the sub-channel number $N_{subCH}^{PSCCH}$ of the first SCI. The frequency-domain code-domain resource index meets any one of the following expressions or is determined based on any one of the following expressions:

(1) if $N_{type}^{RCI}=N_{subch}^{PSCCH}$, frequency-domain code-domain resource index=k mod $N_{PSSCH}^{RCI}$;

(2) if $N_{type}^{RCI}=N_{subch}^{PSCCH}$, frequency-domain code-domain resource index=k mod $N_{PSSCH}^{RCI}$+ $N_{subCH}^{PSCCH} \cdot N_{PSSCH}^{RCI}$; and (3) if $N_{type}^{RCI}=N_{subch}$, frequency-domain code-domain resource index=k mod $N_{PSSCH}^{RCI}+N_{subch} \cdot N_{PSSCH}^{RCI}$.

Further, for determining the third frequency domain position based on the frequency-domain code-domain resource index, refer to the specific descriptions in Implementation 1. Details are not described herein again. Further, optionally, the CS associated with the SCI may be further determined based on the CS index.

Implementation 4: The frequency-domain code-domain resource index is determined based on the first time domain position or the first frequency domain position.

The frequency-domain code-domain resource index may be determined based on the slot number k of the first time domain position and the start sub-channel number $N_{subCH}^{P\text{-}SCCH}$ of the first frequency domain position. The frequency-domain code-domain resource index may meet any one of the following relationships:

(1) if $N_{type}^{RCI}=N_{subCH}^{PSCCH}$, frequency-domain code-domain resource index=k mod $N_{PSSCH}^{RCI}$;

(2) if $N_{type}^{RCI}=N_{subCH}^{PSCCH}$, frequency-domain code-domain resource index=k mod $N_{PSSCH}^{RCI}$+ $N_{subCH}^{PSCCH} \cdot N_{PSSCH}^{RCI}$; and (3) if $N_{type}^{RCI}=N_{subch}$, frequency-domain code-domain resource index=k mod $N_{PSSCH}^{RCI}+N_{subch} \cdot N_{PSSCH}^{RCI}$.

Further, for determining the third frequency domain position based on the frequency-domain code-domain resource index, refer to the specific descriptions in Implementation 1. Details are not described herein again. Further, optionally, the CS associated with the SCI may be further determined based on the CS index.

Implementation solution D: The first terminal device determines a second resource block set based on the first frequency domain position, and determines the third frequency domain position and/or a cyclic shift associated with the resource conflict indication.

The first terminal device determines the second resource block set based on the first frequency domain position, and determines the third frequency domain position in the second resource block set.

The first frequency domain position is one or more sub-channels occupied by the first reserved resource; and
  the second resource block set is associated with a start sub-channel in the one or more sub-channels; or
  the second resource block set is associated with the one or more sub-channels.

In this implementation solution, for a manner of determining the third frequency domain position and/or the cyclic shift associated with the resource conflict indication, refer to the implementation solution C. A difference lies in that, in this implementation solution, the candidate resource type information indicates that the second resource block set is associated with a start sub-channel of the PSSCH at the position of the first reserved resource (that is, $N_{type}^{RCI}=1$), or is associated with one or more sub-channels in $N_{subCH}^{PSCCH}$ sub-channels of the PSSCH at the position of the first reserved resource (that is, $N_{type}^{RCI}=N_{subCH}^{PSCCH}$).

It should be noted that a difference between the implementation solution D and the implementation solution C is as follows: The second resource block set is determined based on the frequency domain position of the first SCI, and the first terminal device determines the second resource block set based on the first frequency domain position.

Implementation solution E: The first terminal device determines a second resource block set based on the second frequency domain position, and determines the third frequency domain position and/or a cyclic shift associated with the resource conflict indication.

The second frequency domain position is one or more sub-channels occupied by the second reserved resource; and
  the second resource block set is associated with a start sub-channel in the one or more sub-channels; or
  the second resource block set is associated with the one or more sub-channels.

Figure 10A:
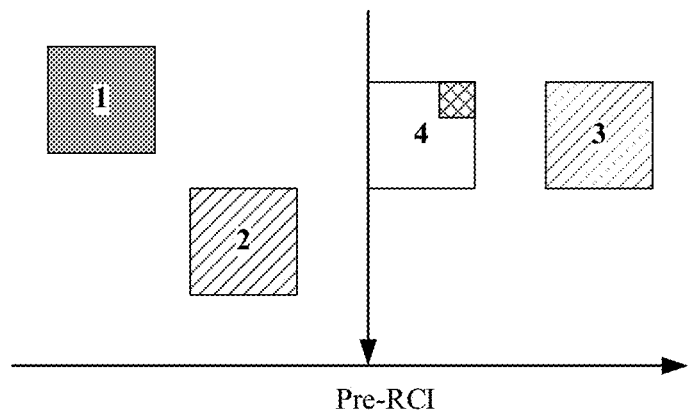
FIG. 10a to FIG. 10c are respectively schematic diagrams in which a third frequency domain position is associated with a start sub-channel, one or more sub-channels, and an entire resource pool.
Figure 10B:
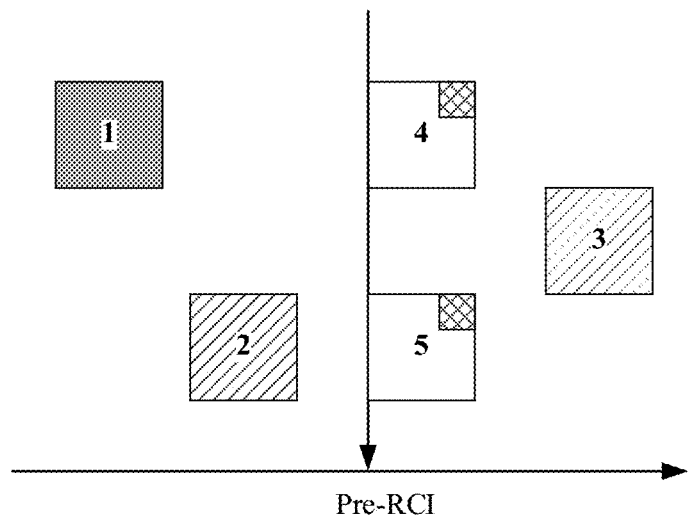
Figure 10C:
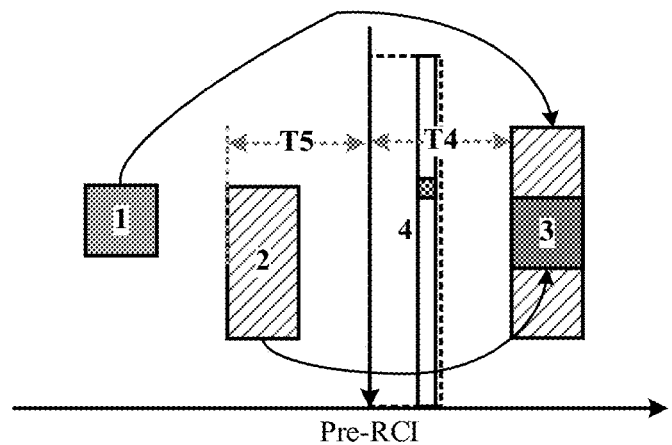

In this implementation solution, for a manner of determining the second resource block set and the third frequency domain position, refer to the implementation solution C. A difference lies in that, in this implementation solution, the candidate resource type information indicates that the second resource block set is associated with a start sub-channel of the PSSCH at the position of the second reserved resource (that is, $N_{type}^{RCI}=1$), or is associated with one or more sub-channels in $N_{subCH}^{PSCCH}$ sub-channels of the PSSCH at the position of the second reserved resource (that is, $N_{type}^{RCI}=N_{subCH}^{PSCCH}$). As shown in FIG. 10b, in the implementation solution C, the first terminal device may determine the second resource block set based on the frequency domain position of the first SCI, and/or determine the second resource block set based on the frequency domain position of the second SCI. In the implementation solution D, the first terminal device may determine the second resource block set based on the first frequency domain position (namely, the frequency domain position of the first reserved resource). In the implementation solution E, the first terminal device may determine the second resource block set based on the second frequency domain position (namely, the frequency domain position of the second reserved resource). As shown in FIG. 10a, the first reserved resource completely overlaps with the second reserved resource in frequency domain. In this case, the third frequency domain position and the first frequency domain position and/or the second frequency domain position may determine the second resource block set. Therefore, the foregoing implementation solutions may be implemented separately or in combination. Optionally, as shown in FIG. 10c, the third frequency domain position may alternatively be associated with all sub-channels of the entire resource pool.

It should be noted that a difference between the implementation solution E and the implementation solution C is as follows: The second resource block set is determined based on the frequency domain position of the first SCI, and the first terminal device determines the second resource block set based on the second frequency domain position.

With reference to at least one of the implementation solution C to the implementation solution E, in an implementation, the candidate resource type information indicates that the second resource block set is associated with the start sub-channel in the one or more sub-channels, or the candidate resource type information indicates that the second resource block set is associated with the one or more sub-channels. In this case, there may be another field, for example, the first field, for indicating to determine the second resource block set based on the frequency domain position of the first SCI or the first frequency domain position. It may be understood that the candidate resource type information and the first field may be combined to determine that the second resource block set is associated with the start sub-channel in the one or more sub-channels occupied by the first reserved resource, the second resource block set is associated with the plurality of sub-channels occupied by the first reserved resource, the second resource block set is associated with a start sub-channel in one or more sub-channels occupied by the first sidelink control information and the data scheduled by using the first sidelink control information, or the second resource block set is associated with the plurality of sub-channels occupied by the first sidelink control information and the data scheduled by using the first sidelink control information.

With reference to at least one of the implementation solution C to the implementation solution E, in another implementation, the candidate resource type information indicates both a sub-channel associated with the second resource block set and a specific resource of the sub-channel. That is, it can be determined, based only on the candidate resource type information, that the second resource block set is associated with the start sub-channel in the one or more sub-channels occupied by the first reserved resource, the second resource block set is associated with the plurality of sub-channels occupied by the first reserved resource, the second resource block set is associated with a start sub-channel in one or more sub-channels occupied by the first sidelink control information and the data scheduled by using the first sidelink control information, or the second resource block set is associated with the plurality of sub-channels occupied by the first sidelink control information and the data scheduled by using the first sidelink control information. In other words, the candidate resource type information indicates that the second resource block set is associated with the start sub-channel in the one or more sub-channels occupied by the first reserved resource, the second resource block set is associated with the plurality of sub-channels occupied by the first reserved resource, the second resource block set is associated with the start sub-channel in the one or more sub-channels occupied by the first sidelink control information and the data scheduled by using the first sidelink control information, or the second resource block set is associated with the plurality of sub-channels occupied by the first sidelink control information and the data scheduled by using the first sidelink control information.

With reference to at least one of the implementation solution C to the implementation solution E, in another embodiment, as shown in FIG. 6c, the first terminal device determines that the resource conflict is a half-duplex conflict. In this scenario, a case in which the RCI may be sent may be considered. The first terminal device cannot monitor resource usage in a sending slot. Therefore, in a resource sensing process, all slots corresponding to the slot within the resource selection window can be excluded based on only the period configured in the resource pool. Especially when a small period is allowed in the resource pool, exclusion of the whole slot may exclude a large quantity of resources within the resource selection window. Therefore, this case can be avoided by using the RCI. A physical layer parameter of first monitoring is the priority in the first SCI or the like.

The first terminal device cannot perform receiving in the sending slot. However, especially in a case in which the second terminal device broadcasts and/or multicasts, the third terminal device may receive a message (namely, a PSCCH and a PSSCH) of the second terminal device. Therefore, in this embodiment, the first terminal device can detect the conflict and request the second terminal device to change a transmission position. A physical layer parameter monitored by the first terminal device is a cast type field, a priority, a resource reservation period, or the like in the first SCI and/or the second SCI.

However, a plurality of terminal devices in the resource pool are sending messages, and frequent RCI indications may cause confusion. After all, changing a transmission resource for the first time may be considered as an aperiodic transmission, because there may be no SCI to reserve a resource after the change. In this case, the receive terminal device needs to perform blind detection, to receive a resource of a changed position. Therefore, it is more efficient to send the RCI when a channel status is good. A physical layer parameter measured by the first terminal device may be a channel congestion degree of the resource pool.

Specifically, in a case, after decoding the first SCI and the second SCI, the first terminal device obtains a cast type field in the first SCI and the second SCI. When the cast type field is used to indicate that the transmission type is broadcast or multicast, the first terminal device determines to send the RCI to the second terminal device. For example, the cast type field is used to indicate the transmission type by using 2 bits. When the field is "00", it indicates that the transmission type is broadcast; when the field is "01", it indicates that the transmission type is multicast option 2 or the HARQ-ACK information is multicast of an ACK or a NACK; and when the field is "11", it indicates that the transmission type is multicast option 1 or the HARQ-ACK information is multicast of a NACK. When the cast type field in the first SCI and/or the second SCI is "00", "01", or "11", the first terminal device sends the RCI to the second terminal device.

In another case, the first terminal device measures the channel congestion degree of the resource pool, for example, measure a channel busy ratio (CBR). If the channel congestion degree is less than or equal to a first threshold (for example, $TH_{CBR}$), when the channel congestion degree is greater than or equal to the first threshold (for example, $TH_{CBR}$), or the channel congestion degree is within a first preset range (for example, $[TH_{CBR1}, TH_{CBR2}]$), the first terminal device sends the RCI to the second terminal device.

In another case, after decoding the first SCI and the second SCI, the first terminal device obtains that a resource reservation period indicated by the first SCI is per1, and obtains that a resource reservation period indicated by the second SCI is per2. The first terminal device determines resource reservation periods {per3, per4, per5, . . . } indicated by SCI that can be detected on all sub-channels in the slot in which the first SCI is located. If all periods in the resource reservation period set {per3, per4, per5, . . . } are greater than or equal to a preconfigured period threshold $TH_{per}$ (for example, $TH_{per}$=100 ms), the first terminal device sends the RCI to the second terminal device. Further, the threshold is valid only when there is a period less than $TH_{per}$ (for example, $TH_{per}$=100 ms) in a period set configured in the resource pool.

A meaning of RCI may be as follows.

All sub-channel resources in a slot in which a periodic resource corresponding to an undetected slot is located are excluded based on only all periods greater than $TH_{per}$ in the period set configured in the resource pool.

Alternatively, all sub-channel resources in the slot in which the periodic resource corresponding to the undetected slot is located are excluded based on the period set configured in the resource pool.

For example, a resource reservation period set allowed by the network device in the resource pool is {10, 50, 100, 200, 500, 800, 1000} with a unit of millisecond. The preconfigured period threshold $TH_{per}$ is 100 ms. If this threshold is configured, this function is enabled.

As shown in FIG. 10*c*, the second terminal device sends the first SCI on R1, and reserves a resource on R3. The third terminal device sends the second SCI on R2, and reserves a resource on R5. The first terminal device monitors the first SCI and the second SCI, and finds, through decoding, that R3 and R5 are in a same slot but frequency domain resources do not overlap. Period values in the first SCI and second SCI decoded by the first terminal device are per1 and per2 respectively.

If per2>$Th_{per}$, the first terminal device indicates the second terminal device to exclude, in the resource selection process and based on all period values that are greater than $TH_{per}$ and that are in periods allowed by the resource pool, all sub-channel resources in a periodic slot corresponding to a slot in which R3 is located within the resource selection window.

If per1>$TH_{per}$, the first terminal device indicates the third terminal device to exclude, in the resource selection process and based on all period values that are greater than $TH_{per}$ and that are in periods allowed by the resource pool, all sub-channel resources in a periodic slot corresponding to a slot in which R5 is located within the resource selection window.

If reserved resources corresponding to a plurality of $SCI_i$ exist in a slot in which R3 and R5 are located, if all $pre_i$ are greater than $TH_{per}$, the first terminal device indicates the second terminal device to exclude, based on all period values that are greater than $TH_{per}$ and that are in periods allowed by the resource pool, all sub-channel resources in a periodic slot corresponding to the slot in which R3 and R5 are located within the resource selection window.

If per2<=$TH_{per}$, the first terminal device indicates the second terminal device to exclude, in the resource selection process and based on all period values allowed by the resource pool, all sub-channel resources in a periodic slot corresponding to a slot in which R3 is located within the resource selection window. Alternatively, the first terminal device does not send the RCI.

If per1<=$TH_{per}$, the first terminal device indicates the third terminal device to exclude, in the resource selection process and based on all period values allowed by the resource pool, all sub-channel resources in a periodic slot corresponding to a slot in which R5 is located within the resource selection window. Alternatively, the first terminal device does not send the RCI.

If reserved resources corresponding to a plurality of $SCI_i$ exist in a slot in which R3 and R5 are located, if $pre_i$ is less than or equal to $TH_{per}$, the first terminal device indicates that a plurality of terminal devices B need exclude, in the resource selection process and based on all period values allowed by the resource pool, all sub-channel resources in a periodic slot corresponding to a slot in which R3 is located within the resource selection window. Alternatively, the first terminal device does not send the RCI.

It may be noted that, to reduce resource overheads in the system, the last three cases in which the first terminal device does not send the RCI are more reasonable.

In addition, because an action performed by the second terminal device or the third terminal device after receiving the indication of the RCI is not to change the transmission resource, the RCI of the first terminal device should have a corresponding explicit or implicit identifier, indicating that the RCI is an RCI for a half-duplex resource exclusion process, for example, different frequency domain PRB resources, code domain resources, and content associated with the RCI.

In another case, the first terminal device may alternatively send the RCI to the second terminal device whose resource selection manner is random selection, to indicate the second terminal device to change the first reserved resource. Because the first terminal device needs to know a resource selection mode of the second terminal device, a corresponding "resource selection mode indication" field needs to be added to sidelink information (such as SCI) of the second terminal device.

S102: The first terminal device sends the resource conflict indication to the second terminal device at the second time domain position and/or the third frequency domain position, where the resource conflict indication indicates to change the first reserved resource. Correspondingly, the second terminal device receives the resource conflict indication at the second time domain position and/or the third frequency domain position.

Specifically, the second terminal device receives the RCI at the second time domain position and/or the third frequency domain position. A manner in which the second terminal device determines the second time domain position and/or the third frequency domain position and/or a cyclic shift associated with the resource conflict indication is the same as that of the first terminal device.

For a time domain conflict, the second terminal device determines a third time domain position in a same manner as that of the first terminal device. If the second terminal device receives the RCI at the third time domain position, the third time domain position is consistent with the second time domain position, and the RCI is sent to the second terminal device.

For a time-frequency conflict, the second terminal device determines the first resource block set and the second resource block set in a same manner as that of the first terminal device.

Further, the second terminal device determines, in the second resource block set, a fourth frequency domain position and/or a fourth cyclic shift associated with the resource conflict indication.

If the second terminal device receives the RCI at the fourth frequency domain position, it may be determined that the fourth frequency domain position is consistent with the third frequency domain position, and the RCI is sent to the second terminal device.

Optionally, if the RCI received by the second terminal device is associated with the fourth cyclic shift, it may be determined that the fourth cyclic shift is consistent with the cyclic shift associated with the resource conflict indication, and the RCI is sent to the second terminal device.

The second terminal device determines the fourth frequency domain position in the following implementations.

In an implementation, the second terminal device determines the fourth frequency domain position based on the source identifier of the first SCI, and the second terminal device attempts to receive the RCI at the fourth frequency domain position. If the RCI is received, it indicates that the RCI is sent to the second terminal device. If the fourth frequency domain position is consistent with the third frequency domain position determined by the first terminal device, the second terminal device may perform a subsequent operation based on the RCI.

In another implementation, the second terminal device determines the fourth frequency domain position based on the destination identifier of the first SCI, and the second terminal device attempts to receive the RCI at the fourth frequency domain position. If the RCI is received, it indicates that the RCI is sent to the second terminal device. If the fourth frequency domain position is consistent with the third frequency domain position determined by the first terminal device, the second terminal device may perform a subsequent operation based on the RCI.

In still another implementation, the second terminal device determines the fourth frequency domain position based on the member identifier of the first SCI, and the second terminal device attempts to receive the RCI at the fourth frequency domain position. If the RCI is received, it indicates that the RCI is sent to the second terminal device. If the fourth frequency domain position is consistent with the third frequency domain position determined by the first terminal device, the second terminal device may perform a subsequent operation based on the RCI.

In still another implementation, the second terminal device may obtain, based on the first SCI sent by the second terminal device, a second service priority of the data scheduled by using the first SCI. Then, the second terminal device receives the RCI at the fourth frequency domain position, and may obtain, through parsing, a first priority corresponding to the second frequency domain position. If the second service priority is higher than or equal to the first service priority, it indicates that the RCI is sent to the second terminal device, and the second terminal device may perform a subsequent operation based on the RCI.

In still another implementation, the second terminal device determines the fourth frequency domain position based on the slot index of the first SCI sent by the second terminal device and the sub-channel index of the first SCI, and the second terminal device attempts to receive the RCI at the fourth frequency domain position. If the RCI is received, it indicates that the RCI is sent to the second terminal device. If the fourth frequency domain position is consistent with the third frequency domain position determined by the first terminal device, the second terminal device may perform a subsequent operation based on the RCI.

In still another implementation, the second terminal device determines the fourth frequency domain position based on the first time domain position or the first frequency domain position, and the second terminal device attempts to receive the RCI at the fourth frequency domain position. If the RCI is received, it indicates that the RCI is sent to the second terminal device. If the fourth frequency domain position is consistent with the third frequency domain position determined by the first terminal device, the second terminal device may perform a subsequent operation based on the RCI.

S103: The second terminal device cancels, based on the resource conflict indication, transmission of data and/or control information on the first reserved resource, and reselect the first reserved resource.

If the first terminal device indicates the second terminal device to change the first reserved resource, the second terminal device cannot transmit the data and/or the control information on the first reserved resource, and needs to reselect the first reserved resource. The second SCI indicates several reserved resources. Because the first terminal device indicates the second terminal device to change the first reserved resource, the second terminal device may perform data transmission on the reserved resource.

In addition, if the second terminal device is indicated to change the first reserved resource, the second terminal device preferentially changes the first reserved resource to a reserved resource. To be specific, if the first SCI indicates more than two resources, that is, the first SCI is located on R1, and indicates R2 and R3, and change of the transmission resource is indicated to be performed on R2, and an interval between R1 and R3 is less than or equal to 32 slots, the first terminal device performs transmission on R3. The reselected reserved resource may be a reserved resource before or after the first time domain position.

Alternatively, the RCI may indicate preemption denial information. The preemption denial information indicates, to the second terminal device, that the first terminal device indicates not to change the first reserved resource. In other words, even if the second terminal device knows, based on the RCI, that the first reserved resource conflicts with the second reserved resource, the second terminal device does not change the first reserved resource.

According to the resource conflict indication transmission method provided in this embodiment of this application, when determining that the reserved resource indicated by the first SCI conflicts with the reserved resource indicated by the second SCI, the first terminal device sends the RCI to the second terminal device at the determined time domain and/or frequency domain position before the conflict position, to indicate the second terminal device to change the first reserved resource. The RCI is sent at the determined time domain and/or frequency domain position, so that reliability of RCI transmission is improved.

Figure 11:
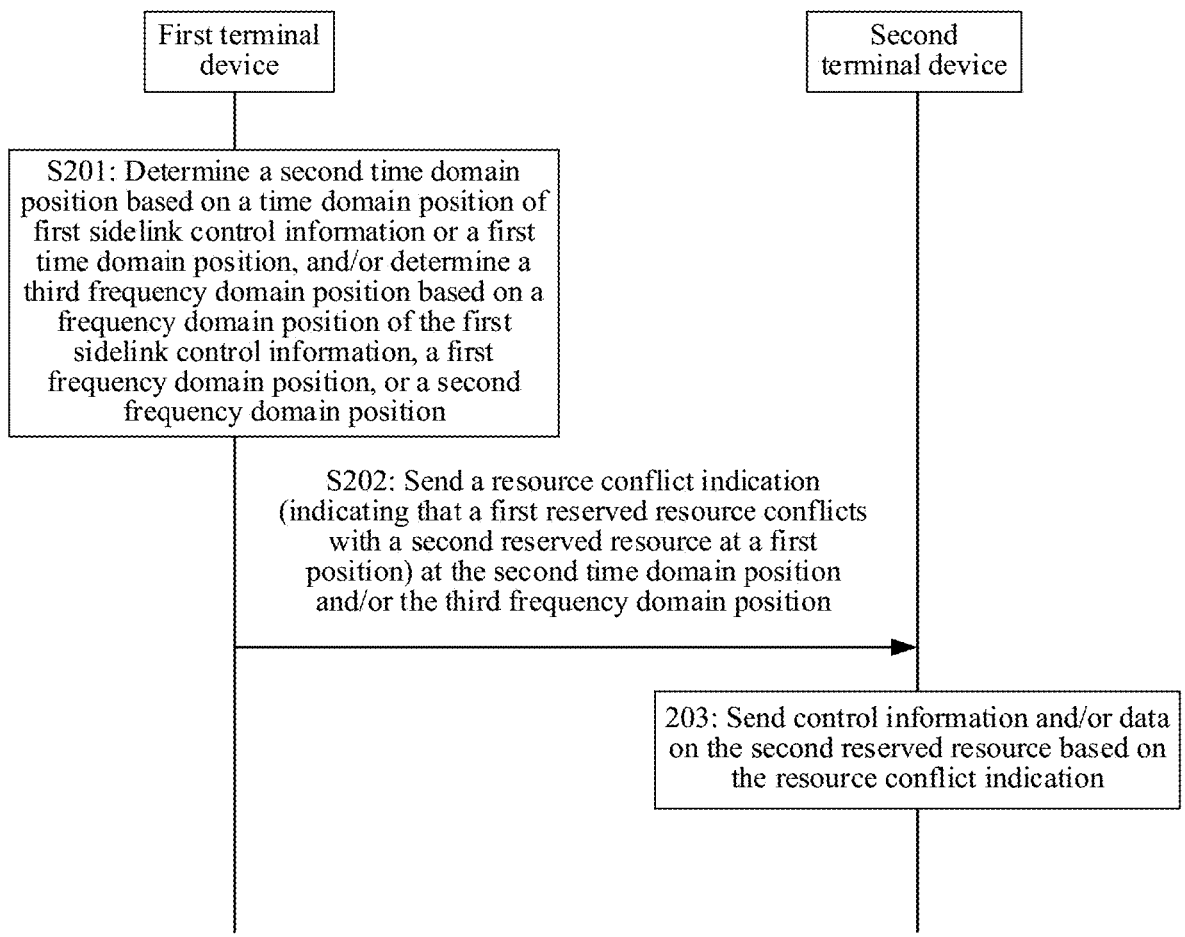
FIG. 11 is a schematic flowchart of another pre-RCI transmission method according to an embodiment of this application.

FIG. 11 is a schematic flowchart of another resource conflict indication transmission method according to an embodiment of this application. This embodiment is a pre-RCI scenario, and an RCI is sent to a protected terminal device. For example, the method includes the following steps.

S201: A first terminal device determines a second time domain position based on a time domain position of first sidelink control information or a first time domain position, and/or determines a third frequency domain position based on a frequency domain position of the first sidelink control information, a first frequency domain position, or a second frequency domain position.

For specific implementation of this step, refer to step S101 in the embodiment shown in FIG. 7.

A difference is that if the first terminal device determines a second resource block set based on the second frequency domain position, and determines the third frequency domain position in the second resource block set, candidate resource type information indicates that the second resource block set is associated with a start sub-channel of a PSSCH scheduled on a second reserved resource (that is, $N_{type}^{RCI}=1$), or is associated with one or more sub-channels in $N_{subch}^{PSSCH}$ sub-channels of the PSSCH scheduled on the second reserved resource (that is, $N_{type}^{RCI}=N_{subch}^{PSSCH}$).

The first terminal device determines the third frequency domain position in the second resource block set based on at least one of a source identifier of second SCI, a destination identifier of the second SCI, a member identifier of the second SCI, a service priority of data scheduled by using the second SCI, the first time domain position, or the first frequency domain position.

S202: The first terminal device sends the resource conflict indication to a second terminal device at the second time domain position and/or the third frequency domain position. The resource conflict indication indicates that the second reserved resource conflicts with a first reserved resource at a first position, indicates that the first reserved resource conflicts, or indicates that the second reserved resource conflicts. Correspondingly, the second terminal device receives the RCI.

For specific implementation of this step, refer to step S102 in the embodiment shown in FIG. 7.

Different from the embodiment shown in FIG. 7, the first terminal device sends the RCI to the second terminal device, where the RCI indicates that the second reserved resource conflict with the first reserved resource, and the second terminal device may send control information and/or data on the second reserved resource without needing to reselect the reserved resource.

Optionally, the first terminal device may alternatively send the RCI to the second terminal device. The RCI indicates to change the first reserved resource.

Therefore, by using the resource conflict indication, a resource conflict is not caused, and transmission reliability can be improved.

The second terminal device receives the RCI at the second time domain position and/or the third frequency domain position. A manner in which the second terminal device determines the second time domain position and/or the third frequency domain position and/or a cyclic shift associated with the resource conflict indication is the same as that of the first terminal device.

For a time domain conflict, the second terminal device determines a third time domain position in a same manner as that of the first terminal device. If the second terminal device receives the RCI at the third time domain position, the third time domain position is consistent with the second time domain position, and the RCI is sent to the second terminal device.

For a time-frequency conflict, the second terminal device determines a first resource block set and the second resource block set in a same manner as that of the first terminal device.

Further, the second terminal device determines a fourth frequency domain position in the second resource block set.

If the second terminal device receives the RCI at the fourth frequency domain position, it may be determined that the fourth frequency domain position is consistent with the third frequency domain position, and the RCI is sent to the second terminal device.

The second terminal device determines the fourth frequency domain position in the following implementations.

In an implementation, the second terminal device determines the fourth frequency domain position based on the source identifier of the second SCI. Then, the second terminal device attempts to receive the RCI at the fourth frequency domain position. If the RCI is received, it indicates that the RCI is sent to the second terminal device, and the fourth frequency domain position is consistent with the third frequency domain position determined by the first terminal device. In this case, the second terminal device may perform a subsequent operation based on the RCI.

In another implementation, the second terminal device determines the fourth frequency domain position based on the destination identifier of the second SCI. Then, the second terminal device attempts to receive the RCI at the fourth frequency domain position. If the RCI is received, it indicates that the RCI is sent to the second terminal device, and the fourth frequency domain position is consistent with the third frequency domain position determined by the first terminal device. In this case, the second terminal device may perform a subsequent operation based on the RCI.

In still another implementation, the second terminal device determines the fourth frequency domain position based on the member identifier of the second SCI. Then, the second terminal device attempts to receive the RCI at the fourth frequency domain position. If the RCI is received, it indicates that the RCI is sent to the second terminal device, and the fourth frequency domain position is consistent with the third frequency domain position determined by the first terminal device. In this case, the second terminal device may perform a subsequent operation based on the RCI.

In still another implementation, the second terminal device may obtain, based on the second SCI sent by the second terminal device, a second service priority of data scheduled by using the second SCI. Then, the second terminal device receives the RCI at the third frequency domain position, and may obtain a first priority corresponding to the third frequency domain position through parsing. If the second service priority is higher than or equal to the first service priority, it indicates that the RCI is sent to the second terminal device. The second terminal device may perform a subsequent operation based on the RCI.

In still another implementation, the second terminal device determines the fourth frequency domain position based on the first time domain position and/or the first frequency domain position, and the second terminal device attempts to receive the RCI at the fourth frequency domain position. If the RCI is received, it indicates that the RCI is sent to the second terminal device, and the fourth frequency domain position is consistent with the third frequency domain position determined by the first terminal device. In this case, the second terminal device may perform a subsequent operation based on the RCI.

S203: The second terminal device sends the control information and/or the data on the second reserved resource based on the resource conflict indication.

For specific implementation of this step, refer to step S103 in the embodiment shown in FIG. 7.

According to the resource conflict indication transmission method provided in this embodiment of this application, when the first reserved resource indicated by the first SCI conflicts with the second reserved resource indicated by the second SCI, before the conflict occurs, the terminal device sends the RCI to the second terminal device at the determined time domain and/or frequency domain position, to indicate a third terminal device that first reserved resource conflicts with the second reserved resource. The second terminal device may still send the control information and/or the data on the second reserved resource. The RCI is sent at the determined time domain and/or frequency domain position, so that reliability of RCI transmission is improved.

Figure 12A:
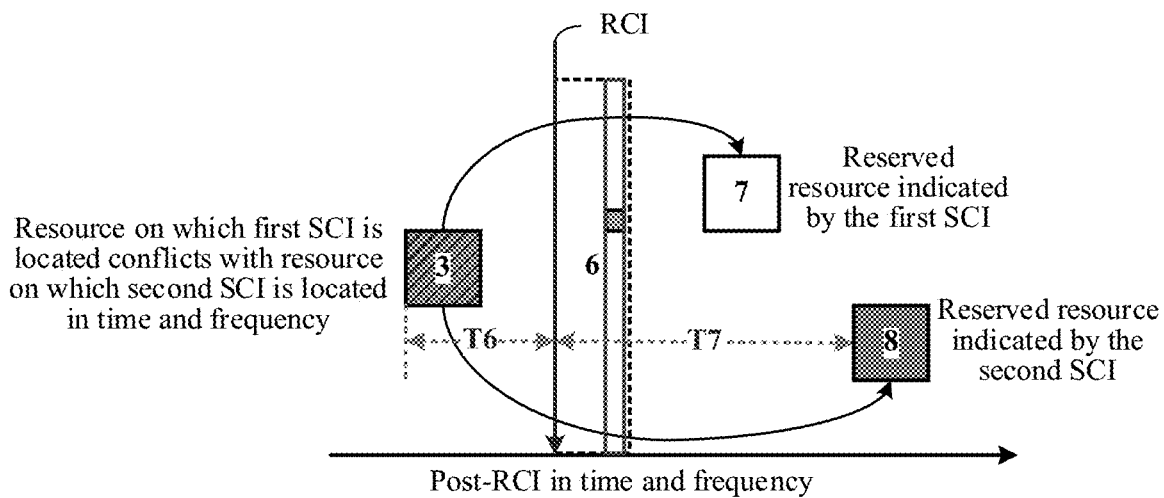
FIG. 12a and FIG. 12b each are a schematic diagram of a scenario in which a post-RCI is performed during a time domain conflict or a time-frequency conflict according to an embodiment of this application.
Figure 12B:
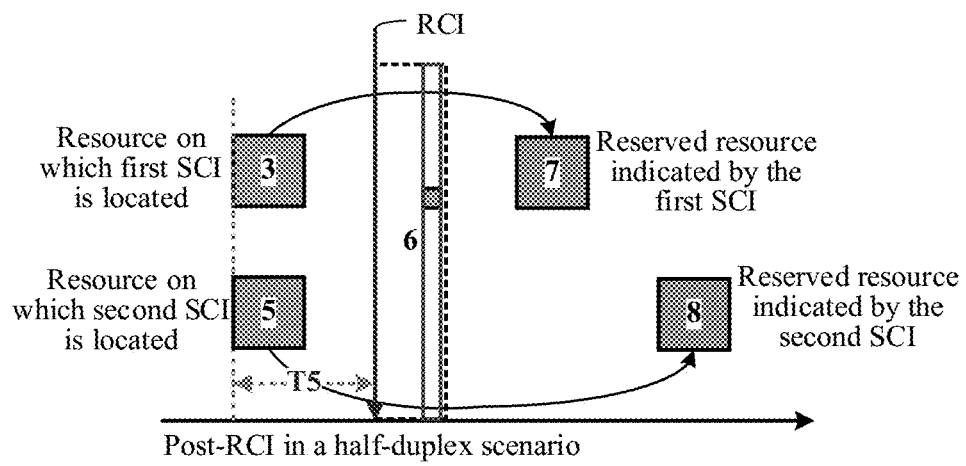

FIG. 12*a* is a schematic diagram of providing a post-RCI after a time-frequency conflict occurs, and FIG. 12*b* is a schematic diagram of providing a post-RCI after a time domain conflict occurs.

In FIG. 12*a*, the second terminal device sends the first SCI at the first time domain position and the first frequency domain position (R3), where the first SCI indicates a reserved resource shown by R7. The third terminal device sends the second SCI at the first time domain position and the second frequency domain position (R3), where the second SCI indicates a reserved resource shown by R8. After receiving the first SCI and the second SCI, the first terminal device decodes the first SCI and the second SCI, and determines that the first SCI conflicts with the second SCI in time and frequency. Specifically, the resources conflict in time domain and completely overlap in frequency (that is, the first frequency domain position is the same as the second frequency domain position). In this case, the first terminal device sends the RCI after R3. This RCI is referred to as a post-RCI. Specifically, a resource of the RCI is located in a slot in which R4 is located, and a frequency domain position is determined based on the first frequency domain position of the first SCI, the second frequency domain position of the second SCI, or a frequency domain position of the reserved resource indicated by the first SCI.

In FIG. 12*b*, the second terminal device sends the first SCI on R3 (the first time domain position and the first frequency domain position), where the first SCI indicates a reserved resource on R7. The third terminal device sends the second SCI on R5 (the first time domain position and the second frequency domain position), where the second SCI indicates a reserved resource on R8. R3 and R5 have a same time domain position, and the second terminal device and the third terminal device sends data 1 and data 2 respectively at the time domain position. As a result, the third terminal device cannot receive the data 1 sent by the second terminal device. After receiving the first SCI and the second SCI, the first terminal device decodes the first SCI and the second SCI, and determines that a first resource conflicts with a second resource. In this case, the first terminal device sends an RCI after the conflict occurs. This RCI is referred to as a post-RCI. Specifically, a resource of the RCI is located in a slot in which R6 is located, and a frequency domain position is determined based on the first frequency domain position of the first SCI, the second frequency domain position of the second SCI, or a frequency domain position of the reserved resource indicated by the first SCI.

Figure 13:
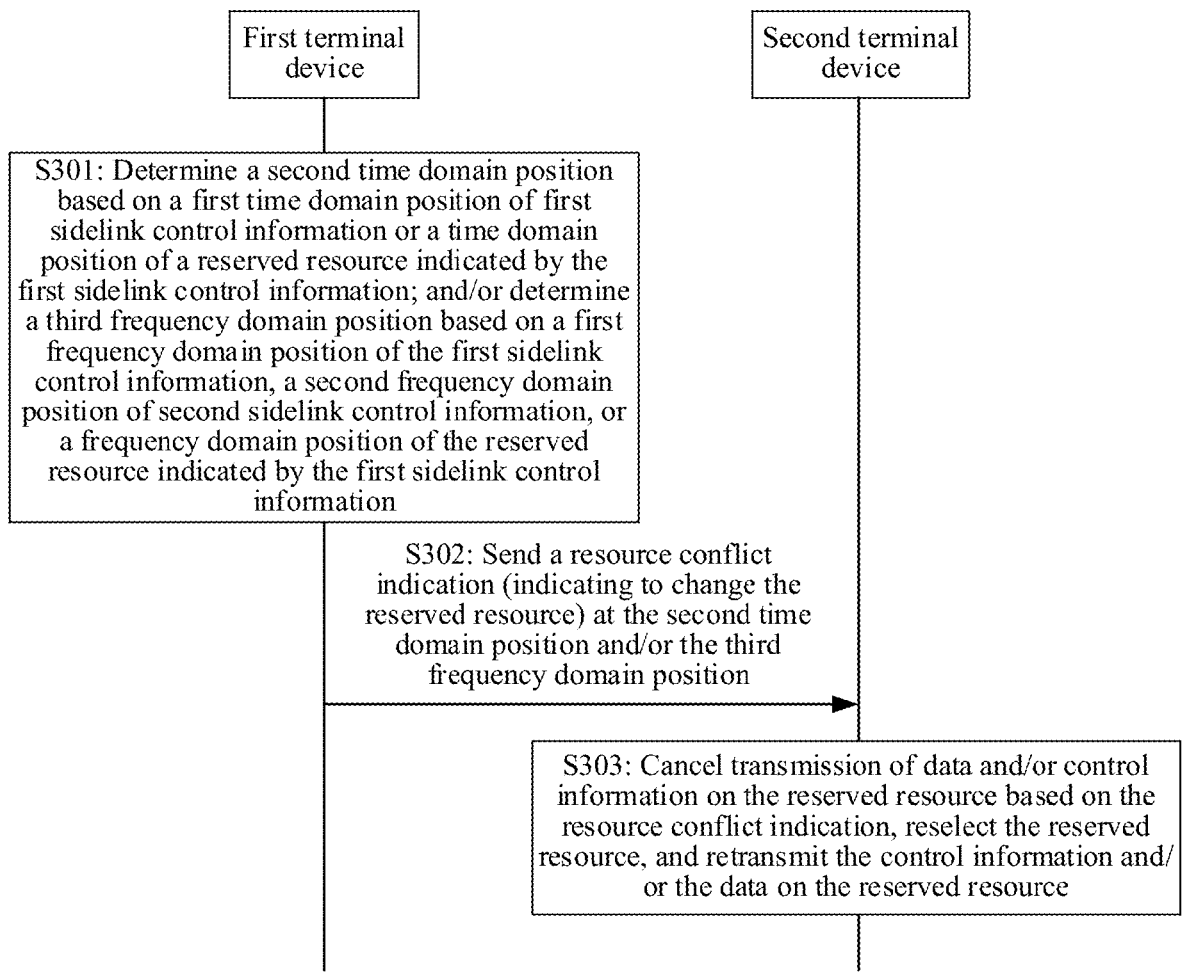
FIG. 13 is a schematic flowchart of a post-RCI transmission method according to an embodiment of this application.

FIG. 13 is a schematic flowchart of still another resource conflict indication transmission method according to an embodiment of this application. This embodiment is a post-RCI scenario, and an RCI is sent to an indicated terminal device. For example, the method includes the following steps.

S301: A first terminal device determines a second time domain position based on a first time domain position of first sidelink control information or a time domain position of a reserved resource indicated by the first sidelink control information, and/or determines, based on a first frequency domain position of the first sidelink control information, a second frequency domain position of second sidelink control information, or a frequency domain position of the reserved resource indicated by the first sidelink control information, and/or determines a third frequency domain position and/or a cyclic shift associated with the resource conflict indication.

Before step S301, a second terminal device sends first SCI at the first time domain position and the first frequency domain position, where the first SCI indicates a reserved resource 7. The first terminal device may be a receive terminal of the second terminal device, or may be a third-party terminal device. The first terminal device receives the first SCI at the first time domain position and the first frequency domain position.

A third terminal device sends the second SCI at the first time domain position and the second frequency domain position, where the second SCI indicates a reserved resource 8. The first terminal device receives the second SCI on the reserved resource.

The first terminal device decodes the first SCI and the second SCI, and detects that a resource on which the first SCI is located conflicts with a resource on which the second SCI is located in time and frequency (as shown in FIG. 12*a*) or in time domain (as shown in FIG. 12*b*).

After detecting the foregoing conflict, the first terminal device may send the RCI to the second terminal device, to indicate that the second terminal device may change the reserved resource, or retransmit control information and/or data on the reserved resource.

A service priority of service data sent by the second terminal device is lower than a service priority of service data sent by the third terminal device.

Before sending the RCI to the second terminal device, the first terminal device needs to determine a time-frequency position for sending the RCI, so that the second terminal device can reliably receive the RCI, so that reliability of data transmission is improved.

For the post-RCI, the first terminal device sends the RCI to the second terminal device after determining that the resource on which the first SCI is located conflicts with the resource on which the second SCI is located.

Optionally, when M resources in the resource indicated by the first SCI and the resource indicated by the second SCI conflict, the first terminal device sends the RCI to the second terminal device after the $1^{st}$ or latest conflicted resource. The RCI indicates a conflict status of the M reserved resources.

Optionally, when M resources in the resource indicated by the first SCI and the resource indicated by the second SCI conflict, the first terminal device sends M RCIs to the second terminal device after the $1^{st}$ or latest conflicted resource. The RCI indicates a conflict status of each of the M reserved resources.

Specifically, how to determine the second time domain position for sending the RCI is described below by using the implementation solution s F and G, and how to determine the third frequency domain position for sending the RCI is described below by using the implementation solutions C, E, and H. The implementation schemes F and G and the implementation solutions C, E, and H may be implemented separately or in combination. In addition, the second time domain position may be determined based on the implementation solutions F or G, and the third frequency domain position may be determined in another manner, for example, a frequency domain position specified in a protocol or a pre-negotiated frequency domain position. Alternatively, the third frequency domain position may be determined based on any one of the implementation solutions C, E, and H, and the second time domain position may be determined in another manner, for example, a time domain position specified in a protocol or a pre-negotiated time domain position.

Implementation solution F: The first terminal device determines the second time domain position based on the first time domain position.

To be specific, the first terminal device may determine, based on the first time domain position of the first SCI, the second time domain position for sending the RCI.

Specifically, the second time domain position may be determined based on the first time domain position and a first time interval. The first time interval may be configured by a network side. The second time domain position belongs to a conflict indication time domain position set, and time domain positions in the conflict indication time domain position set are discretely distributed (for example, periodically distributed). The second time domain position is the $1^{st}$ time domain position that is the first time interval after the first time domain position. FIG. 12a is used as an example. The second time domain position for sending RCI is the $1^{st}$ time domain position that is the first time interval T6 after R3.

FIG. 8 is a schematic diagram of determining the second time domain position. A horizontal axis represents a time domain, and a unit thereof is a slot. A vertical axis represents a frequency domain, and a unit thereof is a sub-channel. The time domain positions in the resource conflict indication time domain position set are discretely distributed. In the figure, a resource conflict indication time domain position 1 in a slot #1, a resource conflict indication time domain position 2 in a slot #5, and a resource conflict indication time domain position 3 in a slot #9 are marked. The time domain positions in the resource conflict indication time domain position set in the figure are periodically distributed, and a period is four slots.

The second time domain position for sending the RCI is the $1^{st}$ time domain position that is the first time interval after the first time domain position. ① indicates the first time interval, and ② indicates a length of time caused by discrete distribution of the time domain positions in the resource conflict indication time domain position set.

In an example 1, the first time domain position is the slot #2, the first time interval is two slots, and the length of time caused by discrete distribution of the time domain positions in the resource conflict indication time domain position set is 10 symbols. The resource conflict indication is at the resource conflict indication time domain position 2 in the slot #5. Therefore, the second time domain position is the resource conflict indication time domain position 2.

The first time interval includes at least one of the following time lengths:
  a length of time required to determine that a resource corresponding to the first sidelink control information conflicts with a resource corresponding to the second sidelink control information;
  a length of time required to generate the resource conflict indication; and
  the length of time caused by discrete distribution of the time domain positions.

In addition, if RCI resources are discretely distributed, T6 may further consider the length of time caused by discrete distribution of the time domain positions in the conflict indication time domain position set. After the first terminal device determines the first time interval based on at least one of a length of time required to determine that a resource on which the first SCI is located conflicts with a resource on which the second SCI is located and the length of time required to generate the resource conflict indication, a position that is the first time interval from the time domain position of the first SCI may not be a position of time domain resources discretely distributed in the conflict indication time domain position set. In this case, the second time domain position needs to be a position of time domain resources of a next conflict indication time domain position set after the position. Still refer to FIG. 8. In an example 2, the first time domain position is a slot #3, the first time interval is two slots, and the length of time caused by discrete distribution of the time domain positions in the resource conflict indication time domain position set is three slots plus 10 symbols. The resource conflict indication is at the resource conflict indication time domain position 3 in the slot #9. Therefore, the second time domain position is the resource conflict indication time domain position 3.

In addition, the second time domain position may further meet that an interval between the time domain position of the reserved resource indicated by the first SCI and the second time domain position is greater than or equal to a second time interval.

The second time interval includes at least one of the following time lengths:
  a length of time required by the second terminal device to decode the resource conflict indication;
  a length of time required by the second terminal device to cancel transmission of data and/or the control information on the reserved resource indicated by the first sidelink control information;
  a length of time required by the second terminal device to reselect the reserved resource; and a length of time required by the second terminal device to retransmit the control information and/or the data on the reserved resource.

Implementation solution G: The first terminal device determines the second time domain position based on the time domain position of the reserved resource indicated by the first SCI.

Specifically, the first terminal device determines the second time domain position based on a third time interval and the time domain position of the reserved resource indicated by the first SCI. The second time domain position belongs to a conflict indication time domain position set, and time domain positions in the conflict indication time domain position set are discretely distributed.

The second time domain position is a latest time domain position in a conflict indication time domain position set that is the third time interval T6 before the time domain position of the reserved resource indicated by the first SCI. FIG. 12a is used as an example. T6 is a sum of the third time interval and the length of time caused by discrete distribution of the time domain positions of the conflict indication time domain position set. There are a plurality of time domain positions discretely distributed in a conflict indication time domain position set that is the third time interval after the time domain position of the reserved resource indicated by the first SCI. The second time domain position for sending the RCI is the $1^{st}$ time domain position in the conflict indication time domain position set that is the third time interval after the time domain position of the reserved resource indicated by the first SCI. Still refer to FIG. 8. The second time domain position for sending the RCI is the latest time domain position that is the third time interval before the time domain position of the reserved resource indicated by the first SCI. ① indicates the third time interval, and ② indicates the length of time caused by discrete distribution of the time domain positions in the resource conflict indication time domain position set.

In an example 3, the time domain position of the reserved resource indicated by the first SCI is the slot #9, the third time interval is two slots, and the length of time caused by discrete distribution of the time domain positions in the resource conflict indication time domain position set is one slot plus four symbols. The resource conflict indication is at the resource conflict indication time domain position 2 in the slot #5.

The third time interval includes at least one of the following time lengths:

- a length of time required by the second terminal device to decode the resource conflict indication;
- a length of time required by the second terminal device to cancel transmission of data and/or the control information on the reserved resource indicated by the first sidelink control information;
- a length of time required by the second terminal device to reselect the reserved resource; and
- a length of time required by the second terminal device to retransmit the control information and/or the data on the reserved resource.

The third time interval may be configured by the network side.

In addition, if RCI resources are discretely distributed, T5 may further consider the length of time caused by discrete distribution of the time domain positions in the conflict indication time domain position set. To be specific, after the first terminal device determines the third time interval based on at least one of a length of time required to determine that the first reserved resource conflicts with the second reserved resource at the first position and a length of time required to generate the resource conflict indication, the position that is the third time interval from the time domain position of the first SCI may not be a position of time domain resources discretely distributed in the conflict indication time domain position set. In this case, the second time domain position needs to be a position of time domain resources of a next conflict indication time domain position set after the position. Still refer to FIG. 8. In an example 4, the time domain position of the reserved resource indicated by the first SCI is a slot #7, the third time interval is two slots, and the length of time caused by discrete distribution of the time domain positions in the resource conflict indication time domain position set is three slots plus four symbols. The resource conflict indication is at the resource conflict indication time domain position 1 in the slot #1.

The second time domain position meets that an interval between the first time domain position and the second time domain position is greater than or equal to a fourth time interval. The fourth time interval T4 includes at least one of the following time lengths:

- a length of time required to determine that a resource corresponding to the first sidelink control information conflicts with a resource corresponding to the second sidelink control information;
- the length of time required to generate the resource conflict indication;
- the length of time caused by discrete distribution of the time domain positions; and
- a length of time corresponding to an adjustment slot a.

Time of T4 may further include a=0 or 1 slot. If T4 is from a start position of a slot in which the second time domain position is located to a start position of a slot in which the first time domain position is located, a=0. If T4 is from an end position of the slot in which the second time domain position is located to the start position of the slot in which the first time domain position is located, a=1.

In the foregoing implementation solutions F and G, the RCI resources are periodically and discretely distributed. That is, the time domain positions in the conflict indication time domain position set are periodically and discretely distributed. A period of a conflict indication resource is $N_{PSSCH}^{RCI}$, and a value of $N_{PSSCH}^{RCI}$ may be 0, 1, 2, or 4 slots. A number of a slot that can be used for sidelink transmission is denoted as k, where k is an integer. In this case, the conflict indication resources may be distributed in the slot k that meets $(k+\lceil N_{PSSCH}^{RCI}/2\rceil) \bmod N_{PSSCH}^{RCI}=0$. Alternatively, there is a transmission occasion resource with a conflict indication in the slot k that meets $(k+\lceil N_{PSSCH}^{RCI}/2\rceil) \bmod N_{PSSCH}^{RCI}=0$. Alternatively, the conflict indication resources may be distributed in the slot k that meets k mod $N_{PSSCH}^{RCI}=0$. Alternatively, there is a transmission occasion resource with a conflict indication in the slot k that meets k mod $N_{PSSCH}^{RCI}=0$.

Implementation solution H: The first terminal device determines the third time domain position based on the frequency domain position of the reserved resource indicated by the first sidelink control information.

The first terminal device determines a second resource block set based on the frequency domain position of the reserved resource indicated by the first SCI, and determines the third frequency domain position in the second resource block set.

The frequency domain position of the reserved resource indicated by the first SCI is one or more sub-channels occupied by the reserved resource indicated by the first SCI; and

- the second resource block set is associated with a start sub-channel in the one or more sub-channels; or
- the second resource block set is associated with the one or more sub-channels.

In this implementation solution, for a manner of determining the second resource block set and the third frequency domain position, refer to the implementation solution C. A difference lies in that, in this implementation solution, candidate resource type information indicates that the second resource block set is associated with a start sub-channel of a PSSCH at a position of the reserved resource indicated by the first SCI (that is, $N_{type}^{RCI}=1$), or is associated with one or more sub-channels in $N_{subch}^{PSSCH}$ sub-channels of the PSSCH at the position of the reserved resource indicated by the first SCI (that is, $N_{type}^{RCI}=N_{subch}^{PSSCH}$).

In an implementation, the candidate resource type information indicates that the second resource block set is associated with the start sub-channel in the one or more sub-channels, or the candidate resource type information indicates that the second resource block set is associated with the one or more sub-channels. In this case, there may be another field, for example, a first field, for indicating to determine the second resource block set based on the frequency domain position of the first SCI or the first frequency domain position. In this case, it may be understood that the candidate resource type information and the first field may be combined to determine that the second resource block set is associated with the start sub-channel in the one or more sub-channels occupied by the first SCI, the second resource block set is associated with the plurality of sub-channels occupied by the first SCI, the second resource block set is associated with the start sub-channel in the one or more sub-channels occupied by the second SCI, the second resource block set is associated with the plurality of sub-channels occupied by the second SCI, the second resource block set is associated with a start sub-channel in one or more sub-channels occupied by data of the reserved resource indicated by the first sidelink control information, or the second resource block set is associated with the plurality of sub-channels occupied by the data of the reserved resource indicated by the first sidelink control information.

In another implementation, the candidate resource type information indicates both a sub-channel associated with the second resource block set and a specific resource of the sub-channel. That is, it can be determined, based only on the candidate resource type information, that the second resource block set is associated with a start sub-channel in one or more sub-channels occupied by the first reserved resource, the second resource block set is associated with the plurality of sub-channels occupied by the first reserved resource, the second resource block set is associated with a start sub-channel in one or more sub-channels occupied by the first sidelink control information and the data scheduled by using the first sidelink control information, or the second resource block set is associated with the plurality of sub-channels occupied by the first sidelink control information and the data scheduled by using the first sidelink control information. In other words, the candidate resource type information indicates that the second resource block set is associated with the start sub-channel in the one or more sub-channels occupied by the first SCI, the second resource block set is associated with the plurality of sub-channels occupied by the first SCI, the second resource block set is associated with the start sub-channel in the one or more sub-channels occupied by the second SCI, the second resource block set is associated with the plurality of sub-channels occupied by the second SCI, the second resource block set is associated with the start sub-channel in the one or more sub-channels occupied by the data scheduled by using the reserved resource indicated by the first SCI, or the second resource block set is associated with the plurality of sub-channels occupied by the data scheduled by using the reserved resource indicated by the first SCI.

In another embodiment, as shown in FIG. 12b, the first terminal device determines that the resource conflict is a half-duplex conflict. In this scenario, a case in which the RCI is sent may be considered. For specific cases in which the RCI can be sent and cases in which the RCI cannot be sent, refer to the descriptions of sending the pre-RCI in the half-duplex conflict scenario in the embodiment shown in FIG. 7. Details are not described herein again.

S302: The first terminal device sends the resource conflict indication to the second terminal device at the second time domain position and/or the third frequency domain position, where the resource conflict indication indicates to change the reserved resource, or indicates to retransmit control information and/or data on the reserved resource. Correspondingly, the second terminal device receives the resource conflict indication.

For specific implementation of this step, refer to step S102 in the embodiment shown in FIG. 7. In addition, the resource conflict indication may further indicate to retransmit the control information and/or the data on the reserved resource.

S303: The second terminal device cancels transmission of the data and/or the control information on the reserved resource based on the resource conflict indication, and reselects the reserved resource, or retransmits the control information and/or the data on the reserved resource.

For specific implementation of this step, refer to step S103 in the embodiment shown in FIG. 7. A difference is that if the resource conflict indication indicates to retransmit the control information and/or the data on the reserved resource, the second terminal device retransmits the control information and/or the data on the reserved resource.

According to the resource conflict indication transmission method provided in this embodiment of this application, when determining that the resource on which the first SCI is located conflicts with the resource on which the second SCI is located, the first terminal device sends the RCI to the second terminal device at the determined time domain and/or frequency domain position after the conflict position. The RCI is sent at the determined time domain and/or frequency domain position, so that reliability of RCI transmission is improved.

Figure 14:
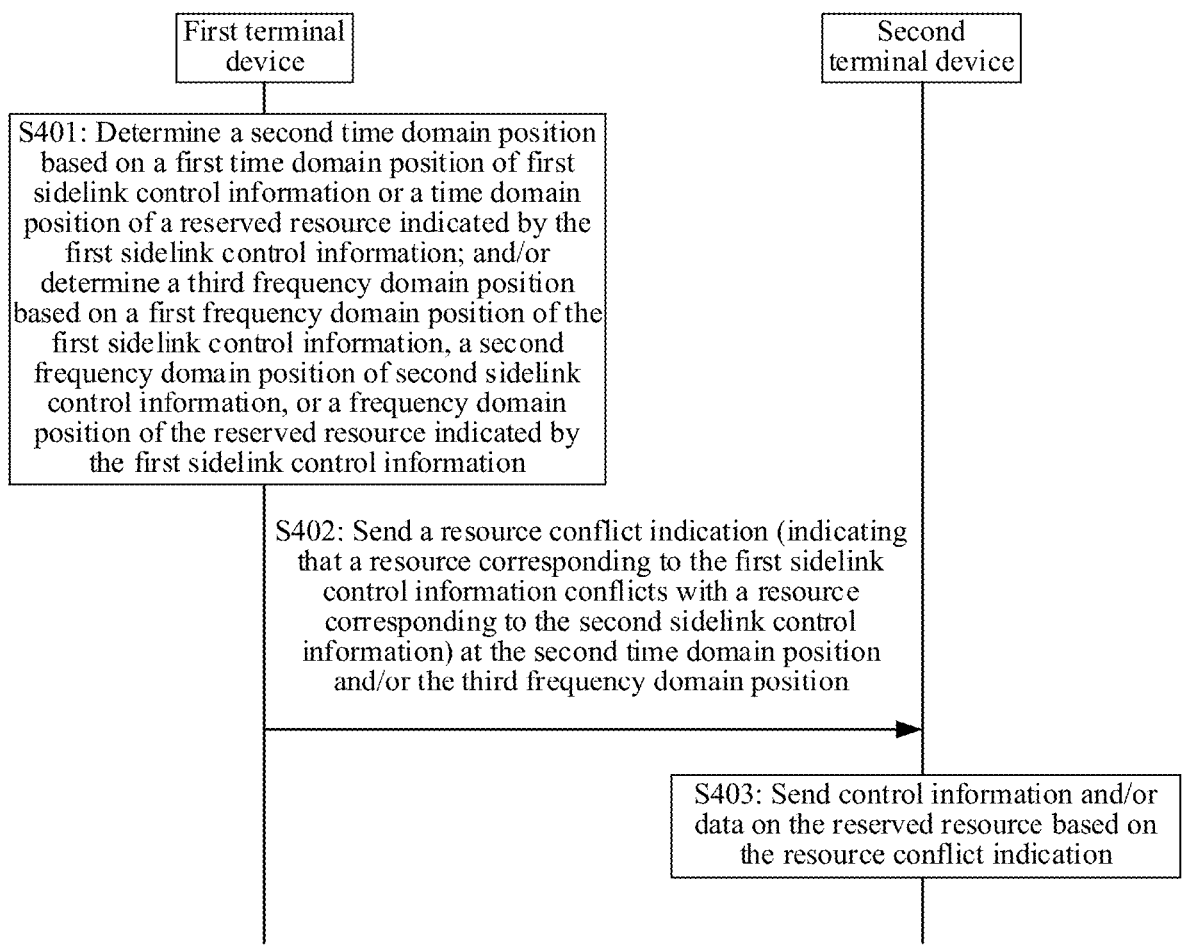
FIG. 14 is a schematic flowchart of another post-RCI transmission method according to an embodiment of this application.

FIG. 14 is a schematic flowchart of still another resource conflict indication transmission method according to an embodiment of this application. This embodiment is a post-RCI scenario, and an RCI is sent to a protected terminal device. For example, the method includes the following steps.

S401: Determine a second time domain position based on a first time domain position of first sidelink control information or a time domain position of a reserved resource indicated by the first sidelink control information; and/or determine, based on a first frequency domain position of the first sidelink control information, a second frequency domain position of second sidelink control information, or a frequency domain position of the reserved resource indicated by the first sidelink control information, a third frequency domain position and a cyclic shift associated with a resource conflict indication.

For specific implementation of this step, refer to step S301 in the embodiment shown in FIG. 13.

S402: A first terminal device sends the resource conflict indication to a second terminal device at the second time domain position and/or the third frequency domain position. The resource conflict indication indicates that a first resource conflicts with a second resource at a first position. Correspondingly, the second terminal device receives the resource conflict indication.

Different from step S302 in the embodiment shown in FIG. 13, the first terminal device sends the RCI to the second terminal device, where the RCI indicates a resource on which the first SCI is located conflicts with a resource on which the second SCI is located, and the second terminal device may send control information and/or data on a reserved resource indicated by the second SCI without needing to reselect the reserved resource.

For a specific implementation thereof, refer to step S202 in the embodiment shown in FIG. 11.

S403: The second terminal device sends the control information and/or the data on the reserved resource based on the resource conflict indication.

For a specific implementation thereof, refer to step S203 in the embodiment shown in FIG. 11.

According to the resource conflict indication transmission method provided in this embodiment of this application, when determining that the resource on which the first SCI is located conflicts with the resource on which the second SCI is located, the first terminal device sends the RCI to the second terminal device at the determined time domain position and/or frequency domain position after a conflict position. The RCI is sent at the determined time domain position and/or frequency domain position, so that reliability of RCI transmission is improved.

The foregoing embodiments separately describe how to perform pre-RCI or post-RCI. However, in a resource pool, a pre-RCI and a post-RCI may coexist, or may work independently. A first terminal device may send the pre-RCI and/or the post-RCI to a second terminal device or a third terminal device. If a network side or the first terminal device does not distinguish between the pre-RCI and the post-RCI, the second terminal device or the third terminal device cannot determine a type of the received RCI.

Figure 15:
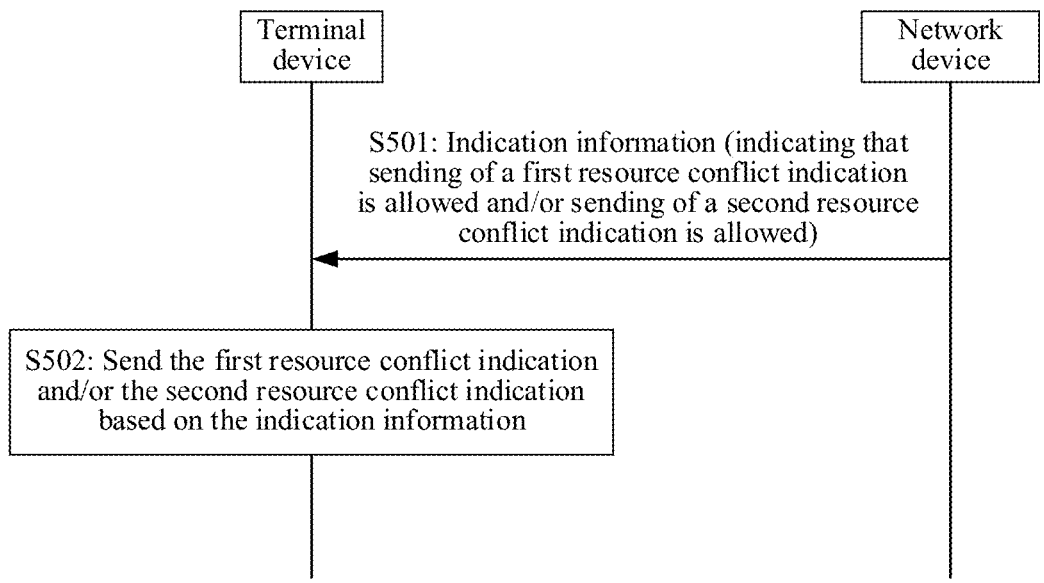
FIG. 15 is a schematic flowchart of a resource conflict indication transmission method according to an embodiment of this application.

Based on the foregoing problem, an embodiment of this application provides still another resource conflict indication transmission method. FIG. 15 is a schematic flowchart of the still another resource conflict indication transmission method according to this embodiment of this application. For example, the method includes the following steps.

S501: A network device sends indication information to a terminal device. Correspondingly, the terminal device receives the indication information. The indication information indicates that sending of a first resource conflict indication is allowed and/or sending of a second resource conflict indication is allowed, the first resource conflict indication is sent before a resource conflict position, and the second resource conflict indication is sent after the resource conflict position.

In this embodiment, the network device configures, by using signaling, whether sending of the pre-RCI and sending of the post-RCI are allowed. Specifically, the configuration manner includes any one of the following: allowing sending of the pre-RCI, allowing sending of the post-RCI, allowing sending of the pre-RCI and post-RCI, not allowing sending of an RCI, not allowing sending of the pre-RCI, and not allowing sending of the post-RCI. Allowing sending of the pre-RCI means that only the pre-RCI is allowed to be sent. Allowing sending of the post-RCI means that only the post-RCI is allowed to be sent. Allowing sending of the pre-RCI and post-RCI means that both the pre-RCI and the post-RCI are allowed to be sent. Not allowing sending of an RCI means that neither the pre-RCI nor the post-RCI is allowed to be sent. Not allowing sending of the pre-RCI means that the post-RCI may be sent. Not allowing the post-RCI means that the pre-RCI may be sent.

The network device may send the indication information to the first terminal device and the second terminal device in the foregoing embodiment. This embodiment is described by using an example in which the indication information is sent to the first terminal device. That is, the terminal device herein is the foregoing first terminal device.

S502: The terminal device sends the first resource conflict indication and/or the second resource conflict indication based on the indication information.

If the network device allows the first terminal device to send the pre-RCI, the first terminal device sends the pre-RCI to the second terminal device. If the network device allows the first terminal device to send the post-RCI, the first terminal device sends the post-RCI to the second terminal device. If the network device allows the first terminal device to send the pre-RCI and the post-RCI, the first terminal device sends the pre-RCI and the post-RCI to the second terminal device.

If the network device allows the first terminal device to send the pre-RCI and the post-RCI, and the first terminal device sends the pre-RCI and the post-RCI to the second terminal device, the second terminal device cannot distinguish the pre-RCI from the post-RCI. Therefore, this embodiment further provides the following implementations for distinguishing the pre-RCI from the post-RCI:

In an implementation, the pre-RCI is corresponding to a first sequence, and the post-RCI is corresponding to a second sequence. The first sequence and the second sequence are different cyclic shifts (CSs), the first sequence and the second sequence are different root sequences, or the first sequence and the second sequence are different orthogonal cover codes (OCCs). That is, the pre-RCI and the post-RCI are represented by using different sequences. For example, the sequences have different CSs, different root sequences, or different OCCs. Therefore, when receiving the pre-RCI and the post-RCI, the second terminal device may distinguish whether a received RCI is the pre-RCI or the post-RCI based on different sequences corresponding to the pre-RCI and the post-RCI.

In another possible implementation, the pre-RCI is corresponding to first frequency domain information, the post-RCI is corresponding to second frequency domain information, and the frequency domain information includes at least one of the following information: resource block set information and frequency domain index information.

The pre-RCI and the post-RCI may be respectively corresponding to different resource block sets. The resource block set may be the foregoing first resource block set or second resource block set. For example, it is assumed that a resource block set 1 is corresponding to the pre-RCI, and a resource block set 2 is corresponding to the post-RCI. If the first terminal device sends the pre-RCI to the second terminal device on the resource block set 1, and the second terminal device receives one RCI on the resource block set 1, the second terminal device may determine that the RCI is the pre-RCI. If the first terminal device sends the post-RCI to the second terminal device on the resource block set 2, and the second terminal device receives one RCI on the resource block set 2, the second terminal device may determine that the RCI is the post-RCI. The resource block set 1 and the resource block set 2 herein may be the foregoing first resource block set, or may be the foregoing second resource block set.

Similarly, it is assumed that a resource block set 1 is corresponding to the pre-RCI, and a resource block set 2 is corresponding to the post-RCI. If the first terminal device sends the pre-RCI to the second terminal device on the resource block set 1, and the second terminal device receives one RCI on the resource block set 1, the second terminal device may determine that the RCI is the pre-RCI. If the first terminal device sends the post-RCI to the second terminal device on the resource block set 2, and the second terminal device receives one RCI on the resource block set 2, the second terminal device may determine that the RCI is the post-RCI.

The pre-RCI and the post-RCI may be respectively corresponding to different frequency domain indexes. According to the descriptions of the foregoing embodiment, there are a plurality of manners of determining, in the second resource block set, the second frequency domain position (frequency domain index) for sending the RCI. How the pre-RCI and the post-RCI are respectively corresponding to the different frequency domain indexes and how the second terminal device determines that a received RCI is the pre-RCI or the post-RCI are described below based on different manners of determining the frequency domain indexes.

In a case, the first terminal device sends the pre-RCI to the second terminal device at a frequency domain position 1, where the frequency domain position 1 is determined by the first terminal device based on a source identifier of first SCI and the resource block set 1. The second terminal device receives the pre-RCI, and determines a frequency domain position 1' based on the source identifier of the first SCI and the resource block set 1. If the frequency domain position 1' is consistent with the frequency domain position 1, the second terminal device may determine that the first terminal device sends the pre-RCI. The first terminal device sends the post-RCI to the second terminal device at a frequency domain position 2, where the frequency domain position 2 is determined by the first terminal device based on the source identifier of the first SCI and the resource block set 2. The second terminal device receives the post-RCI, and determines a frequency domain position 2' based on the source identifier of the first SCI and the resource block set 2. If the frequency domain position 2' is consistent with the frequency domain position 2, the second terminal device may determine that the first terminal device sends the post-RCI. The first terminal device sends the pre-RCI and the post-RCI to the second terminal device. A principle for the second terminal device to distinguish the pre-RCI from the post-RCI is the same, and a difference is that the second frequency domain position is determined based on a source identifier of second SCI and the second resource block set.

In another case, there is a preset correspondence between the second frequency domain position and a service priority. The first terminal device sends the pre-RCI to the second terminal device at a frequency domain position 1, where the frequency domain position 1 is determined by the first terminal device based on the second resource block set and a service priority of data scheduled by using the first SCI. The second terminal device receives the pre-RCI at a frequency domain position 1', and first determines that the frequency domain position 1' is corresponding to a service priority 2. The service priority of the data scheduled by using the first SCI is 5, and the service priority 5 is higher than the service priority 2. In this case, the second terminal device determines that the pre-RCI is received.

In still another case, the first terminal device sends the pre-RCI to the second terminal device at a frequency domain position 1, where the frequency domain position 1 is determined by the first terminal device based on a slot index and/or a sub-channel index of first SCI. The second terminal device receives the pre-RCI, and determines a frequency domain position 1' based on the slot index and/or the sub-channel index of the first SCI. If the frequency domain position 1' is consistent with the frequency domain position 1, the second terminal device may determine that the first terminal device sends the pre-RCI. The first terminal device sends the post-RCI to the second terminal device at a frequency domain position 2, where the frequency domain position 2 is determined by the first terminal device based on the slot index and/or the sub-channel index of the first SCI. The second terminal device receives the post-RCI, and determines a frequency domain position 2' based on the slot index and/or the sub-channel index of the first SCI. If the frequency domain position 2' is consistent with the frequency domain position 2, the second terminal device may determine that the first terminal device sends the post-RCI.

In still another case, the first terminal device sends pre-RCI to the second terminal device at a frequency domain position 1, where the frequency domain position 1 is determined by the first terminal device based on a first time domain position and/or a first frequency domain position. The second terminal device receives the pre-RCI, and determines a frequency domain position 1' based on the first time domain position and/or the first frequency domain position. If the frequency domain position 1' is consistent with the frequency domain position 1, the second terminal device may determine that the first terminal device sends the pre-RCI. The first terminal device sends the post-RCI to the second terminal device at a frequency domain position 2, where the frequency domain position 2 is determined by the first terminal device based on the first time domain position and/or the first frequency domain position. The second terminal device receives the post-RCI, and determines a frequency domain position 2' based on the first time domain position and/or the first frequency domain position. If the frequency domain position 2' is consistent with the frequency domain position 2, the second terminal device may determine that the first terminal device sends the post-RCI. The first terminal device sends the pre-RCI and the post-RCI to the second terminal device. A principle for distinguishing the pre-RCI from the post-RCI by the second terminal device is the same.

In still another implementation, the pre-RCI and the post-RCI include a first field, and the first field has different values in the pre-RCI and the post-RCI. Specifically, for example, an $N^{th}$ bit of the pre-RCI and the post-RCI indicates the pre-RCI or the post-RCI. When a value of the $N^{th}$ bit is "0", the pre-RCI is indicated; or when a value of the $N^{th}$ bit is "1", the post-RCI is indicated, and vice versa.

According to the resource conflict indication transmission method provided in this embodiment of this application, the network device may indicate to an auxiliary terminal and an indicated terminal or indicate to the auxiliary terminal and a protected terminal whether sending of the first resource conflict indication and/or sending of the second resource conflict indication are/is allowed. In this way, a receiver and a sender of the resource conflict indication have consistent understanding of a type of the resource conflict indication, and can accurately decode the resource conflict indication, so that reliability of transmission of the resource conflict indication is improved.

It may be understood that, in the foregoing embodiments, methods and/or steps implemented by the terminal device may alternatively be implemented by a component (for example, a chip or a circuit) that can be used in the terminal device, and methods and/or steps implemented by the network device may alternatively be implemented by a component (for example, a chip or a circuit) that can be used in the network device.

The foregoing mainly describes the solutions provided in embodiments of this application from a perspective of interaction between network elements. Correspondingly, embodiments of this application further provide a terminal device and a network device. The terminal device and the network device are configured to implement the foregoing methods. The terminal device and the network device may be the terminal device in the foregoing method embodiments, an apparatus including the foregoing terminal device, or a component that can be used in the terminal device. Alternatively, the terminal device and the network device may be the network device in the foregoing method embodiments, an apparatus including the foregoing network device, or a component that can be used in the network device. It may be understood that to implement the foregoing functions, the terminal device and the network device include corresponding hardware structures and/or software modules for performing the functions. A person skilled in the art should easily be aware that, in combination with units and algorithm steps of the examples described in embodiments disclosed in this specification, this application may be implemented by hardware or a combination of the hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal device and the network device may be divided into functional modules based on the foregoing method embodiments. For example, each functional module may be obtained through division based on each function, or two or more functions may be integrated into one processing module. The integrated module may be implemented in a form of hardware, or may be implemented in a form of a software functional module. It may be noted that, in embodiments of this application, module division is an example, and is merely a logical function division. During actual implementation, another division manner may be used.

Based on a same concept of the foregoing resource conflict indication transmission method, the following resource conflict indication transmission apparatuses are further provided below.

Figure 16:
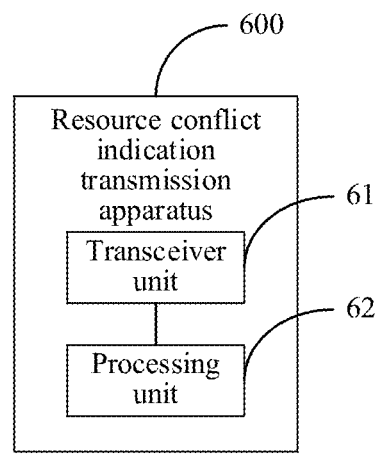
FIG. 16 is a schematic diagram of a structure of a resource conflict indication transmission apparatus according to an embodiment of this application.

FIG. 16 is a schematic diagram of a structure of a resource conflict indication transmission apparatus according to an embodiment of this application. The apparatus 600 includes a transceiver unit 61 and a processing unit 62.

In an embodiment, the processing unit 62 is configured to: determine a second time domain position based on a time domain position of first sidelink control information or a first time domain position, and/or determine a third frequency domain position based on a frequency domain position of the first sidelink control information, a first frequency domain position, or a second frequency domain position, where the first time domain position and the first frequency domain position are a position of a first reserved resource indicated by the first sidelink control information, and the first time domain position and the second frequency domain position are a position of a second reserved resource indicated by second sidelink control information; and the first reserved resource conflicts with the second reserved resource, where the conflict includes a time domain conflict or a time-frequency conflict; and the transceiver unit 61 is configured to send a resource conflict indication to a second resource conflict indication transmission apparatus at the second time domain position and/or the third frequency domain position, where the resource conflict indication indicates that the first reserved resource conflicts with the second reserved resource, or indicates to change the first reserved resource, where the first sidelink control information or the second sidelink control information is from the second resource conflict indication transmission apparatus.

In an implementation, the processing unit 62 is further configured to determine the second time domain position based on the first time domain position and a first time interval.

In another implementation, the second time domain position belongs to a conflict indication time domain position set, and time domain positions in the conflict indication time domain position set are discretely distributed; and the second time domain position is a latest time domain position that is the first time interval before the first time domain position.

In still another implementation, the first time interval includes at least one of the following time lengths:

a length of time required by the second resource conflict indication transmission apparatus to decode the resource conflict indication;

a length of time required by the second resource conflict indication transmission apparatus to cancel transmission of data and/or control information at the first time domain position; and a length of time required by the second resource conflict indication transmission apparatus to reselect the first reserved resource.

In still another implementation, an interval between the time domain position of the first sidelink control information and the second time domain position is greater than or equal to a second time interval; and the second time interval includes at least one of the following time lengths:

a length of time required to determine that the first reserved resource conflicts with the second reserved resource; and a length of time required to generate the resource conflict indication.

In still another implementation, the first sidelink control information is from the second resource conflict indication transmission apparatus; or the time domain position of the first sidelink control information is after a time domain position of the second sidelink control information;

a service priority of data scheduled by using the first sidelink control information is lower than a preset first priority threshold;

a service priority of data scheduled by using the first sidelink control information is lower than a service priority of data scheduled by using the second sidelink control information; or a service priority of data scheduled by using the first sidelink control information is lower than a second priority threshold, where the second priority threshold is associated with signal quality and a service priority of data scheduled by using the second sidelink control information.

In still another possible implementation, a frequency domain resource at the third frequency domain position is located on a feedback channel, and the frequency domain resource at the third frequency domain position is orthogonal to a resource set that is used to feed back the indication and that is on the feedback channel.

In still another possible implementation, the processing unit 62 is further configured to: determine a second resource block set based on the frequency domain position of the first sidelink control information, and determine the third frequency domain position in the second resource block set, where the first sidelink control information and the data scheduled by using the first sidelink control information occupy one or more sub-channels; and the second resource block set is associated with a start sub-channel in the one or more sub-channels; or the second resource block set is associated with the one or more sub-channels.

In still another possible implementation, the processing unit 62 is further configured to: determine a second resource block set based on the first frequency domain position, and determine the third frequency domain position in the second resource block set, where the first frequency domain position is one or more sub-channels occupied by the first reserved resource; and the second resource block set is associated with a start sub-channel in the one or more sub-channels; or the second resource block set is associated with the one or more sub-channels.

In still another possible implementation, the processing unit 62 is further configured to: determine a second resource block set based on the second frequency domain position, and determine the third frequency domain position in the second resource block set, where the second frequency domain position is one or more sub-channels occupied by the second reserved resource; and the second resource block set is associated with a start sub-channel in the one or more sub-channels; or the second resource block set is associated with the one or more sub-channels.

In another embodiment, the transceiver unit 61 is configured to receive a resource conflict indication at a second time domain position and/or a third frequency domain position, where the resource conflict indication indicates that a first reserved resource indicated by first sidelink control information conflicts with a second reserved resource indicated by second sidelink control information, and indicates to change the first reserved resource, where the conflict includes a time domain conflict or a time-frequency conflict, and the second time domain position is determined based on a time domain position of the first sidelink control information or a first time domain position; and/or the third frequency domain position is determined based on a frequency domain position of the first sidelink control information, a first frequency domain position, or a second frequency domain position, the first time domain position and the first frequency domain position are a position of the first reserved resource indicated by the first sidelink control information, and the first time domain position and the second frequency domain position are a position of the second reserved resource indicated by the second sidelink control information; and the processing unit 62 is configured to: cancel transmission of data and/or control information on the first reserved resource based on the resource conflict indication, and reselect the first reserved resource.

In an implementation, the processing unit 62 is configured to perform at least one of the following:

determining a fourth frequency domain position based on a second resource block set and a source identifier of the first sidelink control information; and if the fourth frequency domain position is consistent with the third frequency domain position, canceling transmission of the data and/or the control information on the first reserved resource based on the resource conflict indication, and reselecting the first reserved resource;

determining a first service priority corresponding to the third frequency domain position; and if a second service priority of data scheduled by using the first sidelink control information is higher than or equal to the first service priority, canceling transmission of the data and/or the control information on the first reserved resource based on the resource conflict indication, and reselecting the first reserved resource;

determining a fifth frequency domain position based on to a slot index of the first sidelink control information and a sub-channel index of the first sidelink control information; and if the fifth frequency domain position is consistent with the third frequency domain position, canceling transmission of the data and/or the control information on the first reserved resource based on the resource conflict indication, and reselecting the first reserved resource; and determining a sixth frequency domain position based on the first time domain position or the first frequency domain position; and if the sixth frequency domain position is consistent with the third frequency domain position, canceling transmission of the data and/or the control information on the first reserved resource based on the resource conflict indication, and reselecting the first reserved resource.

In still another embodiment, the transceiver unit 61 is configured to receive a resource conflict indication at a second time domain position and/or a third frequency domain position, where the resource conflict indication indicates that a first reserved resource indicated by first sidelink control information conflicts with a second reserved resource indicated by second sidelink control information, and indicates to send control information and/or data on the second reserved resource, where the conflict includes a time domain conflict or a time-frequency conflict, and the second time domain position is determined based on a time domain position of the first sidelink control information or a first time domain position; and/or the third frequency domain position is determined based on a frequency domain position of the first sidelink control information, a first frequency domain position, or a second frequency domain position, the first time domain position and the first frequency domain position are a position of the first reserved resource indicated by the first sidelink control information, and the first time domain position and the second frequency domain position are a position of the second reserved resource indicated by the second sidelink control information; and the transceiver unit 61 is further configured to send the control information and/or the data on the second reserved resource based on the resource conflict indication.

In an implementation, the processing unit 62 is configured to determine a fourth frequency domain position based on a second resource block set and a source identifier of the second sidelink control information; and the transceiver unit 61 is further configured to: if the fourth frequency domain position is consistent with the third frequency domain position, send the control information and/or the data on the second reserved resource based on the resource conflict indication;

the processing unit 62 is further configured to determine a first service priority corresponding to the third frequency domain position; and the transceiver unit 61 is further configured to: if a second service priority of data scheduled by using the second sidelink control information is higher than or equal to the first service priority, send the control information and/or the data on the second reserved resource based on the resource conflict indication; or the processing unit 62 is further configured to determine a fifth frequency domain position based on the first time domain position or the first frequency domain position; and the transceiver unit 61 is further configured to: if the fifth frequency domain position is consistent with the third frequency domain position, send the control information and/or the data on the second reserved resource based on the resource conflict indication.

In still another embodiment, the processing unit 62 is configured to: determine a second time domain position based on a first time domain position of first sidelink control information or a time domain position of a reserved resource indicated by the first sidelink control information; and/or determine a third frequency domain position based on a first frequency domain position of the first sidelink control information, a second frequency domain position of second sidelink control information, or a frequency domain position of the reserved resource indicated by the first sidelink control information, where a resource corresponding to the first sidelink control information conflicts with a resource corresponding to the second sidelink control information, and the conflict includes a time domain conflict or a time-frequency conflict; and the transceiver unit 61 is configured to send a resource conflict indication to a second resource conflict indication transmission apparatus at the second time domain position and/or the third frequency domain position, where the resource conflict indication indicates that the resource corresponding to the first sidelink control information conflicts with the resource corresponding to the second sidelink control information, or indicates to change the reserved resource or retransmit control information and/or data on the reserved resource, where the first sidelink control information or the second sidelink control information is from the second resource conflict indication transmission apparatus.

In an implementation, the processing unit 62 is further configured to determine the second time domain position based on the first time domain position and a first time interval.

In another implementation, the second time domain position belongs to a conflict indication time domain position set, and time domain positions in the conflict indication time domain position set are discretely distributed; and
the second time domain position is a latest time domain position that is the first time interval before the first time domain position.

In still another implementation, the first time interval includes at least one of the following time lengths:
a length of time required to determine that the resource corresponding to the first sidelink control information conflicts with the resource corresponding to the second sidelink control information;
a length of time required to generate the resource conflict indication; and
a length of time caused by discrete distribution of the time domain positions.

In still another implementation, an interval between the time domain position of the reserved resource indicated by the first sidelink control information and the second time domain position is greater than or equal to a second time interval; and
the second time interval includes at least one of the following time lengths:
a length of time required by the second resource conflict indication transmission apparatus to decode the resource conflict indication;
a length of time required by the second resource conflict indication transmission apparatus to cancel transmission of the data and/or the control information on the reserved resource indicated by the first sidelink control information;
a length of time required by the second resource conflict indication transmission apparatus to reselect the reserved resource; and
a length of time required by the second resource conflict indication transmission apparatus to retransmit the control information and/or the data on the reserved resource.

In still another implementation, the first sidelink control information is from the second resource conflict indication transmission apparatus; or
a service priority of data scheduled by using the first sidelink control information is lower than a preset first priority threshold;
a service priority of data scheduled by using the first sidelink control information is lower than a service priority of data scheduled by using the second sidelink control information; or
a service priority of data scheduled by using the first sidelink control information is lower than a second priority threshold, where the second priority threshold is associated with signal quality and a service priority of data scheduled by using the second sidelink control information.

In still another possible implementation, a frequency domain resource at the third frequency domain position is located on a feedback channel, and the frequency domain resource at the third frequency domain position is orthogonal to a resource set that is used to feed back the indication and that is on the feedback channel.

In still another possible implementation, the processing unit 62 is further configured to: determine a second resource block set based on the first frequency domain position of the first sidelink control information, and determine the third frequency domain position in the second resource block set, where
the first sidelink control information and the data scheduled by using the first sidelink control information occupy one or more sub-channels; and
the second resource block set is associated with a start sub-channel in the one or more sub-channels; or
the second resource block set is associated with the one or more sub-channels.

In still another possible implementation, the processing unit 62 is further configured to: determine a second resource block set based on the second frequency domain position, and determine the third frequency domain position in the second resource block set, where
the second sidelink control information and the data scheduled by using the second sidelink control information occupy one or more sub-channels; and
the second resource block set is associated with a start sub-channel in the one or more sub-channels; or
the second resource block set is associated with the one or more sub-channels.

In still another possible implementation, the processing unit 62 is further configured to: determine a second resource block set based on the frequency domain position of the reserved resource indicated by the first sidelink control information, and determine the third frequency domain position in the second resource block set, where
the second frequency domain position is one or more sub-channels occupied by the reserved resource indicated by the first sidelink control information; and
the second resource block set is associated with a start sub-channel in the one or more sub-channels; or
the second resource block set is associated with the one or more sub-channels.

In still another embodiment, the transceiver unit 61 is configured to receive a resource conflict indication at a second time domain position and/or a third frequency domain position, where the resource conflict indication indicates that a resource corresponding to first sidelink control information conflicts with a resource corresponding to second sidelink control information, and indicates to change a reserved resource indicated by the first sidelink control information, where the conflict includes a time domain conflict or a time-frequency conflict, the second time domain position is determined based on a first time domain position of the first sidelink control information or a time domain position of the reserved resource indicated by the first sidelink control information, and/or the third frequency domain position is determined based on a first frequency domain position of the first sidelink control information, a second frequency domain position of the second sidelink control information, or a frequency domain position of the reserved resource indicated by the first sidelink control information; and the processing unit 62 is configured to: cancel, based on the resource conflict indication, transmission of data and/or control information on a resource on which the first sidelink control information is located, or reselect the reserved resource.

In an implementation, the processing unit 62 is configured to perform at least one of the following:

determining a fourth frequency domain position based on a second resource block set and a source identifier of the first sidelink control information; and if the fourth frequency domain position is consistent with the third frequency domain position, canceling, based on the resource conflict indication, transmission of the data and/or the control information on the resource on which the first sidelink control information is located, and reselecting the reserved resource;

determining a first service priority corresponding to the third frequency domain position; and if a second service priority of data scheduled by using the first sidelink control information is higher than or equal to the first service priority, canceling, based on the resource conflict indication, transmission of the data and/or the control information on the resource on which the first sidelink control information is located, and reselecting the reserved resource; and determining a fifth frequency domain position based on the first time domain position or the first frequency domain position; and if the fifth frequency domain position is consistent with the third frequency domain position, canceling, based on the resource conflict indication, transmission of the data and/or the control information on the resource on which the first sidelink control information is located, and reselecting the reserved resource.

In still another embodiment, the transceiver unit 61 is configured to receive a resource conflict indication at a second time domain position and/or a third frequency domain position, where the resource conflict indication indicates that a resource corresponding to first sidelink control information conflicts with a resource corresponding to second sidelink control information, and indicates to send control information and/or data on a reserved resource, where the conflict includes a time domain conflict or a time-frequency conflict, the second time domain position is determined based on a first time domain position of the first sidelink control information or a time domain position of a reserved resource indicated by the first sidelink control information, and/or the third frequency domain position is determined based on a first frequency domain position of the first sidelink control information, a second frequency domain position of the second sidelink control information, or a frequency domain position of the reserved resource indicated by the first sidelink control information; and the transceiver unit 61 is further configured to send the control information and/or the data on the reserved resource based on the resource conflict indication.

In an implementation, the processing unit 62 is configured to determine a fourth frequency domain position based on a second resource block set and a source identifier of service data scheduled by using the second sidelink control information; and the transceiver unit 61 is further configured to: if the fourth frequency domain position is consistent with the third frequency domain position, send the control information and/or the data on the reserved resource based on the resource conflict indication;

the processing unit 62 is configured to determine a first service priority corresponding to the third frequency domain position; and the transceiver unit 61 is configured to: if a second service priority of data scheduled by using the second sidelink control information is higher than or equal to the first service priority, send the control information and/or the data on the reserved resource based on the resource conflict indication;

the processing unit 62 is configured to determine a fifth frequency domain position based on a slot index of the second sidelink control information or a sub-channel index of the second sidelink control information; and the transceiver unit 61 is configured to: if the fifth frequency domain position is consistent with the third frequency domain position, send the control information and/or the data on the reserved resource based on the resource conflict indication; or the processing unit 62 is configured to determine a sixth frequency domain position based on the first time domain position or the first frequency domain position; and the transceiver unit 61 is configured to: if the sixth frequency domain position is consistent with the third frequency domain position, send the control information and/or the data on the reserved resource based on the resource conflict indication.

With reference to any one of the foregoing embodiments or any one of the implementations of the embodiment, in still another implementation, the transceiver unit 61 is further configured to receive candidate resource type information; and the candidate resource type information indicates that the second resource block set is associated with the start sub-channel in the one or more sub-channels; or the candidate resource type information indicates that the second resource block set is associated with the one or more sub-channels.

With reference to any one of the foregoing embodiments or any one of the implementations of the embodiment, in still another implementation, the processing unit 62 is further configured to determine the second resource block set based on at least one of the following information: a first resource block set, resource period information of the resource conflict indication, or code domain information of the resource conflict indication, where the second resource block set belongs to the first resource block set.

With reference to any one of the foregoing embodiments or any one of the implementations of the embodiment, in still another implementation, the transceiver unit 61 is further configured to receive indication information, where the indication information indicates the first resource block set, and the first resource block set is orthogonal to the resource set used to feed back the indication.

With reference to any one of the foregoing embodiments or any one of the implementations of the embodiment, in still another implementation, the processing unit 62 is further configured to determine the third frequency domain position in the second resource block set according to at least one of the following:

a source identifier of the first sidelink control information, a source identifier of the second sidelink control information, a destination identifier of the first sidelink control information, a destination identifier of the second sidelink control information, a member identifier of the first sidelink control information, a member identifier of the second sidelink control information, the service priority of the data scheduled by using the first sidelink control information, the service priority of the data scheduled by using the second sidelink control information, a slot index of the first sidelink control information, a sub-channel index of the first sidelink control information, the first time domain position, or the first frequency domain position.

With reference to any one of the foregoing embodiments or any one of the implementations of the embodiment, in still another implementation, the processing unit 62 is further configured to obtain a cast type field in the first sidelink control information and/or the second sidelink control information; and the transceiver unit 61 is further configured to: when the cast type field indicates that a transmission type is broadcast or multicast, send the resource conflict indication to the second resource conflict indication transmission apparatus.

With reference to any one of the foregoing embodiments or any one of the implementations of the embodiment, in still another implementation, the processing unit 62 is further configured to measure a channel congestion degree of a resource pool; and the transceiver unit 61 is further configured to: if the channel congestion degree is less than or equal to a first threshold, or the channel congestion degree is within a first preset range, send the resource conflict indication to the second resource conflict indication transmission apparatus.

With reference to any one of the foregoing embodiments or any one of the implementations of the embodiment, in still another implementation, the resource conflict indication transmission apparatus is a first resource conflict indication transmission apparatus; and the transceiver unit 61 is configured to send the resource conflict indication to the second resource conflict indication transmission apparatus at the second time domain position and/or the third frequency domain position, where the resource conflict indication further indicates preemption denial information, and the preemption denial information indicates, to the second resource conflict indication transmission apparatus, that the first resource conflict indication transmission apparatus indicates not to change the first reserved resource.

In still another embodiment, the transceiver unit 61 is configured to receive indication information, where the indication information indicates that sending of a first resource conflict indication is allowed and/or sending of a second resource conflict indication is allowed, the first resource conflict indication is sent before a resource conflict position, and the second resource conflict indication is sent after the resource conflict position; and the transceiver unit 61 is further configured to send the first resource conflict indication and/or the second resource conflict indication based on the indication information.

In an implementation, the first resource conflict indication is corresponding to a first sequence, and the second resource conflict indication is corresponding to a second sequence, where the first sequence and the second sequence are different cyclic shifts, the first sequence and the second sequence are different root sequences, or the first sequence and the second sequence are different orthogonal cover codes.

In another implementation, the first resource conflict indication is corresponding to first frequency domain information, the second resource conflict indication is corresponding to second frequency domain information, and the frequency domain information includes at least one of the following information: resource block set information and frequency domain index information.

In still another implementation, the first resource conflict indication is corresponding to a first resource block set, the second resource conflict indication is corresponding to a second resource block set, a first physical resource block set is located on a feedback channel, and/or a second physical resource block set is located on a feedback channel, where at least two of the first physical resource block set, the second physical resource block set, and a resource set that is used to feed back the indication and that is on the feedback channel are orthogonal.

In still another implementation, the first resource conflict indication and the second resource conflict indication include a first field, and the first field has different values in the first resource conflict indication and the second resource conflict indication.

For specific implementations of the transceiver unit 61 and the processing unit 62, refer to the related descriptions of the foregoing method embodiments.

Figure 17:
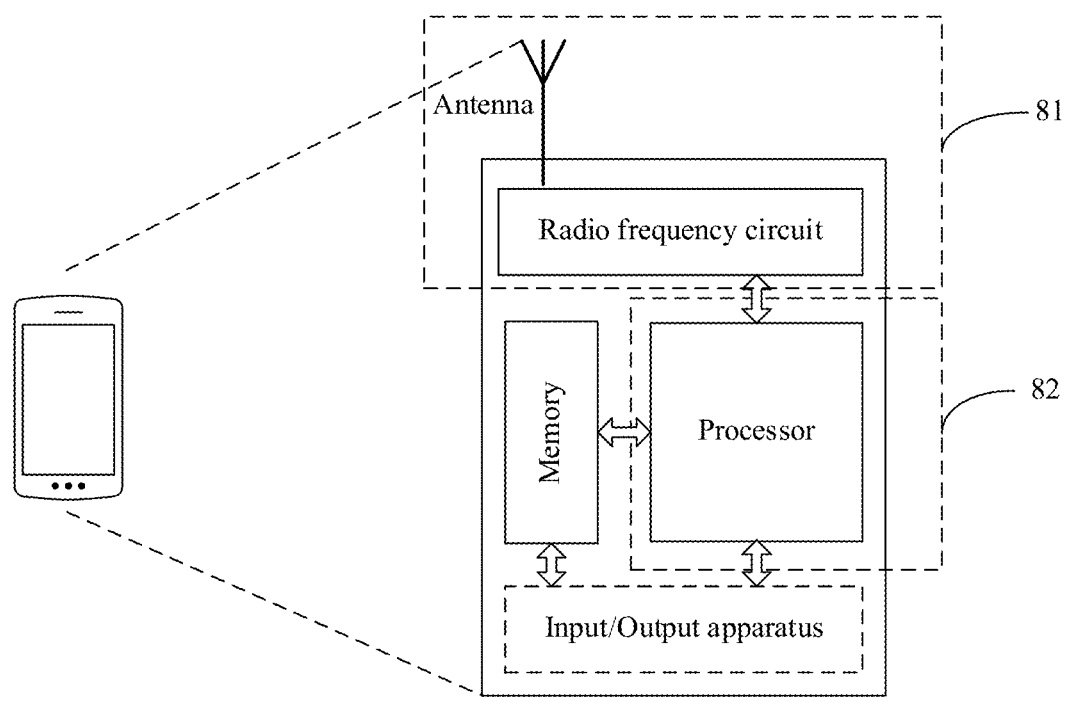
FIG. 17 is a simplified schematic diagram of a structure of a terminal device according to an embodiment of this application.

FIG. 17 is a simplified schematic diagram of a structure of a terminal device. For ease of understanding and illustration, an example in which the terminal device is a mobile phone is used in FIG. 17. As shown in FIG. 17, the terminal device includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It may be noted that some types of terminals may not have the input/output apparatus.

When data may be sent, after performing baseband processing on the to-be-sent data, the processor outputs a baseband signal to the radio frequency circuit; and the radio frequency circuit performs radio frequency processing on the baseband signal and sends the radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in embodiments of this application.

In embodiments of this application, an antenna having sending and receiving functions and the radio frequency circuit may be considered as a receiving unit and a sending unit (which may also be collectively referred to as a transceiver unit) of the terminal device, and a processor having a processing function may be considered as a processing unit of the terminal device. As shown in FIG. 17, the terminal device includes a transceiver unit 81 and a processing unit 82. The transceiver unit 81 may also be referred to as a receiver/transmitter machine, a receiver/transmitter, a receiver/transmitter circuit, or the like. The processing unit 82 may also be referred to as a processor, a processing board, a processing module, a processing apparatus, or the like.

For example, in another embodiment, the transceiver unit 81 is configured to perform a function executed by the terminal device in step S102 in the embodiment shown in FIG. 7, and the processing unit 82 is configured to perform step S101 in the embodiment shown in FIG. 7.

For example, in another embodiment, the transceiver unit 82 is configured to perform step S103 in the embodiment shown in FIG. 7.

For example, in an embodiment, the transceiver unit 81 is configured to perform a function executed by the terminal device in step S202 in the embodiment shown in FIG. 11, and the processing unit 82 is configured to perform step S201 in the embodiment shown in FIG. 11.

For example, in another embodiment, the processing unit 82 is configured to perform step S203 in the embodiment shown in FIG. 11.

For example, in another embodiment, the transceiver unit 81 is configured to perform a function executed by the terminal device in step S302 in the embodiment shown in FIG. 13, and the processing unit 82 is configured to perform step S301 in the embodiment shown in FIG. 13.

For example, in another embodiment, the transceiver unit 82 is configured to perform step S303 in the embodiment shown in FIG. 13.

For example, in an embodiment, the transceiver unit 81 is configured to perform a function executed by the terminal device in step S402 in the embodiment shown in FIG. 14, and the processing unit 82 is configured to perform step S401 in the embodiment shown in FIG. 14.

For example, in another embodiment, the processing unit 82 is configured to perform step S403 in the embodiment shown in FIG. 14.

For example, in another embodiment, the transceiver unit 81 is configured to perform a function executed by the terminal device in step S501 in the embodiment shown in FIG. 15, and the processing unit 82 is configured to perform step S502 in the embodiment shown in FIG. 15.

Figure 18:
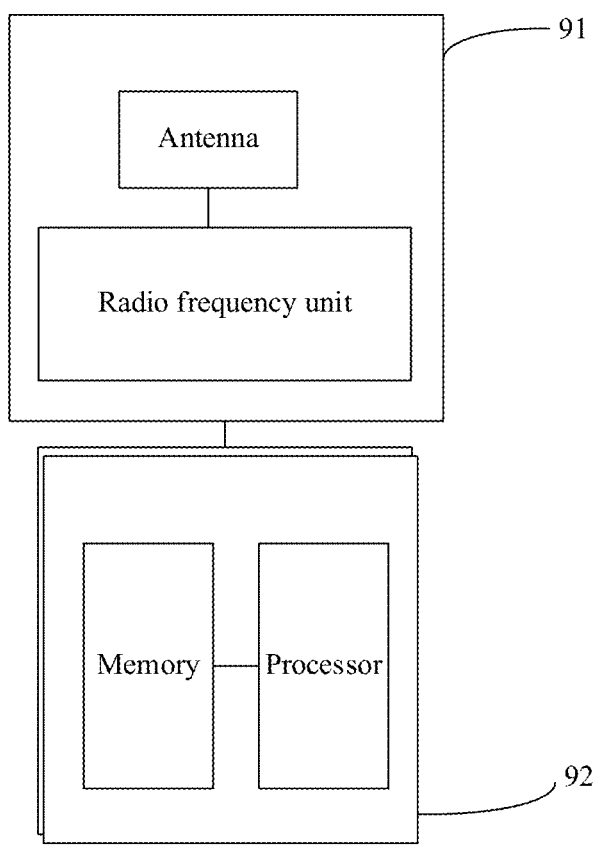
FIG. 18 is a simplified schematic diagram of a structure of a network device according to an embodiment of this application.

FIG. 18 is a simplified schematic diagram of a structure of a network device. The network device includes a part 92 and a part for radio frequency signal sending/receiving and conversion, and the part for radio frequency signal sending/receiving and conversion further includes a transceiver unit 91. The part for radio frequency signal sending/receiving and conversion is mainly configured to: send and receive a radio frequency signal and perform conversion between a radio frequency signal and a baseband signal. The part 92 is mainly configured to: perform baseband processing and control the network device. The transceiver unit 91 may also be referred to as a receiver/transmitter machine, a receiver/transmitter, a receiver/transmitter circuit, or the like. The 92 part is usually a control center of the network device, may usually be referred to as a processing unit, and is configured to control the network device to perform a step performed by the network device in FIG. 3 or FIG. 7. For details, refer to the foregoing descriptions of the related parts.

The part 92 may include one or more boards. Each board may include one or more processors and one or more memories. The processor is configured to read and execute a program in the memory to implement a baseband processing function and control the network device. If there are a plurality of boards, the boards may be interconnected to improve a processing capability. In an optional implementation, the plurality of boards may share one or more processors, the plurality of boards may share one or more memories, or the plurality of boards may share one or more processors at the same time.

For example, in an embodiment, the transceiver unit 91 is configured to perform a function executed by the network device in step S501 in the embodiment shown in FIG. 15.

An embodiment of this application further provides a computer-readable storage medium. The computer-readable storage medium stores a computer program or instructions. When the computer program or the instructions are executed, the method in the foregoing embodiment is implemented.

An embodiment of this application further provides a computer program product including instructions. When the instructions are run on a computer, the computer is enabled to perform the method in the foregoing embodiment.

An embodiment of this application further provides a communication system, including the foregoing resource conflict indication transmission apparatus.

It may be noted that one or more of the foregoing units may be implemented by using software, hardware, or a combination thereof. When any one of the foregoing modules or units is implemented by using software, the software exists in a form of computer program instructions, and is stored in a memory. A processor may be configured to execute the program instructions and implement the foregoing method procedures. The processor may be built in a system on chip (SoC) or an ASIC, or may be an independent semiconductor chip. In addition to a core for executing software instructions to perform operations or processing, the processor may further include a necessary hardware accelerator, for example, a field programmable gate array (FPGA), a programmable logic device (PLD), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface. The at least one processor is coupled to a memory through the interface. When the at least one processor executes a computer program or instructions in the memory, the chip system is enabled to perform the method according to any one of the foregoing method embodiments. Optionally, the chip system may include a chip, or may include the chip and another discrete component. This is not specifically limited in embodiments of this application.

It should be understood that unless otherwise specified, "/" in descriptions of this application indicates an "or" relationship between associated objects. For example, A/B may indicate A or B. A and B may be singular or plural. In addition, in descriptions of this application, unless otherwise specified, "a plurality of" means two or more than two. "At least one item (piece) of the following" or a similar expression thereof means any combination of these items, including a singular item (piece) or any combination of plural items (pieces). For example, at least one of a, b, or c may indicate: a; b; c; a and b; a and c; b and c; or a, b, and c;

where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, wherein the method comprises:
   determining a second time domain position based on a first time domain position;
   determining a third frequency domain position based on a first frequency domain position, wherein
   the first time domain position and the first frequency domain position are of a first reserved resource indicated by first sidelink control information, and the first time domain position and a second frequency domain position are of a second reserved resource indicated by second sidelink control information; and
   sending a resource conflict indication to a second terminal device at the second time domain position and the third frequency domain position,
   wherein the resource conflict indication indicates a conflict for the first reserved resource or indicates to reselect the first reserved resource,
   wherein the conflict is that the first reserved resource overlaps with the second reserved resource in the time domain, or the conflict is that the first reserved resource overlaps with the second reserved resource in the time domain and the frequency domain, and
   wherein the first sidelink control information is from the second terminal device.

2. The method according to claim 1, wherein the second sidelink control information is from a third terminal device.

3. The method according to claim 1, wherein the determining the second time domain position based on the first time domain position comprises:
   determining the second time domain position based on the first time domain position and a first time interval.

4. The method according to claim 3, wherein the second time domain position belongs to a conflict indication time domain position set, and time domain positions in the conflict indication time domain position set are periodically distributed, and
   wherein the second time domain position is a latest time domain position in the time domain positions and is at least the first time interval before the first time domain position.

5. The method according to claim 2, wherein an interval between a time domain position of the first sidelink control information and the second time domain position is greater than or equal to a second time interval.

6. The method according to claim 1, wherein
   a first priority value in the first sidelink control information is greater than a second priority value in the second sidelink control information.

7. The method according to claim 2, wherein the method is applied by an apparatus, wherein the apparatus is or is part of a first terminal device, and wherein the first terminal device is a physical sidelink shared channel (PSSCH) receive terminal of at least one of the second terminal device or the third terminal device.

8. The method according to claim 1, wherein a frequency domain resource at the third frequency domain position is located on physical sidelink feedback channel (PSFCH) resources, and the frequency domain resource at the third frequency domain position on the PSFCH resources is orthogonal to a resource set used for hybrid automatic repeat request (HARQ)-acknowledgement (ACK) information on the PSFCH resources.

9. The method according to claim 1, wherein the determining the third frequency domain position based on the first frequency domain position comprises:
  determining a second physical resource block set based on the first frequency domain position; and
  determining the third frequency domain position in the second physical resource block set, wherein
  the second physical resource block set is associated with a starting sub-channel of the first frequency domain position, or
  the second physical resource block set is associated with one or more sub-channels of the first frequency domain position.

10. The method according to claim 9, wherein the determining the third frequency domain position in the second physical resource block set comprises:
  determining the third frequency domain position and a first cyclic shift value $m_o$ associated with the resource conflict indication based on $(P_{ID}) \bmod R_{PRB,cs}^{RCI}$, wherein $P_{ID}$ is a source ID provided by the first sidelink control information, and $R_{PRB,cs}^{RCI}$ represents a number of resources available for one resource conflict indication.

11. The method according to claim 1, wherein a value of a second cyclic shift value $m_{CS}$ associated with the resource conflict indication is 0.

12. The method according to claim 1, wherein the method further comprises:
  receiving indication information, wherein the indication information indicates that sending of the resource conflict indication is enabled; and
  sending the resource conflict indication based on the indication information.

13. A method, wherein the method comprises:
  sending first sidelink control information, wherein the first sidelink control information indicates a first reserved resource;
  determining a second time domain position based on a first time domain position;
  determining a third frequency domain position based on a first frequency domain position,
  wherein the first time domain position and the first frequency domain position are of the first reserved resource; and
  receiving a resource conflict indication at the second time domain position and the third frequency domain position, wherein the resource conflict indication indicates a conflict for the first reserved resource or indicates to reselect the first reserved resource.

14. The method according to claim 13, wherein the determining the second time domain position based on the first time domain position comprises:
  determining the second time domain position based on the first time domain position and a first time interval.

15. The method according to claim 14, wherein the second time domain position belongs to a conflict indication time domain position set, and time domain positions in the conflict indication time domain position set are periodically distributed, and wherein the second time domain position is a latest time domain position in the time domain positions and is at least the first time interval before the first time domain position.

16. The method according to claim 13, wherein an interval between a time domain position of the first sidelink control information and the second time domain position is greater than or equal to a second time interval.

17. The method according to claim 13, wherein
  a first priority value in the first sidelink control information is greater than a second priority value in second sidelink control information, and
  the second sidelink control information indicates a second reserved resource, and the first reserved resource overlaps with the second reserved resource in the time domain and the frequency domain.

18. The method according to claim 13, wherein the method is applied by an apparatus, wherein the apparatus is or is part of a second terminal device, wherein the first sidelink control information is sent to a first terminal device, and wherein the first terminal device is a physical sidelink shared channel (PSSCH) receive terminal of the second terminal device.

19. The method according to claim 13, wherein the determining the third frequency domain position based on the first frequency domain position comprises:
  determining a second physical resource block set based on the first frequency domain position; and
  determining the third frequency domain position in the second physical resource block set, wherein
  the second physical resource block set is associated with a starting sub-channel of the first frequency domain position, or
  the second physical resource block set is associated with one or more sub-channels of the first frequency domain position.

20. The method according to claim 19, wherein the determining the third frequency domain position in the second physical resource block set comprises:
  determining the third frequency domain position and a first cyclic shift value $m_o$ associated with the resource conflict indication based on $(P_{ID}) \bmod R_{PRB,cs}^{RCI}$, wherein $P_{ID}$ is a source ID provided by the first sidelink control information, and $R_{PRB,cs}^{RCI}$ represents a number of resources available for one resource conflict indication.

21. The method according to claim 20, wherein a value of a second cyclic shift value $m_{CS}$ associated with the resource conflict indication is 0.

22. The method according to claim 13, wherein the method further comprises:
  receiving indication information, wherein the indication information indicates that receiving of the resource conflict indication is enabled; and
  receiving the resource conflict indication based on the indication information.

23. An apparatus, comprising:
  at least one processor, configured to execute a program stored in a memory, wherein when the program is executed, the apparatus is enabled to perform:
  determining a second time domain position based on a first time domain position;
  determining a third frequency domain position based on a first frequency domain position, wherein the first time domain position and the first frequency domain position are of a first reserved resource indicated by first sidelink control information, and the first time domain position and a second frequency domain position are of a second reserved resource indicated by second sidelink control information; and sending a resource conflict indication to a second terminal device at the second time domain position and the third frequency domain position, wherein the resource conflict indication indicates a conflict for the first reserved resource or indicates to reselect the first reserved resource, wherein the conflict is that the first reserved resource overlaps with the second reserved resource in the time domain, or the conflict is that the first reserved resource overlaps with the second reserved resource in the time domain and the frequency domain, and wherein the first sidelink control information is from the second terminal device.

24. An apparatus, comprising:

at least one processor, configured to execute a program stored in a memory, wherein when the program is executed, the apparatus is enabled to perform:

sending first sidelink control information, wherein the first sidelink control information indicates a first reserved resource;

determining a second time domain position based on a first time domain position;

determining a third frequency domain position based on a first frequency domain position, wherein the first time domain position and the first frequency domain position are of the first reserved resource; and receiving a resource conflict indication at the second time domain position and the third frequency domain position, wherein the resource conflict indication indicates a conflict for the first reserved resource or indicates to reselect the first reserved resource.

* * * * *